United States Patent [19]

Outa et al.

[11] Patent Number: 4,922,335
[45] Date of Patent: May 1, 1990

[54] COLOR FILM READING APPARATUS PROVIDING HIGH-GRADATION COLOR SIGNALS

[75] Inventors: Kenichi Outa, Yokohama; Yasumichi Suzuki; Yoshinori Ikeda, both of Tokyo, all of Japan

[73] Assignee: Canon Kabushiki Kaisha, Tokyo, Japan

[21] Appl. No.: 406,175

[22] Filed: Sep. 12, 1989

Related U.S. Application Data

[63] Continuation of Ser. No. 119,906, Nov. 12, 1987, abandoned.

[30] Foreign Application Priority Data

Nov. 14, 1986 [JP] Japan ................................. 61-271449

[51] Int. Cl.$^5$ .................... G03F 3/08; H04N 1/40; H04N 1/46
[52] U.S. Cl. ................................. 358/80; 358/75; 358/461; 358/475
[58] Field of Search ................. 358/75, 78, 80, 280, 358/284, 294, 443, 446, 447, 448, 461, 471, 475

[56] References Cited

U.S. PATENT DOCUMENTS

| | | | |
|---|---|---|---|
| 4,651,226 | 3/1987 | Motoori et al. | 358/280 |
| 4,656,524 | 4/1987 | Norris et al. | 358/280 |
| 4,656,525 | 4/1987 | Norris | 358/280 |
| 4,666,307 | 5/1987 | Matsumoto et al. | 358/80 |
| 4,674,126 | 6/1987 | Kotera | 358/282 |
| 4,688,099 | 8/1987 | Funston | 358/54 |
| 4,700,236 | 10/1987 | Abe | 358/280 |
| 4,736,245 | 4/1988 | Seto et al. | 358/80 |
| 4,825,065 | 4/1989 | Imai | 250/205 |
| 4,833,532 | 5/1989 | Abe | 358/80 |
| 4,837,450 | 6/1989 | Satomura et al. | 250/571 |

FOREIGN PATENT DOCUMENTS

| | | | |
|---|---|---|---|
| 0129446 | 12/1984 | European Pat. Off. | |
| 3413699 | 10/1984 | Fed. Rep. of Germany | |
| 60-51369 | 3/1985 | Japan | 358/78 |
| 60-54569 | 3/1985 | Japan | 358/80 |
| 60-96955 | 5/1985 | Japan | 358/80 |
| 60-149278 | 8/1985 | Japan | 358/280 |
| 62-200875 | 9/1987 | Japan | |
| 2141895 | 1/1985 | United Kingdom | |
| 2148658 | 5/1985 | United Kingdom | |

OTHER PUBLICATIONS

*Patent Abstracts of Japan*, vol. 6, No. 254 (E-148) [1132], Dec. 14, 1982 (Kokai 57-152267).

*Primary Examiner*—James J. Groody
*Assistant Examiner*—Randall S. Svihla
*Attorney, Agent, or Firm*—Fitzpatrick, Cella, Harper & Scinto

[57] ABSTRACT

A color film reading apparatus capable of generating high-gradation color signals from either a color negative or positive film includes a holding device for holding a color negative film, illuminating apparatus for projecting illumination light onto the color negative film, a reading unit for reading image data from the light projected through the color negative film, and shading circuitry for performing shading correction. Control circuitry controls the reading unit to cause the reading unit to raed data from an unexposed portion of the negative to obtain shading correction data. In the case of a positive film, the controlling circuitry sets the shading correction data on the basis of data obtained from the illumination light. Further, a high-gradation color image may be obtained from either a film original or a reflection from an original document.

14 Claims, 59 Drawing Sheets

FIG. 3

| COMMAND | CODE | FUNCTION |
|---|---|---|
| RESET COMMAND | 01H | AFTER RECEPTION OF RESET COMMAND, 0-ADDRESS CALLED STARTS FOLLOWING A SERIES OF COMMUNICATION HANDSHAKING |
| HOLD-OFF COMMAND | 02H | AFTER RECEPTION OF HOLD-OFF COMMAND, STEPPING MOTOR CONTROLLER RELEASES HOLD STATE OF MOTOR AND MAKES SCANNER FREE (POWER OFF STATE) |
| HOLD-ON COMMAND | 03H | AFTER RECEPTION OF HOLD-ON COMMAND, STEPPING MOTOR CONTROLLER MAINTAINS HOLD STATE OF MOTOR |
| HP SEARCH COMMAND | 04H | AFTER RECEPTION OF HP SEARCH COMMAND, SCANNER IS MOVED TO HP SENSOR POSITION (MOVING OPERATION CONSISTS OF THREE STATES) |
| SCAN COMMAND | 05H | SCAN COMMAND IS NORMALLY TO DESIGNATE SCAN MODE, AND CONSISTS OF FOLLOWING 4-BYTE PARAMETER (SCAN LENGTH; MAGNIFICATION) AFTER RECEPTION OF SCAN COMMAND AND PARAMETERS, SCANNER STARTS RESPONSIVE TO "SSTART" SIGNAL SCAN COMMAND IS HELD UNTIL RESET DEFAULT VALUE: A-4 SIZE (210mm) EQUI-MAGNIFICATION (100%) |
| DESIGNATION MOVEMENT COMMAND | 06H | DESIGNATION MOVEMENT COMMAND IS TO DESIGNATE MOVEMENT DISTANCES IN TWO DIRECTIONS FROM PRESENT POSITION, AND CONSISTS OF FOLLOWING 2-BYTE PARAMETER |

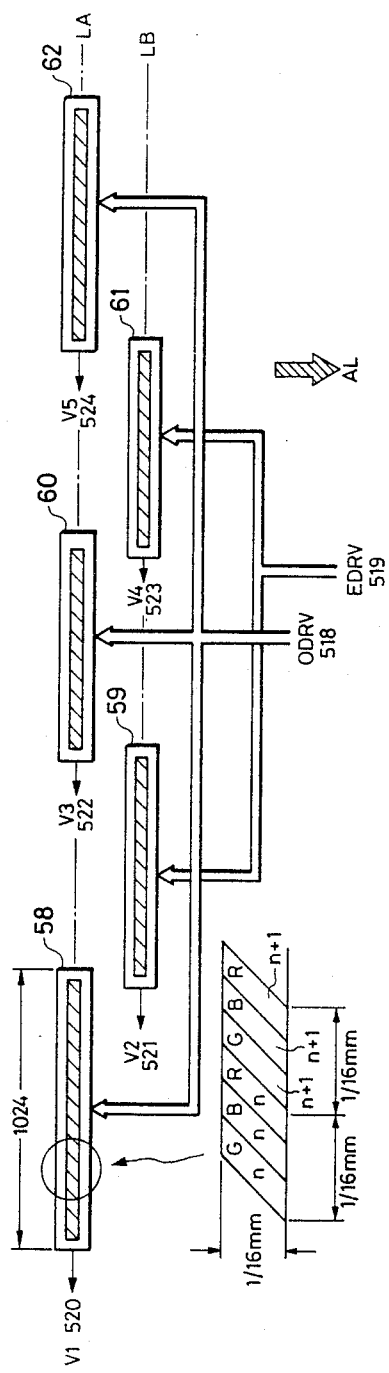
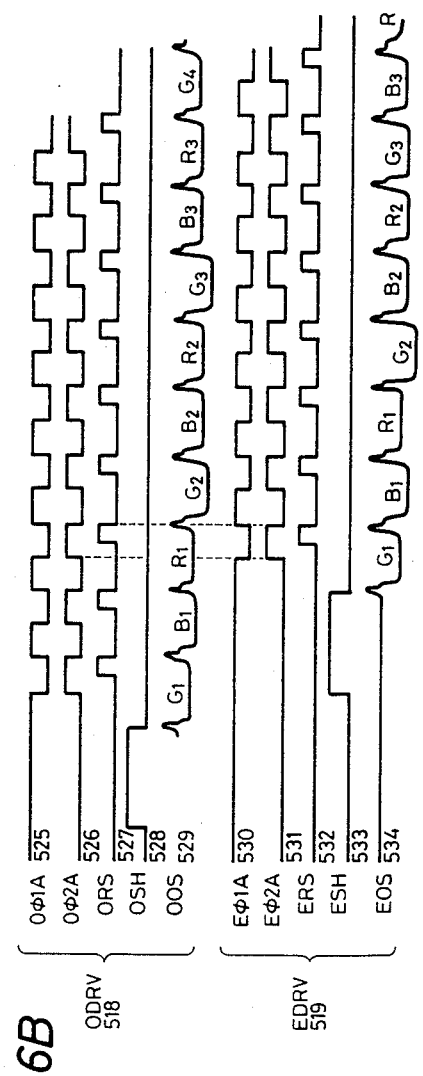
FIG. 6A
FIG. 6B

FIG. 14
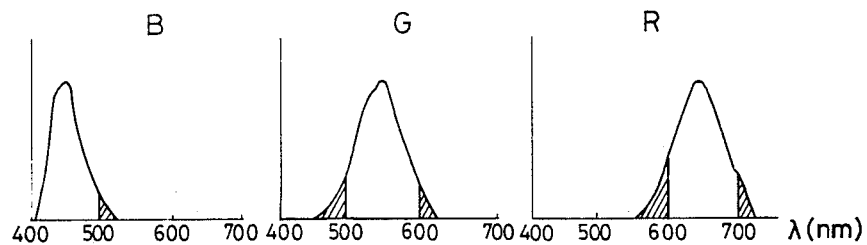
FIG. 15
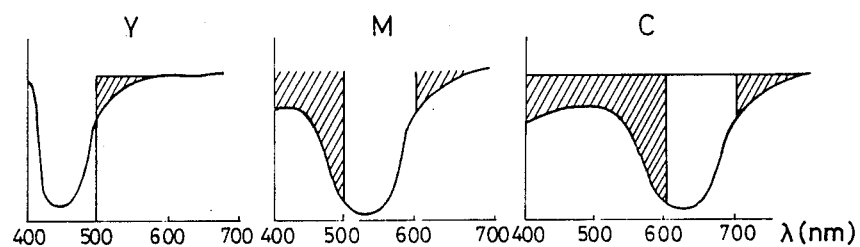
FIG. 16B
| C2 | C1 | C0 | a | b | c | | |
|----|----|----|----|----|----|----|----|
| 0 | 0 | 0 | 1 a | 1 b | 1 c | Y | ①  |
| 0 | 0 | 1 | 2 a | 2 b | 2 c | M | ② |
| 0 | 1 | 0 | 3 a | 3 b | 3 c | C | ③ |
| 0 | 1 | 0 | 4 a | 4 b | 4 c | MONO | ④ |
| 1 | X | X | X | X | X | B K | ⑤ |

FIG. 17E
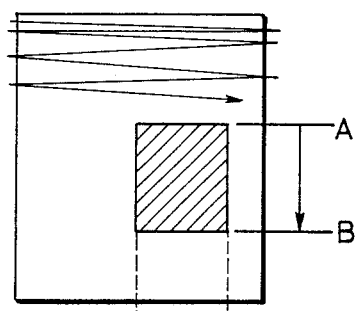
FIG. 17F
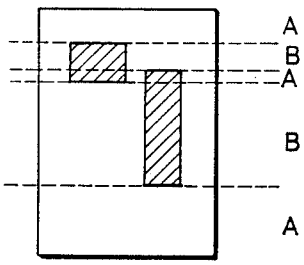
FIG. 17G
| AREA | 0 | UAREA | 565 |
|---|---|---|---|
| AREA | 1 | KAREA | 587 |
| | 2 | MAREA | 564 |
| | 3 | GAREA | 626 |
| | 4 | AWE | 628 |
| | 5 | ARE | 632 |
| | 6 | BWE | 629 |
| | 7 | BRE | 633 |
| | 8 | TMAREA | 660 |
| | 9 | CHAREA 0 | 615 |
| | 10 | ＊   1 | 665 |
| | 11 | ＊   2 | 666 |
| | 12 | ＊   3 | 667 |
| | 13 | CHSEL 0 | 668 |
| AREA | 14 | CHSEL 1 | 669 |

FIG. 18B
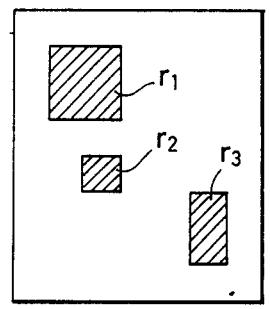
FIG. 18D
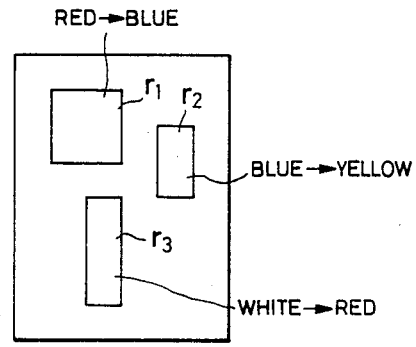
FIG. 18C
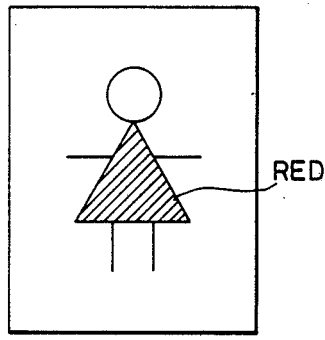
FIG. 18E

FIG. 19D
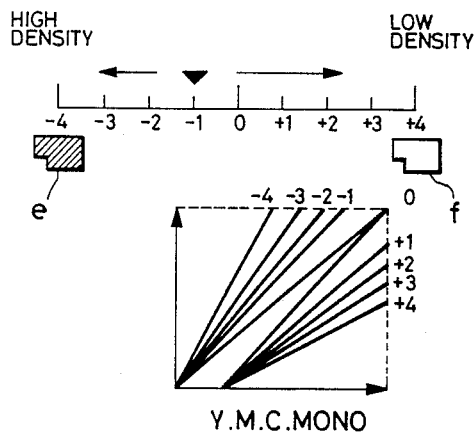
FIG. 19E
FIG. 19F
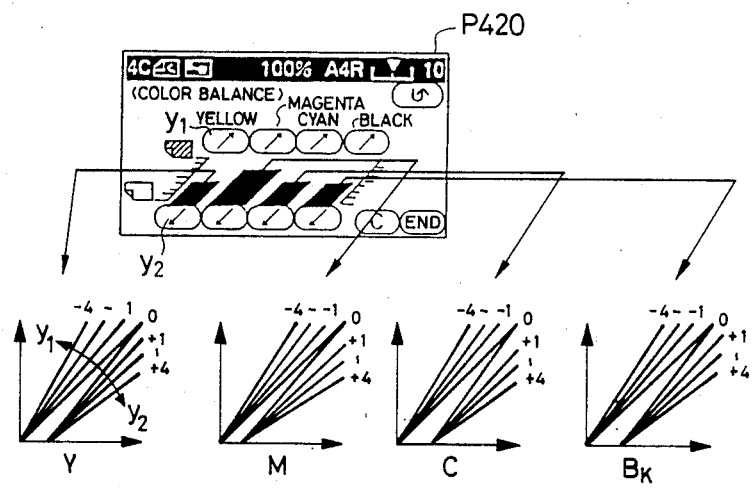

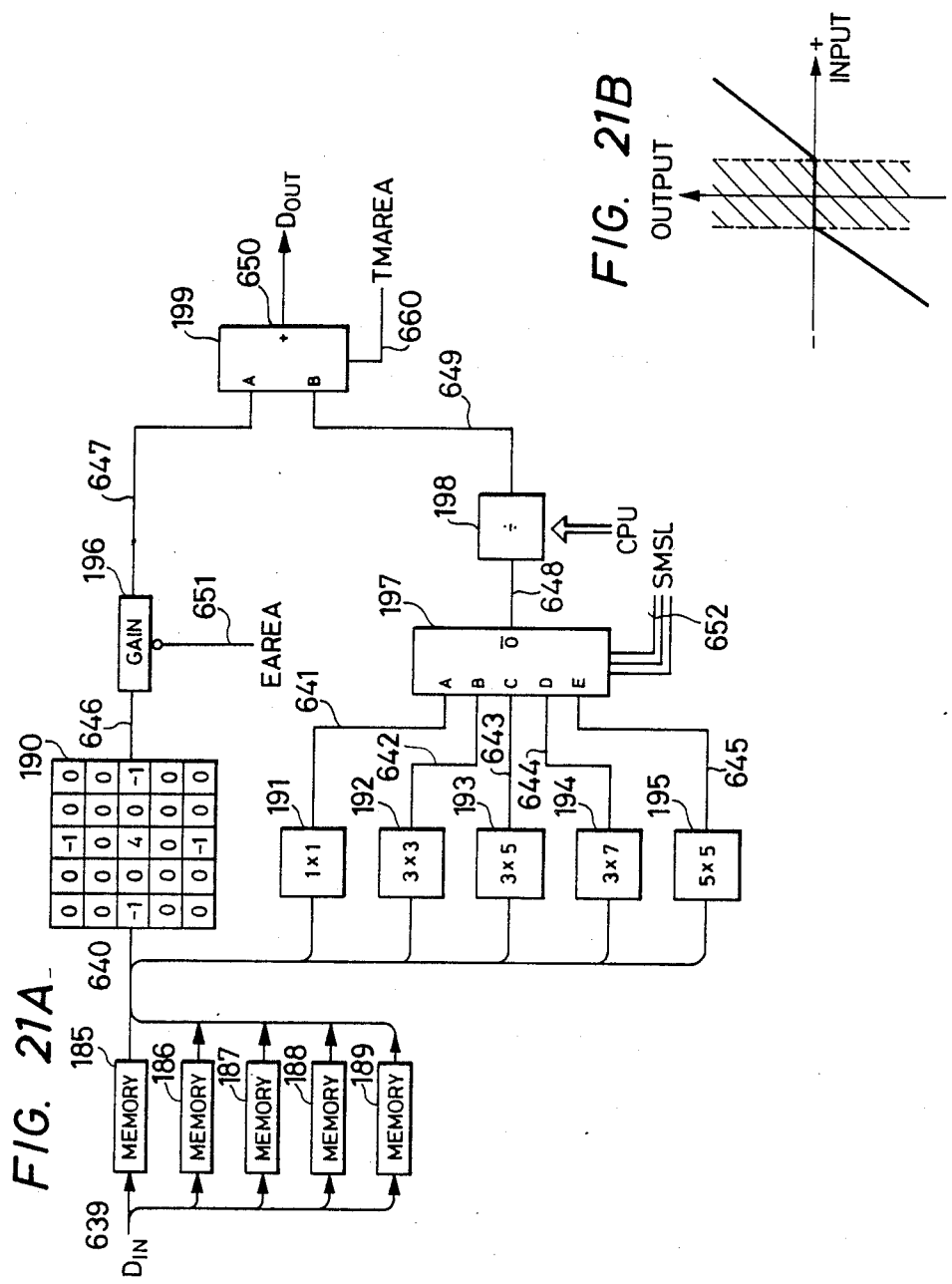

P430

660-1

660-2

FIG. 35A
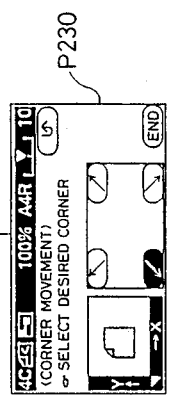
P230
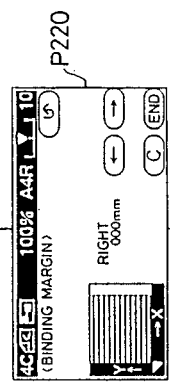
P220
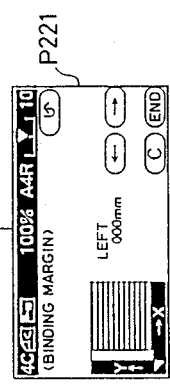
P221
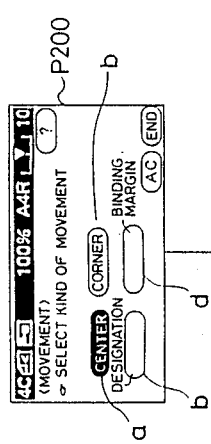
P200
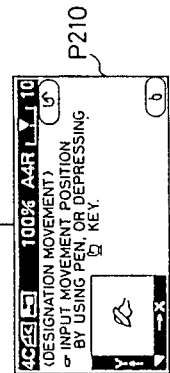
P210
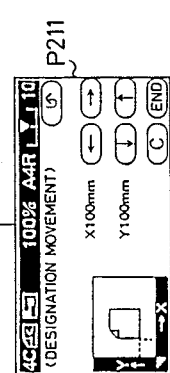
P211
FIG. 35B
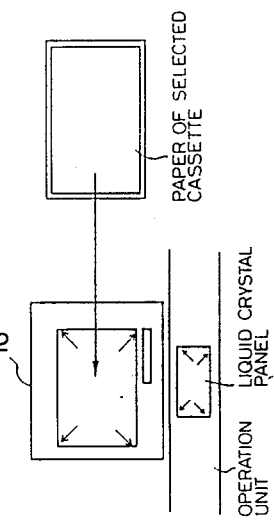

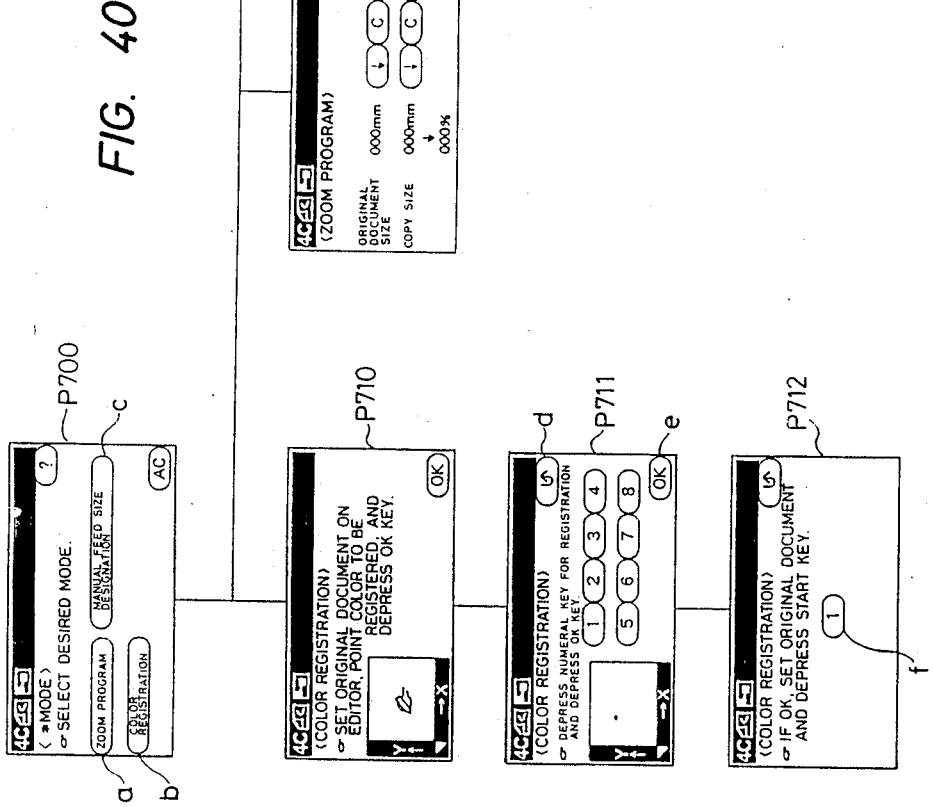

MONOCHROME IMAGE — MOVEMENT COLOR IMAGE AREA — MOVED AREA — (EQUI MAG)

WHITE IMAGE — (XY SAME RATE AUTO MAG CHANGE)

MONOCHROME IMAGE — WHITE IMAGE — (EQUI MAG)

(XY INDEPENDENT AUTO MAG CHANGE)

MONOCHROME ORIGINAL DOCUMENT

COLOR ORIGINAL DOCUMENT

PRINT AFTER INSERTION SYNTHESIZING

FIG. 45

| STANDARD COLOR | YELLOW COMPONENT | MAGENTA COMPONENT | CYAN COMPONENT | BLACK COMPONENT |
|---|---|---|---|---|
| YELLOW | 80H | 00H | 00H | 00H |
| MAGENTA | 00H | 80H | 00H | 00H |
| CYAN | 00H | 00H | 80H | 00H |
| BLACK | 00H | 00H | 00H | 80H |
| RED | 80H | 80H | 00H | 00H |
| GREEN | 80H | 00H | 80H | 00H |
| BLUE | 00H | 80H | 80H | 00H |

COMPARISON OF EACH COLOR COMPONENT
IN STANDARD COLOR DESIGNATION
(WHITE IMAGE = 00, BLACK = FFH)

COLOR FILM READING APPARATUS PROVIDING HIGH-GRADATION COLOR SIGNALS

BACKGROUND OF THE INVENTION

1. Field of the Invention

The present invention relates to an image forming apparatus for reading an image from a film-type original document such as a color negative film or a color positive film and/or from a reflection-type original document to print a copy on which an image is formed through various image processings.

2. Related Background Art

Shading correction data has heretofore been obtained by illuminating a white plate by means of an exposure lamp or by introducing the light from the exposure lamp directly into a sensor. However, in the case of a color negative film, the density value of its orange base corresponds to a highlight value. Therefore, no density values within a range between the quantity of illumination light and the density value of the orange base are employed in signal processing. As a result, the dynamic range of a read signal is reduced and it is therefore impossible to obtain signals which can realize a high-gradation image.

To eliminate such disadvantage, the U.S. patent application Ser. No. 057,657, now U.S. Pat. No. 4,833,532, of the present applicant proposes that, in the case of a negative film, the gamma conversion characteristics of the film is modified to nullify the density of the orange base thereof.

However, even if such a gamma conversion is uniformly performed in accordance with the kind of film, the specific characteristics of the film make it difficult to perform an optimum control.

The U.S. patent application Ser. No. 013,119, filed on Feb. 20, 1987 by the present applicant, proposes a technique of reading the density of the orange base of a film to control the quantity of light or the gain thereof. However, there continues to be a problem in that it is impossible to correct the distribution of illuminance and the non-uniformity of sensitivity due to a difference in position between sensors.

SUMMARY OF THE INVENTION

It is therefore an object of the present invention to generating a color-film reading apparatus which is capable of providing high-gradation color signals even from a color negative film.

It is another object of the present invention to provide a color-film reading apparatus which is capable of generating high-gradation color signals from either of color negative and positive films.

It is another object of the present invention to provide a color-film reading apparatus capable of setting reading parameters by employing illumination light projected onto an unexposed portion of the film in the case of a color negative film and, in the case of a color positive film, by directly using illumination light which does not pass through the film.

It is another object of the present invention to provide a color-film reading apparatus capable of generating shading correction data for shading correcting means by employing illumination light projected onto an unexposed portion of a color negative film.

It is another object of the present invention to provide a color-image forming apparatus capable of reproducing high-gradation color images from a color film.

A first feature of the present invention resides in a color film reading apparatus comprising holding means for holding a color negative film therein; illuminating means for projecting illumination light onto the color negative film; reading means for reading image data from the color negative film; shading correcting means for performing shading correction; and controlling means for controlling the reading means to cause the reading means to read data relative to an unexposed portion of the color negative film to thereby obtain shading correction data for the shading correcting means.

A second feature of the present invention resides in a film reading apparatus comprising selecting means for selecting the kind of film; holding means for holding the film therein; illuminating means for projecting illumination light onto the film; reading means for reading image data from the film; and controlling means for setting parameters used for an image processing, the controlling means setting the parameters on the basis of the image data read from an unexposed portion of the film in a case where the film is a negative film while in the case of a positive film the controlling means sets the parameters on the basis of data obtained from the illumination light.

A third feature of the present invention resides in a film reading apparatus comprising setting means for setting the kind of film; holding means for holding the film; illuminating means for projecting illumination light onto the film; reading means for reading image data from the film; detecting means for detecting from the output of the reading means the lightness characteristics of the image data of the film; and controlling means for causing the quantity of light emitted from the illuminating means to vary in accordance with the detection output of the detecting means and the kind of film.

A fourth feature of the present invention resides in a color film reading apparatus comprising illuminating means for projecting illumination light onto a color film; photoelectric conversion means for receiving the illumination light to convert the illumination light into an electrical signal; and shading correction means for effecting shading correction of the photoelectric conversion means, wherein in the case of a color negative film the correction data for the shading correction means is obtained employing the illumination light projected onto an unexposed portion of the color negative film while in the case of a color positive film the correction data is obtained directly employing the illumination light.

A fifth feature of the presentation resides in an image forming apparatus comprising exposure means for exposing a reflection-type original document; projecting means for projecting a film-type original document; reading means for reading image signals from the reflection-type original document and the film-type original document; image forming means for forming a reproduced image in accordance with the image signals; controlling means for controlling the gradation of an image formed by the image forming means, wherein the controlling means controls the image forming means so that the gradation may increase while an image is being formed from the film-type original document.

Further objects, features and advantages of the present invention will become apparent from the following description of a preferred embodiment of the present invention with reference to the accompanying drawings.

BRIEF DESCRIPTION OF THE DRAWINGS

FIG. 3 illustrates the protocol for a motor driver and a CPU incorporated in the embodiment;

FIG. 6A diagrammatically illustrates the arrangement of color CCD sensors in the video processing unit shown in FIG. 5;

FIG. 6B is a timing chart of the signal of each color CCD sensor shown in FIG. 6A;

FIG. 14 illustrates the spectral characteristic of each read sensor in the embodiment;

FIG. 15 illustrates the spectral characteristics of developed color toner;

FIG. 16B is a table illustrating the relationship between selection signals $C_0$, $C_1$, $C_2$ and each color signal;

FIGS. 17A, 17B, 17C, 17D, 17E, 17F and 17G are views illustrating the generation of each area signal in the video processing unit shown in FIG. 5;

FIGS. 18A, 18B, 18C, 18D and 18E are views illustrating color conversion in the video processing unit shown in FIG. 5;

FIGS. 19A, 19B, 19C, 19D, 19E, and 19F are views illustrating gamma conversion for controlling color balance and the density of color in the video processing unit shown in FIG. 5;

FIGS. 21A, 21B, 21C, 21D, 21E, 21F, and 21G are views illustrating edge enhancement and smoothing in the video processing unit shown in FIG. 5;

FIGS. 28A and 28B are views illustrating the relationship between a triangle wave and a period during which a laser continues to be ON;

FIGS. 35A and 35B illustrate the operation of a movement mode;

FIG. 40 illustrates the operation of a registration mode;

FIG. 45 is a list illustrating the color components of a standard color;

DESCRIPTION OF THE PREFERRED EMBODIMENT

A preferred embodiment of the present invention will be described in detail below with reference to the accompanying drawings.

Figure 1:
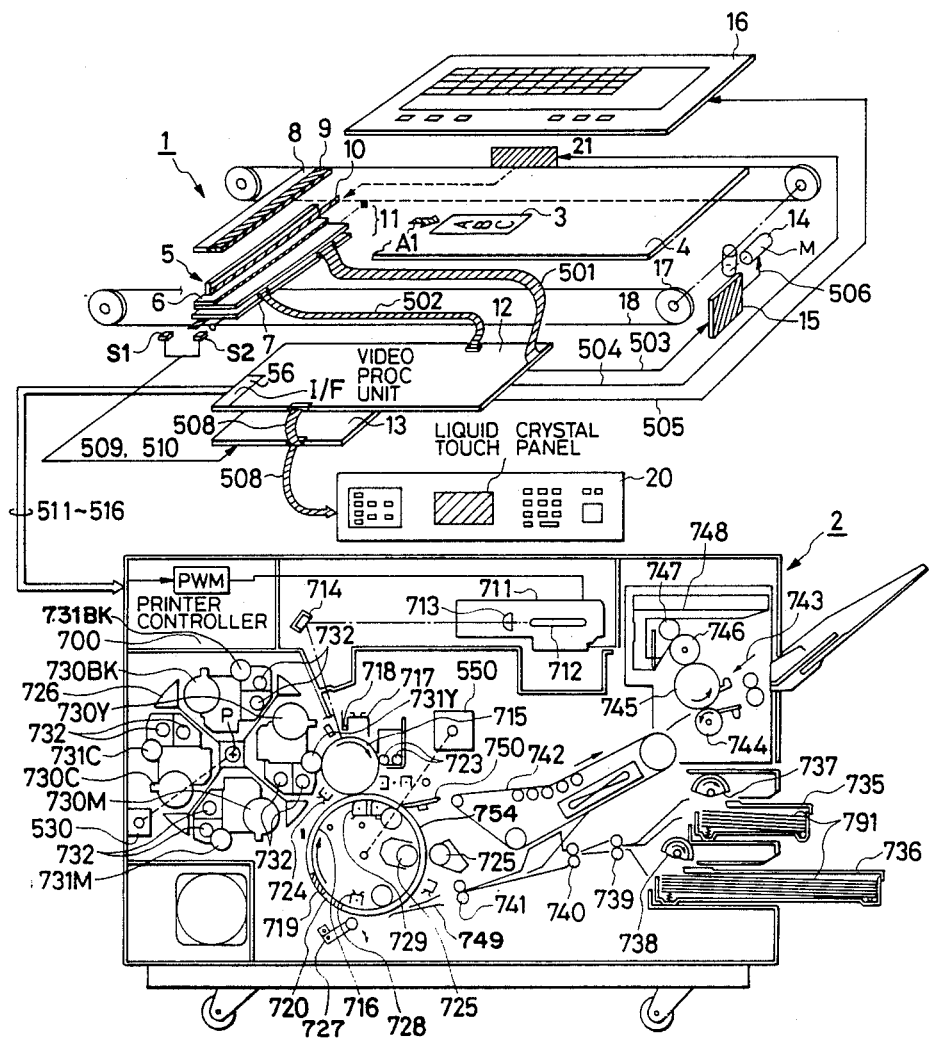
FIG. 1 diagrammatically illustrates one preferred embodiment of a digital color copy machine in accordance with the present invention.

FIG. 1 diagrammatically illustrates one example of the internal construction of a digital color image processing system in accordance with the present invention. As illustrated, the present system has a digital color image reader 1 (hereinafter referred to as "color reader 1") at its upper portion and a digital color image printer 2 (hereinafter referred to as "color printer 2") at its lower portion. The color reader 1 reads color image data corresponding to each color from an original document by means of a photoelectric conversion device, such as a CCD, and color separating means which will be described later, to convert the thus-read data into electrical digital video signals. The color printer 2 is an electrophotographic type of laser beam color printer which reproduces a color image corresponding to each color in accordance with the digital video signals to thereby record an digital dot image on recording paper through repetition of transfer.

First, the diagrammatic construction of the color reader 1 will be described below.

An original document is indicated at 3, and a platen glass 3 carries the original document 4 thereon. A halogen exposure lamp 10 emits exposure light which scans the original document 3. A rod array lens 5 serves to converge the light image reflected from the original document 3 and input the light image to an equi-magnification full color sensor 6. Members 5, 6, 7 and 10, which constitute in combination an original document scan unit 11, integrally scan in the direction of an arrow A1 for the purpose of exposure. A color separation video signal of each line which is read through exposure scanning is amplified to a predetermined voltage by a sensor output signal amplification circuit 7. Thereafter, the thus-obtained signal is input to a video processing unit which will be described below, and is subjected to predetermined signal processing in the video processing unit. This signal processing will be described in further detail later. A coaxial cable 501 enables signals to be transmitted therethrough with high fidelity. A signal line 502 allows drive pulses to be supplied therethrough to the equi-magnification full color sensor 6, and all required drive pulses are generated in the video processing unit 12. A white plate 8 and a black plate 9 are respectively used in correcting the white and black levels of video signals (white correction and black correction will be described later). The white plate 8 and the black plate 9 are illuminated by the halogen exposure lamp 10 so that signal levels indicative of predetermined densities corresponding to the respective plates 8 and 9 can be obtained. These signal levels are used to correct the white and black levels of video signals. A control unit 13 having a microcomputer controls all the operations of the color reader 1; for example, display control and key input control on an operation panel 20 as well as the control of the video processing unit 12, through a bus 508; detection of the position of the original document scan unit 11 through signal lines 509 and 510 by means of position sensors S1 and S2; control of a stepping motor drive circuit for pulsing a stepping motor 14 which causes the scan unit 11 to travel through a signal line 503; ON/OFF control and light control of the halogen exposure lamp 10 by means of an exposure lamp driver 21 through a signal line 504, and a digitizer 16 and its internal keys as well as its display unit through a signal line 505. The color video signals which have been read by the aforesaid exposure scan unit 11 during exposure scan of the original document 3, are input to the video processing unit 7 through the amplifier circuit 12 and the signal line 501. In the unit 12, those color video signals are subjected to various processings and are in turn transmitted through an interface circuit 56 to the printer 2.

The following is a diagrammatic description of the construction of the color printer 2. A scanner 711 has a laser-beam generation unit for converting video signals input from the color reader 1 into light signals, a polygon mirror 712 having a polyhedral form (for example an octahedron), a motor (not shown) for rotating the mirror 712, an f/θ lens (image forming lens) 713, and so forth. A reflection mirror 714 changes the optical path of a laser beam. A photosensitive drum is indicated at 715. The laser beam emitted from the laser-beam generation unit is reflected by the polygon mirror 712, passes through the lens 713, is again reflected by the mirror 714, and scans the surface of the photosensitive drum 715 in a linear form (raster scan) to form a latent image corresponding to an original document image.

Around the photosensitive drum 715 are disposed a primary electrostatic charger 717, a whole image exposure lamp 718, a cleaner unit 723 for recovering residual toner which has not been transferred, and a pretransfer electrostatic charger 724.

A development unit 726 develops the electrostatic latent image formed in the surface of the photosensitive drum 715 by exposure to the laser beam. Development sleeves 731Y, 731M, 731C and 731Bk come into contact with the photosensitive drum 715 to directly develop the latent image. Toner hoppers 730Y, 730M, 730C and 730Bk accommodate spare toner. Screws 732 are operated to supply developers. The developer unit 726 is constituted by the sleeves 731Y to 731Bk, the toner hoppers 730Y to 730Bk, and the screws 732. These members are disposed around the axis of a rotating shaft P of the development unit 726. For instance, when an yellow toner image is to be formed, development is performed with yellow toner in the illustrated position. When a magenta toner image is to be formed, the development unit 726 is rotated about the shaft P to cause the development sleeve 713M of a magenta development section to move into contact with the photosensitive drum 715. Cyan and black are also developed in the same manner as described above.

A transfer drum 716 serves to transfer to paper the toner image formed on the photosensitive drum 715, and an actuator plate 719 is used to detect the position of the transfer drum 716 which is moving. A position sensor 720 is disposed close to the actuator plate 719 for detecting the fact that the transfer drum 716 has moved to its home position. In addition to these members 719 and 720, a transfer drum cleaner 725, a paper pressing roller 727, an electrostatic decharger 728, and a transfer electrostatic charger 729 are disposed around the transfer roller 716. Paper supply cassettes 735 and 736 accommodate sheets of paper, and the sheets are fed by sheet feed rollers 737 and 738 from the cassettes 735 and 736, respectively. Timing rollers 739, 740 and 741 cooperate with one another to adjust the timing of supply and transport of the sheets. The sheets fed through these rollers are guided by a sheet guide 749, and is wound around the transfer drum 716 with its leading end retained by a gripper which will be described later. Then, the process proceeds to an image formation step.

A drum rotating motor 550 causes the photosensitive drum 715 and the transfer drum 716 to rotate in synchronization with each other. A peeling pawl 750 removes the sheet from the transfer drum 716 after completion of the image formation step. A feed belt 742 feeds the thus-removed sheet to an image fixing unit 743, in which the image formed on the sheet is fixed. The image fixing unit 743 includes a pair of heat-pressure rollers 744 and 745.

The control unit 13 of the color reader 1 will now be described with reference to FIG. 2.

Control Unit 13

The control unit 13, which includes a CPU 22 as a microcomputer, organically controls video signal processing, the lamp driver 21 for exposure and scan, the stepping motor driver 15, the digitizer 16, and the operation panel 20 through the respective signal lines 508 (bus), 504, 503 and 505 in accordance with a program ROM 23, a RAM 24 and a RAM 25, in order to obtain a desired copy. The non-volatility of the RAM 25 is ensured by a battery 31. The signal line 505 is a generally used signal line for serial communication, and an operator inputs a desired command through the digitizer 16 in accordance with the protocol of an interface provided between the CPU22 and the digitizer 16. The operator inputs through the signal line 505 various edit commands relative to the original document, such as movement, designation of coordinates in a synthesizing mode, area designation, copy mode designation and zoom magnification designation. The CPU 22 transmits a command relative to scan speed, distance, movement in one direction, or movement in opposite directions, through the signal line 503, to the motor driver 15. In accordance with the command issued by the CPU 22, the motor driver 15 inputs a predetermined pulse to the stepping motor 14 to cause it to operate. Serial I/F circuits 29 and 30 are of a general type which is realized by a serial I/F LSI such as Intel 8251. Although not shown, the digitizer 16 and the motor driver 15 have similar circuits. The protocol of the CPU 22 and the motor driver 15 is shown in FIG. 3.

Sensors S1 and S2 serve to detect the position of the original document exposure scan unit (indicated at 11 in FIG. 1). The sensor S1 corresponds to the home position in which the white level of the video signal is corrected. The sensor S2 detects the fact that the original document exposure scan unit 11 is located at the forward edge of an image, and this location is a reference position of the document original.

Printer Interface

Signals ITOP, BD, VCLK, VIDEO, HSYNC and SRCOM (511 to 516) are interface signals which flow between the color reader 1 and the color printer 2 shown in FIG. 1. All the video signals VIDEO (514), which are obtained by the image reading operations of the color reader or reader unit 1, are transmitted to the color printer 2. The signal ITOP (511) is a synchronizing signal relative to the direction of image feed (hereinafter referred to as "sub-scan direction"). The signal ITOP is generated each time one image plane is transmitted. That is to say, in a case where an image consisting of four colors (yellow, magenta, cyan and black) is transmitted, one signal ITOP is generated for each color, i.e., a total of four signals are generated. This signal generation is synchronized with the rotations of the transfer drum 716 and the photosensitive drum 715 so as to cause the leading end of a transfer sheet to coincide with the forward end of an image on the original document when a toner image is transferred to the transfer sheet wound around the transfer drum 716 in the color printer 2 at a contact point of the photosensitive drum 715 and the transfer sheet. The signal ITOP is transmitted to the video processing unit in the reader unit 1, and is then input to the control unit 13 as an interrupt (signal 511). The CPU 22 performs image control in the sub-scan direction for an edit operation with reference to the interrupt of ITOP. The signal BD (512) is a synchronizing signal in the raster-scan direction (hereinafter referred to as "main-scan direction"), which is generated once in each rotation of the polygon mirror 712, that is, once in each raster scan. After being read into the reader unit 1, the video signals of each line relative to the main-scan direction are transmitted to the color printer 2 in synchronization with the signal BD (512). The signal VCLK (513) is a synchronizing clock with reference to which the 8-bit digital bit video signal 514 is transmitted to the color printer 2. For example, as shown in FIG. 4B, the video data 514 is transmitted through flip-flops 32 and 35 in response to the signal VCLK. The signal HSYNC (515) is a main-scan synchronizing signal which is generated from the BD signal 512 in synchronization with the VCLK signal 513 and which has the same cycle as the signal BD. Strictly speaking, the video signal 514 is transmitted in synchronization with the HSYNC signal 515. The BD signal 512 contains significant amounts of jitters of the motor (not shown) for rotating the polygon mirror 712, since the BD signal is generated in synchronization with the rotation of the polygon mirror. If the video signal 514 is transmitted in synchronization with the BD signal, jitters are likely to appear in the image. For this reason, the HSYNC signal 515 is needed which is generated from the BD signal in synchronization with the VCLK signal free of jitters. SRCOM is a signal line for half-duplex bidirectional serial communication. As shown in FIG. 4C, in the signal line SRCOM, a command CM is transmitted in synchronization with an 8-bit serial clock SCLK during the duration of a synchronization signal CBUSY (command busy) which is transmitted from the reader unit 1, and, in response to the command CM, a status signal ST is transmitted from the printer unit 2 in synchronization with an 8-bit serial clock SCLK during the period of a signal SBUSY (status busy). This timing chart illustrates that a status "3CH" is transmitted in response to a command "8EH". This communication line SRCOM enables mutual communication between the read unit 1 and the printer unit 2, for example, the transmission of various commands from the reader unit to the printer unit, such as selection of color modes, or selection of cassettes or transmission of status information about the printer unit such as the occurrence of a jam, the absence of paper or a wait command.

Figure 4A:
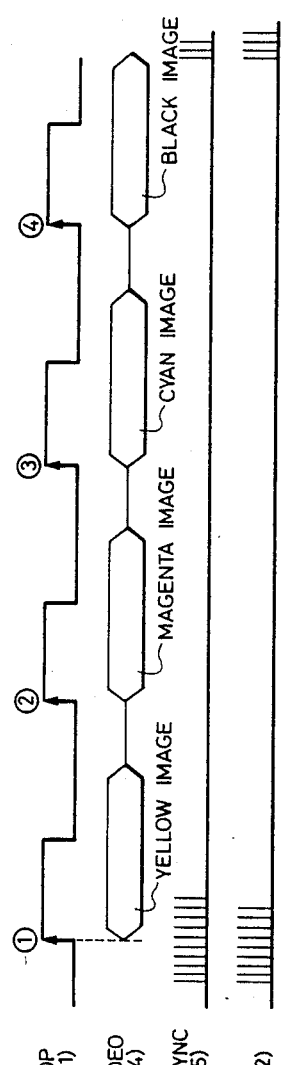
FIG. 4A is a timing chart illustrating control signals transmitted between the reader unit and a printer unit of the embodiment.
Figure 4B:
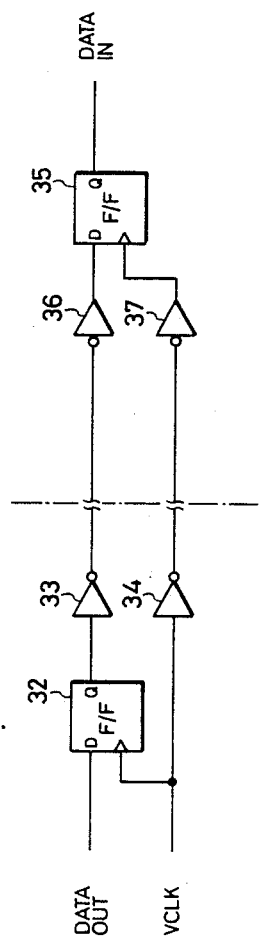
FIG. 4B is a circuit diagram illustrating the transmission of video signals between the reader unit and the printer unit of the embodiment.
Figure 4C:
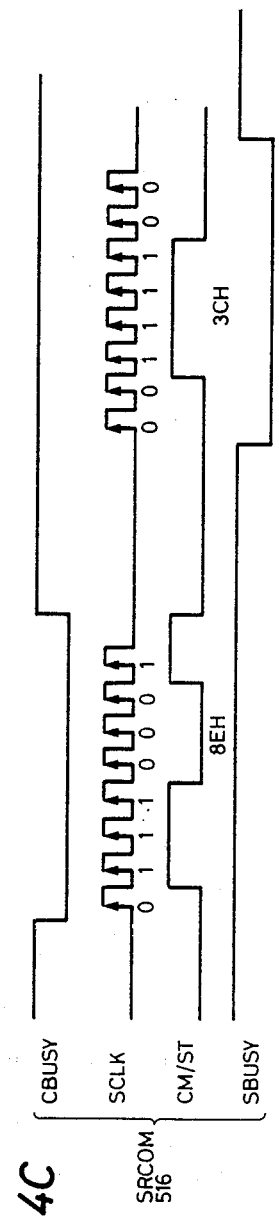
FIG. 4C is a timing chart of each signal transmitted through a signal line SRCOM of the embodiment.

FIG. 4A is a timing chart illustrating that one full color image consisting of four colors is transmitted on the basis of the signals ITOP and HSYNC. The ITOP signal 511 is generated once during each rotation or two rotations. An yellow image is transmitted from the reader unit 1 to the printer unit 2 at a time (1), a magenta image at a time (2), a cyan image at a time (3), and a black image at a time (4), whereby a full color image consisting of superimposed four colors is formed on the transfer paper. For example, if A-3 size image has a length of 420 mm and an image density of 16 pel/mm in the feed direction, 420×16=6720 HSYNC signals are transmitted and at the same time are supplied to a clock input of a timer circuit 28 of the control unit 13. After a predetermined number has been counted, an interrupt signal HINT 517 is supplied to the CPU 22. Thus, the CPU 22 performs image control in the feed direction, such as extraction or movement.

Video Processing Unit

Figure 5:
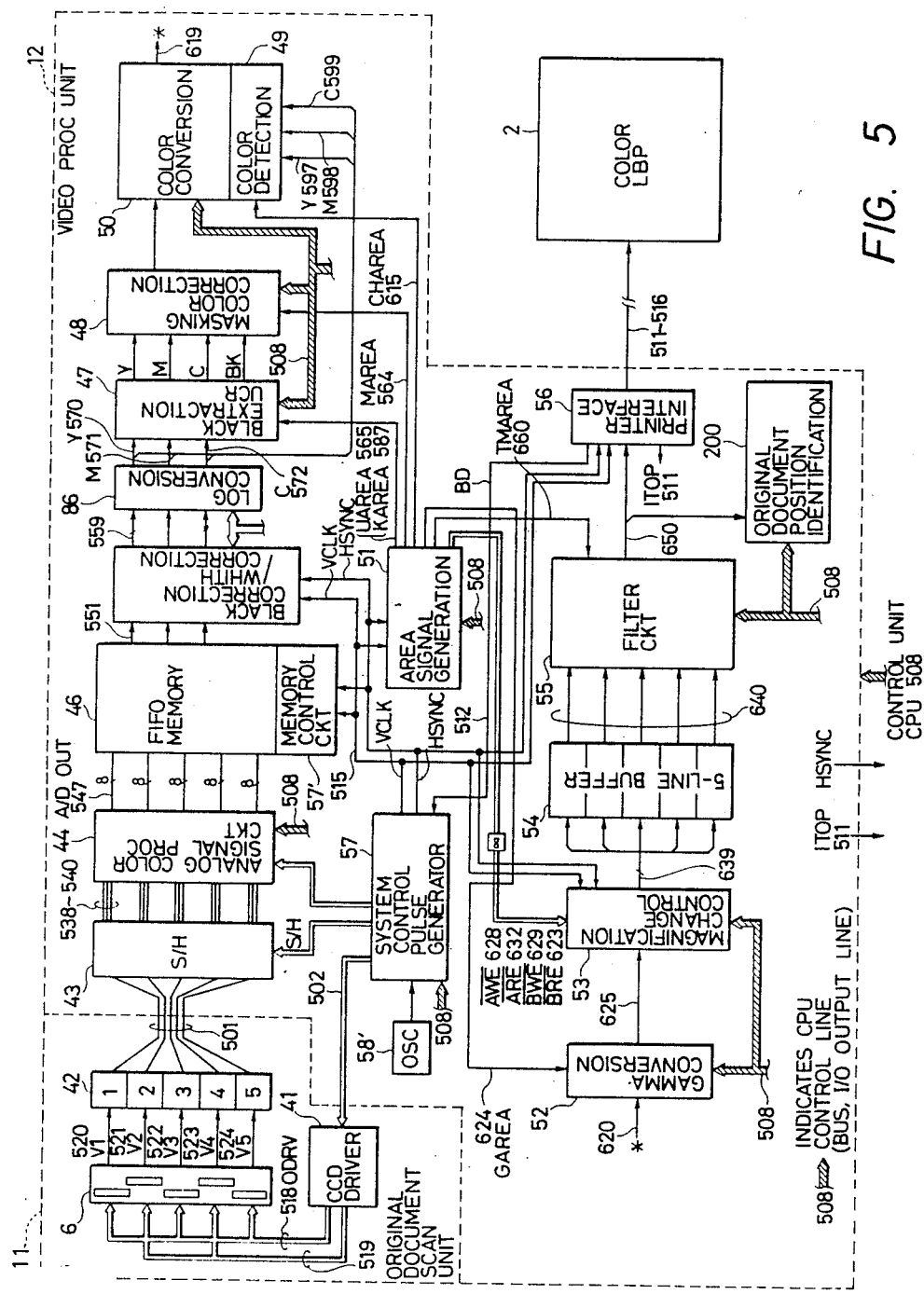
FIG. 5 is a block diagram illustrating the details of a video processing unit incorporated in the control unit shown in FIG. 2.

The video processing unit 12 will be described in detail below with reference to FIG. 5.

The original document is illuminated by the exposure lamp 10 (FIGS. 1 and 2), and reflected light is read by the color read sensor 6 in the original document scan unit 11. The light thus read is separated into the above-described respective color images, and each of these color images is then amplified to a predetermined level. A CCD driver 41 supplies a pulse signal for driving the color read sensor 6, and a required source pulse is generated by a system control pulse generator.

FIGS. 6A and 6B illustrate the color read sensor 6 and its drive pulses. As shown in FIG. 6A, the color read sensor 6 used in this embodiment is divided into five parts (CCDs) in the main-scan direction. One pixel has dimensions of 62.5 $\mu$m by 62.5 $\mu$m (about 1/16 mm by about 1/16 mm), and, since, as illustrated, each pixel is divided into three parts G, B and R in the main-scan direction, each part includes 1,024 pixels arranged in the main-scan direction, that is, a total of 1024×3=3072 effective pixels. Each chip 58 to 62 is formed on the same ceramic substrate, and first, third and fifth sensors 58, 60 and 62 are disposed on a line LA while second and fourth sensors 59 and 61 are disposed on a line LB spaced apart from the line LA by a distance equivalent to four lines (62.5 $\mu$m×4=250 $\mu$m). During reading of the original document, the color read sensor 6 scans in the direction of an arrow AL. The first, third and fifth CCDs are synchronously driven by a drive pulse group ODRV 518 while the second and fourth CCDs are synchronously driven by a drive pulse group EDRV 519. The former and latter synchronous drives are performed independently of each other. Pulses O$\phi$1A and O$\phi$2A contained in the pulse group ODRV 518 as well as pulses E$\phi$1A and E$\phi$2A contained in the pulse group EDRV 519 serve as charge transfer clocks in the respective CCD sensors while pulses ORS and ERS contained in the groups 518 and 519 serve as charge reset pulses in the respective CCD sensors. In order to prevent mutual interference between one group of the first, third and fifth sensors and the other group of the second and fourth sensors or to limit the level of noise, the pulse group ODRV 518 and the pulse group EDRV 519 are generated in synchronization with each other so that they may not contain any jitter. For this reason, these pulses are generated from a single reference oscillation source OSC 58' (FIG. 5).

Figure 7A:
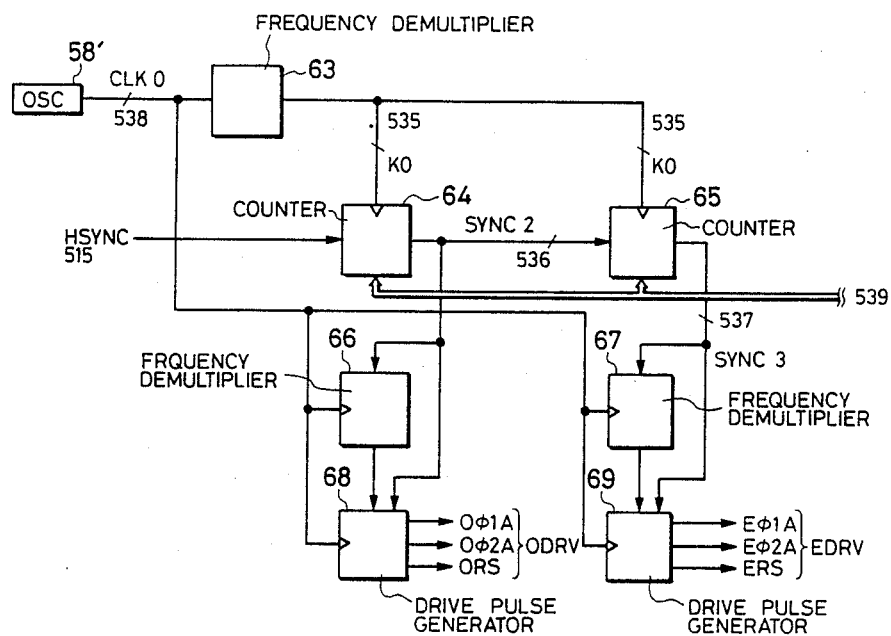
FIG. 7A is a block diagram illustrating a CCD drive circuit (a circuit in a system control pulse generator 57)
Figure 7B:
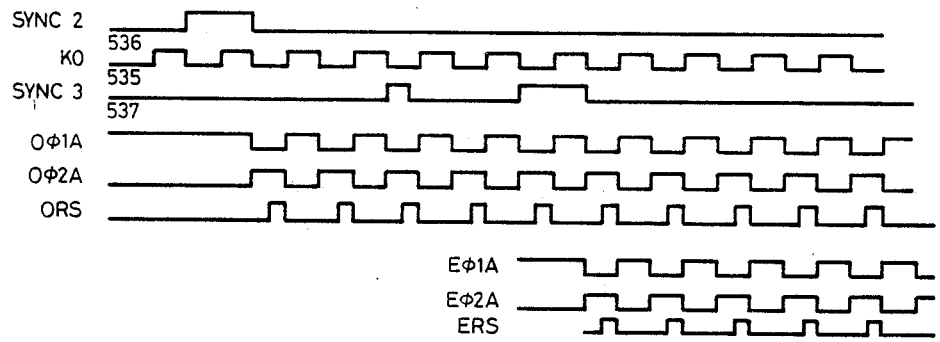
FIG. 7B is a timing chart of the signal of each portion of the circuit shown in FIG. 7A.

FIG. 7A is a block diagram of a circuit for generating the pulse groups ODRV 518 and EDRV 519, and FIG. 7B is a timing chart of each signal of the circuit. An original clock CLKO generated by the single reference oscillation source OSC 58' incorporated in the FIG. 5 system control pulse generator 57 is demultiplied into a clock KO 535. The demultiplied clock KO 535 is a clock for generating reference signals SYNC$_2$ and SYNC$_3$ which respectively determine the timing of generation of the pulses ODRV and EDRV. The generation timing of the signals SYNC2 and SYNC3 is determined in accordance with preset values of the presettable counters 64 and 65 which are preset through a signal line 539 connected to the CPU bus. The signals SYNC2 and SYNC3 respectively initialize frequency demultipliers 66 and 67 as well as drive pulse generators 68 and 69. More specifically, the pulse groups ODRV 518 and EDRV 519 are generated from the pulse CLK0 output from the single oscillation source OSC 58' on the basis of the demultiplied clocks which are synchronously generated and with reference to the signal HSYNC 515 which is input to this illustrated block. Accordingly, the pulse groups ODRV 518 and EDRV 519 are obtained as synchronized signals free of jitters, whereby it is possible to prevent the turbulence of the signals from being caused by interference between the respective sensors. In this manner, the sensor drive pulses ODRV 518 and EDRV 519 are generated in synchronization with each other, and the former pulse ODRV 518 is supplied to the first, third and fifth sensors while the latter pulse EDRV 519 is supplied to the second and fourth sensors. In response to these pulses, the respective sensors 58, 59, 60, 61 and 62 output video signals V1, V2, V3, V4 and V5, independently of one another and in synchronization with the drive pulses. These video signals are amplified to predetermined voltages at independent channels 40 of the amplifier circuit 42. The signals V1, V3, V5 and the signals V2, V4 are input to the video processing unit through the coaxial cable 501 (FIG. 1) at the timing of a signal OOS 529 and at the timing of a signal EOS 534, respectively, as shown in FIG. 6B.

Figure 8A:
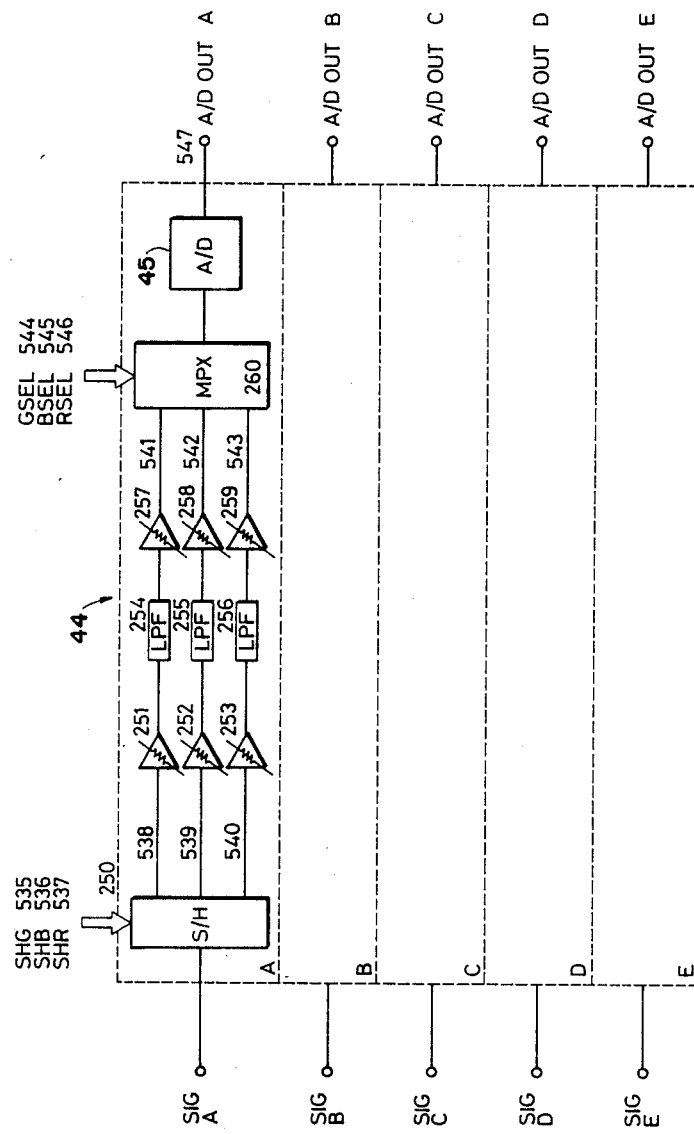
FIG. 8A is a block diagram illustrating an analog color signal processing circuit 44 in FIG. 5.
Figure 8B:
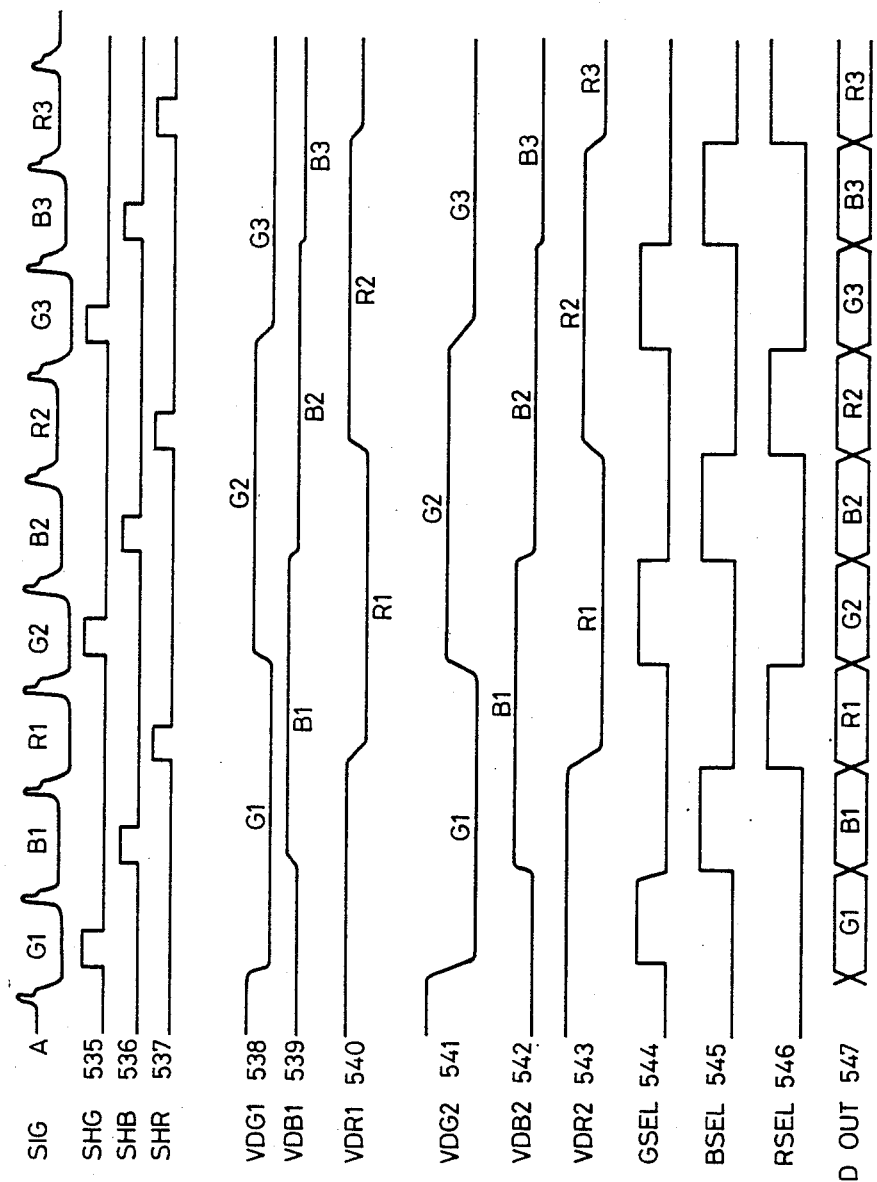
FIG. 8B is a timing chart of the signal of each portion of the circuit shown in FIG. 8A.

The color video signals, which are input to the video processing unit 12 and which are obtained by dividing an image corresponding to the original document into five parts, are separated into three colors of G (green), B(blue) and R(red) by a sample and hold circuit S/H 43. Therefore, after sampling and holding, the number of signal processing lines becomes 3×5=15. FIG. 8B is a timing chart illustrating that the video signal input to one channel is subjected to a sample and hold processing followed by amplification and is then input to an A/D conversion circuit 45, to thereby obtain multiplexed digital data A/Dout. FIG. 8A is a block diagram illustrating this processing.

Figure 8C:
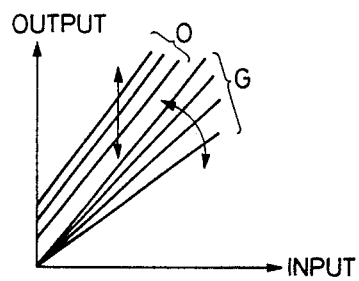
FIG. 8C is a graph illustrating the characteristics of converted input and output in the circuit shown in FIG. 8A.

Each of the analog color video signals read by the aforesaid 5-chip equi-magnification color read sensors is input to a corresponding one of the five channels of an analog color signal processing circuit 44 shown in FIG. 8A. Since circuits A to E of the channels are the same as one another, only the circuit A is described in conjunction with the wave timing shown in FIG. 8B. Analog color signals represented at SiGA in FIG. 8B are input in the sequence of G to B to R. A sample and hold circuit (S/H) 250 converts in parallel the analog color signals into signals VDG1 (538), VDB1 (539), and VDR1 (540) in response to sample and hold pulses SHG 535, SHB 536 and SHR 537, respectively. The signals 538, 539 and 540 which are separated in correspondence with the colors R, G and B are subjected to soffset adjustment (a characteristic O in FIG. 8C). Thereafter, these signals are input to low-pass filters (LPF) 254, 255 and 256, in which the bands other than signal components are cut off. Following gain adjustment in amplifiers 257, 258 and 259 (a characteristic G in FIG. 8C), the respective signals are multiplexed into one signal by an MPX 260 in response to pulses GSEL (544), BSEL (545) and RSEL (546), and are then converted into a digital value by A/D conversion circuit 45 (ADout 547). In this construction, since the A/D conversion is performed after the multiplexing of the MPX 260, five A/D converters are employed to convert color signals G, B and R at the five respective channels, i.e., fifteen color signals. The construction and operations of the circuits B to E are the same as those of the circuit A.

Figure 9A:
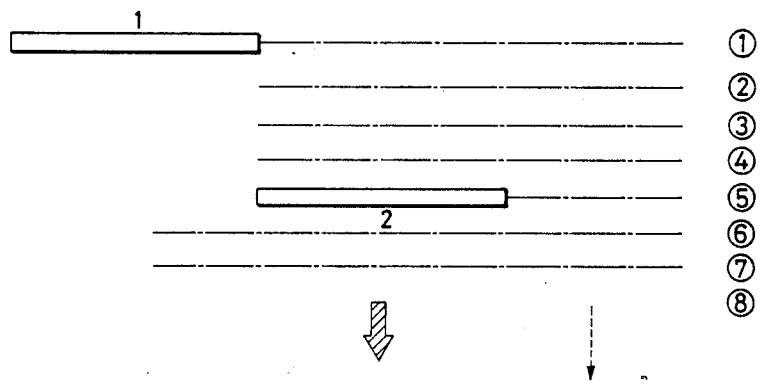
FIGS. 9A, 9B, 9C and 9D are views illustrating the manner in which each line signal is obtained through the staggered CCD sensors.

As described previously, in this embodiment, the original document is read by the five sensors which are arranged in a staggered manner in the main-scan direction, each of the sensors being spaced apart from an adjacent one in the sub-scan direction by a distance equivalent to four lines (62.5 $\mu m \times 4 = 250$ $\mu m$). Therefore, as shown in FIG. 9A, since channels 2 and 4 (corresponding to the second and fourth sensors) scan ahead of channels 1, 3 and 5 (corresponding to the first, third and fifth sensors), the reading positions of the former channels deviate from those of the latter channels. Accordingly, memories for a plurality of lines are employed to correctly combine the color signals supplied from these channels.

Figure 9B:
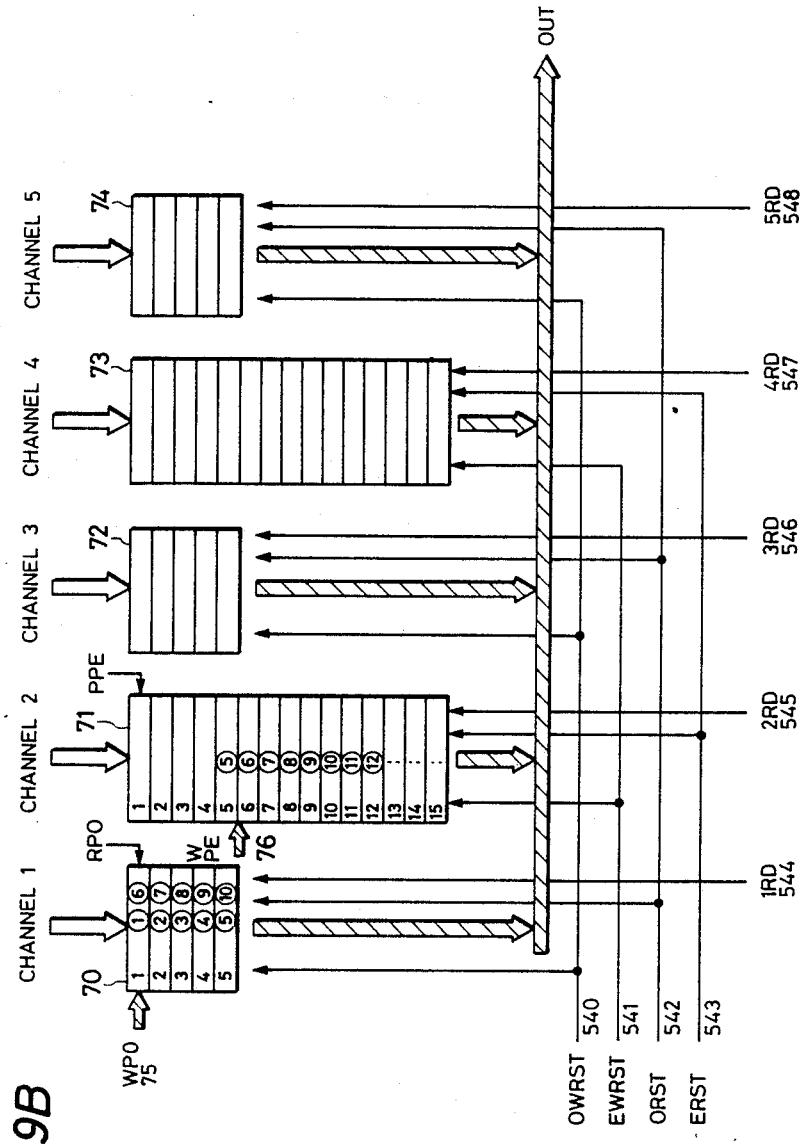

FIG. 9B illustrates the memory construction in this embodiment, memories 70 to 74 store signals equivalent to a plurality of lines and are arranged in a first-in first-out manner. More specifically, the memories 70, 72 and 74 each have a storage capacity of five lines while the memories 71 and 73 each have a storage capacity of five lines, provided that one line corresponds to 1,024 pixels. A set of data is written in line-by-line fashion at the point indicated by each line pointer WPO 75 and WPE 76. Each time the writing of one line has been completed, the pointer WPO or WPE is incremented by one. The pointer WPO 75 serves for the channels 1, 3 and 5 in common while the pointer WPE 76 serves for the channels 2 and 4 in common. Signals OWRST 540 and EWRST 541 respectively serve to initialize the values of the line pointers WPO 75 and WPE 76 to cause them to return to their respective start positions. Signals ORST 542 and ERST 543 initialize the value of read pointers (pointers during reading) to return to cause them to their respective start positions. The channels 1 and 2 will now be described by way of example. As shown in FIG. 9A, the channel 2 is disposed ahead of the channel 1 by a distance of four lines. Therefore, after the channel 2 has written a line (5) into the FiFo memory 71 and has passed four lines, the channel 1 writes the line (5). Accordingly, if the value of the memory write pointer WPO is incremented by four with respect to the value of the pointer WPE, the same line can be read from the FiFo memories of the channels 1, 3, 5 and the FiFo memories of the channels 2, 4 in accordance with the same read point values indicated by the pointers WPO and WPE. In this fashion, the deviation in the sub-scan direction is corrected. For example, in FIG. 9B, the pointer WPO of the channel 1 is located at a start line 1 while the pointer WPE of the channel 2 indicates a line 5 which is the fifth line as counted from the start line 1. If writing is started in this state, when the pointer WPO indicates "5", the pointer WPE indicates "9", with the result that the line (5) on the original document is written into the areas of the FiFo memories at which the pointer indicates "5". Subsequently, read pointers RPO and PPE can be likewise advanced to cyclically read out the data.

Figure 9C:
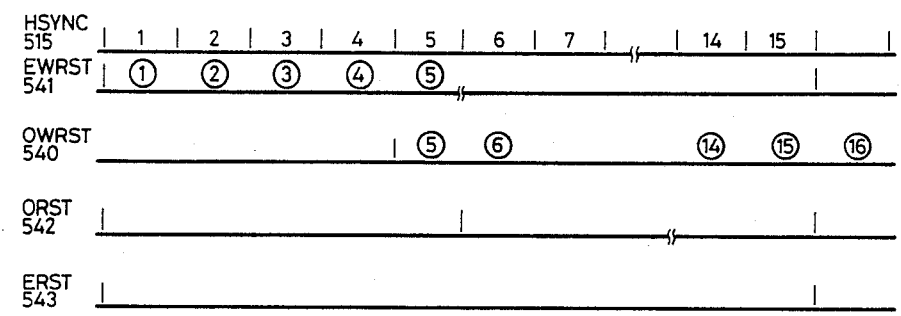

FIG. 9C is a timing chart illustrating the timing of signals for performing the above-described control. Image data is fed in line-by-line fashion in synchronization with the signal HSYNC 515. As illustrated, the signals EWRST 541 and OWRST 540 are generated with a time lag equivalent to four lines. The signal ORST 542 is generated at time intervals equivalent to the storage capacity of each FiFo memory 70, 72 and 74, that is, five lines. For a similar reason, the signal ERST 543 is generated at time intervals equivalent to fifteen lines. In the case of reading, data equivalent to one line is read from the channel 1 at a five-fold speed, and then from the channel 2 in the same manner. Subsequently, data of one line is read from each of the channels 3, 4, and 5 in this sequence. In this fashion, a signal consisting of a series of data read from the channels 1 to 5 is obtained during the period of one signal 1HSYNC.

Figure 9D:
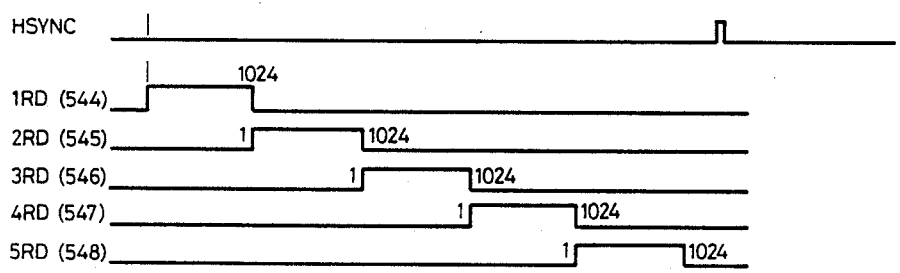

FIG. 9D illustrates the effective periods of the signals IRD (544) to 5RD (548) which enable reading at the respective channels. Control signals for controlling concatenation of the images from the channels employing the FiFo memories are generated by a memory control circuit 57' of FIG. 5. The circuit 57' is constituted by a discrete circuit such as TTL, but the description thereof is omitted since the main feature of the invention does not reside in this point. The above-described memories are normally provided in correspondence with three colors of blue, green and red which are contained in one image. However, since these memories have the same construction, the above description refers to the processing of one color only by way of example.

Figure 10A:
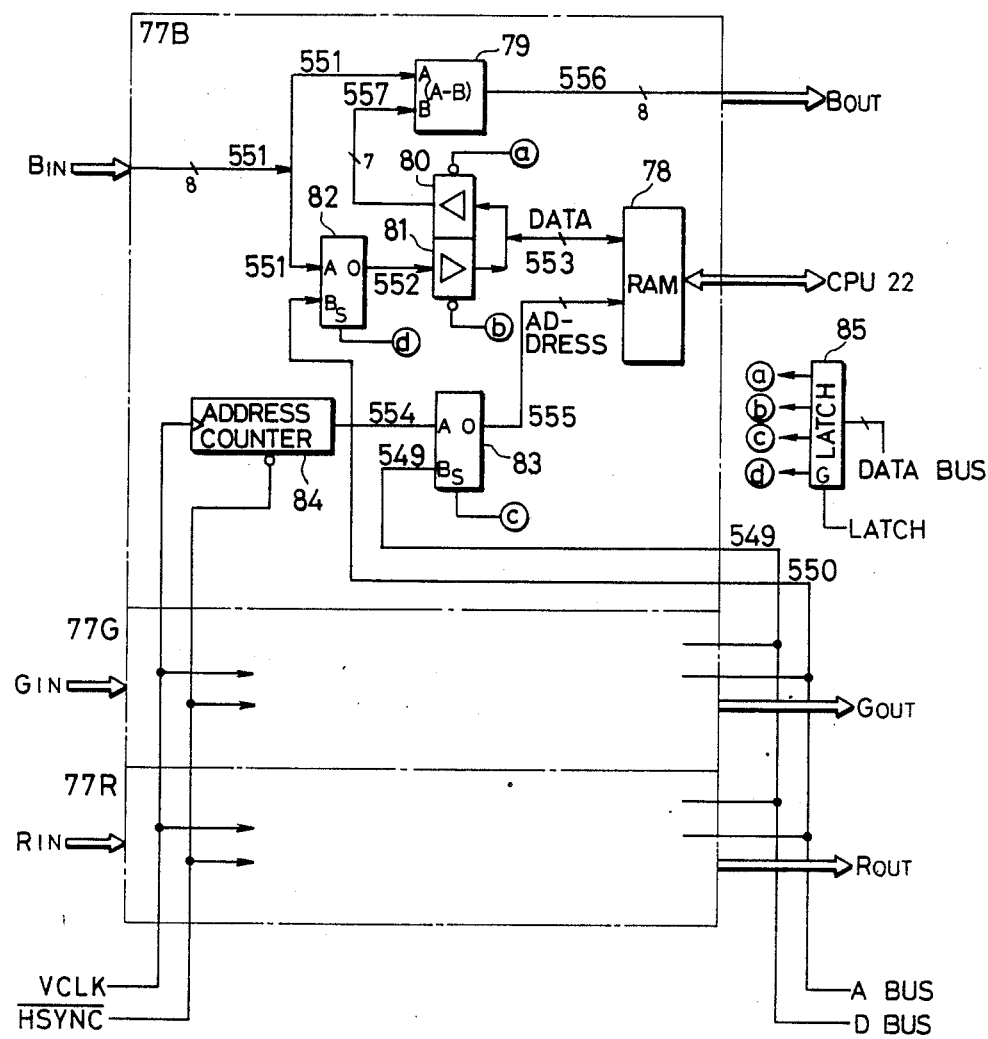
FIG. 10A is a circuit diagram of a black correcting circuit incorporated in the video processing unit shown in FIG. 5.

FIG. 10A shows a black correction circuit. When the amount of light incident upon the sensors is slight, the chips or pixels of the channels 1 to 5 significantly vary in black level output. If data containing such a black level is output as an image, streaks occur in a data portion of the image. In order to correct the output variations of the black portion of the image, a circuit such as that shown in FIG. 10A is employed. Prior to copy, the original document scan unit is moved to the black plate having an uniform density and disposed in an non-image area adjacent to one end of an original document stand. Then the halogen exposure lamp is put on and black level image signals are input to the black correction circuit. Then a terminal A of a selector 82 is selected (d), and a gate 80 is closed (a) but a gate 81 is opened (b). Thus a data line of from 551 to 552 to 553 is formed. In the meantime, a signal (c) is output so that the output of an address counter 84, which is initialized by the signal $\overline{\text{HSYNC}}$, is supplied to an address input of the RAM 78. In this manner, the black level video signal equivalent to one line is stored in the RAM 78. (This operation is referred to as "black reference value latch mode".) While an image is being read, the RAM 78 assumes a data readout mode and allows data of each pixel in each line to be supplied from the RAM 78 to a B input of a subtracter 79 through data lines 553 and 557. In this case, the gate 81 is closed (b) while the gate 80 is opened (a). Accordingly, a black correction circuit output 556 is provided as, for example, a blue signal $Bin(i) - black$ $level\ data\ DK(i) = Bout(i)$. (This mode is referred to as "black correction mode".) A green signal Gin and a red signal Rin are also subjected to a similar control in sections 77G and 77R, respectively. The control lines (a), (b), (c) and (d) for the respective selector gates are controlled by the CPU through a latch 85 disposed as an I/O unit of the CPU (at 22 in FIG. 2).

Figure 11A:
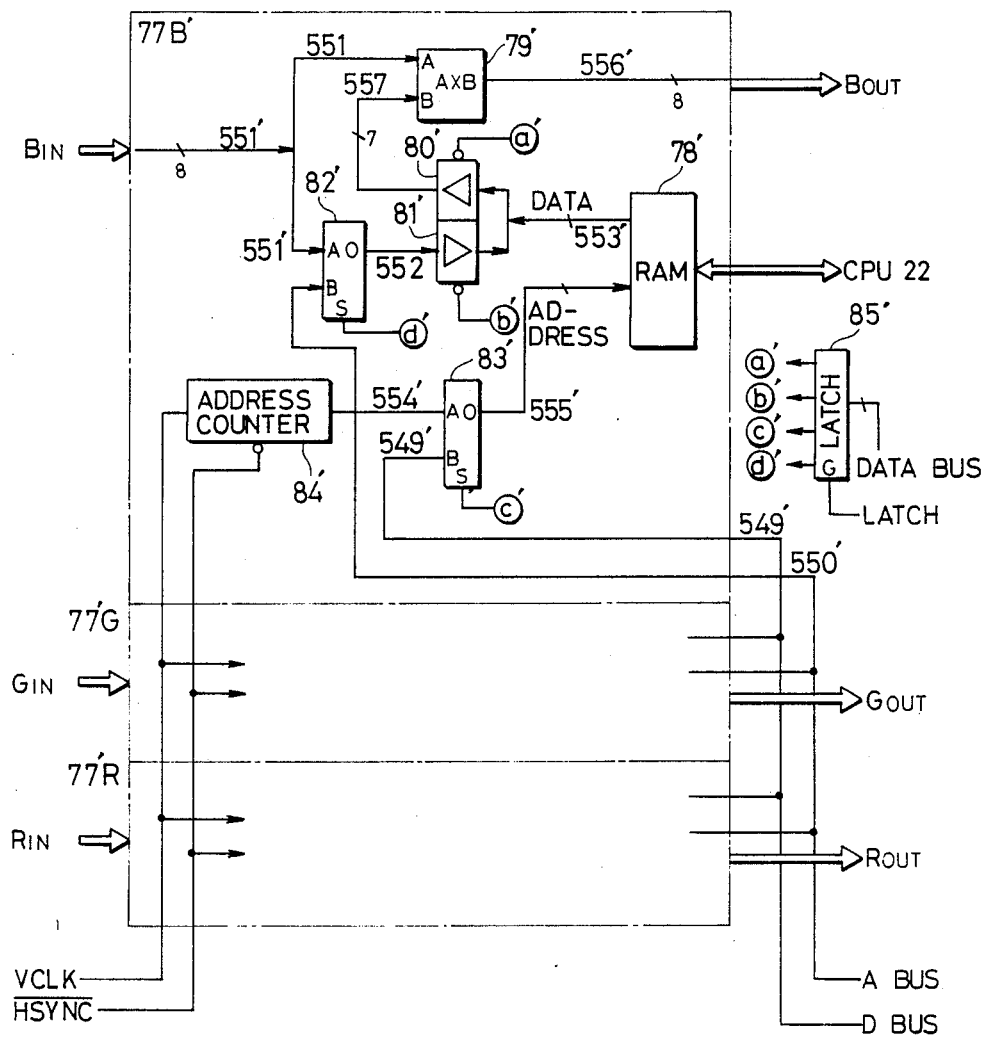
FIG. 11A is a circuit diagram of a white correcting circuit incorporated in the video processing unit shown in FIG. 5.
Figure 11B:
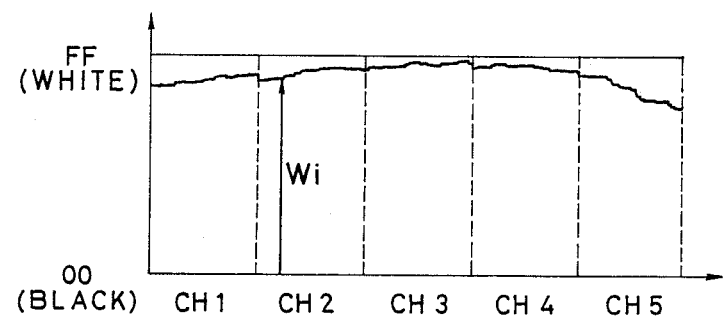
FIGS. 11B, 11C and 11D are views illustrating white correction.
Figure 11C:
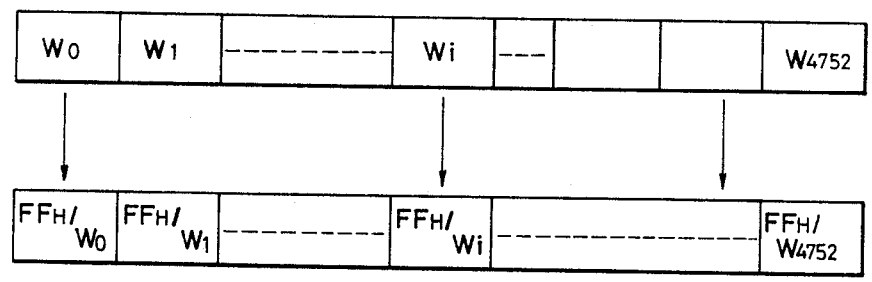
Figure 11D:
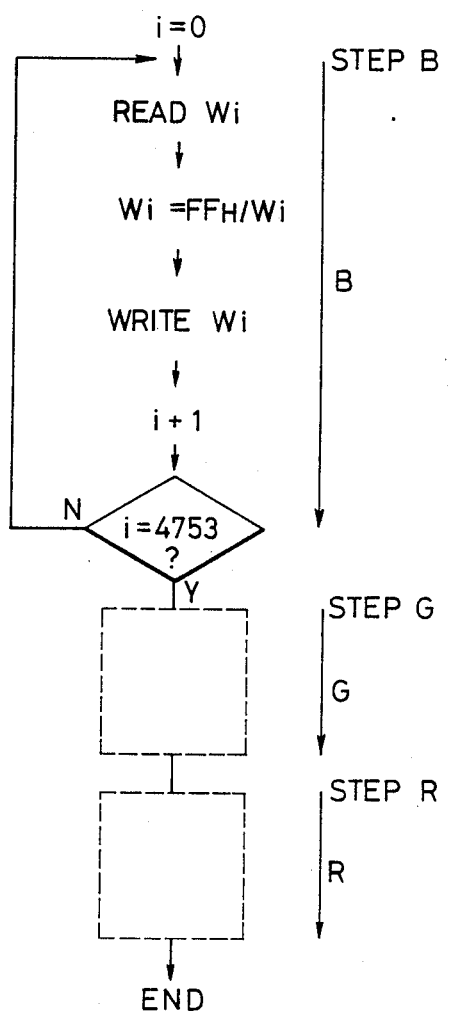

Next, a white level correction (shading correction) will be described below with reference to FIGS. 11A, 11B, 11C, and 11D. In the white level correction, the original document scan unit is moved to the position of the uniform white plate and, at this location, is caused to illuminate the same to obtain white color data. Thus variations in the sensitivities of the illumination system, the optical system and the sensors are corrected on the basis of the white color data. FIG. 11A shows the basic circuit construction. The basic circuit construction is identical to that shown in FIG. 10A, and the black correction differs from the white correction only in that the black correction is performed by means of the subtracter 79 while the white correction is performed by means of a multiplier 79'. Therefore, descriptions of the same parts are omitted. In the case of white correction, when the original document scan unit is located at the position of the uniform white plate (home position), that is, prior to the start of a copy operation or a read operation, the exposure lamp is put on and the thus-obtained image data having a uniform white level is stored in a correction RAM 78' with a storage capacity of one line. For example, if the white plate has a width equivalent to the length of A-4 size, the number of pixels is $16 \times 297$ (mm)=4752 at 16 pel/mm and therefore the RAM needs a storage capacity of at least 4752 bytes. As shown in FIG. 11B, if i-numbered white plate data is represented by Wi (i=1 to 4752), data representing each pixel corresponding to the white plate is stored in the RAM 78' as shown in FIG. 11C. In the white correction, corrected data Do should be $Do = Di \times FFH/Wi$ (Di: the value of an i-numbered pixel which is obtained by the reading of a normal image). For this purpose, the CPU (at 22 in FIG. 2) in the control unit outputs a command to a latch 85' having signal lines (a)', (b)' (c)' and (d)' so that a gate 80' may be closed, a gate 81' opened, and terminals B of selectors 82' and 83' selected. In this manner, the RAM 78' can be accessed by the CPU. Then, FFH/Wo is calculated using a white plate data Wo from a first pixel, and FFH/W1 is calculated using W1. Similar calculations are repeated to perform permutation of all data. After the data permutation relative to the blue component of the color image has been completed (Step B in FIG. 11D), the green component (Step G) and the red component (Step R) are likewise processed. In order that $Do = Di \times FFH/Wi$ may be output with respect to the original image data Di which is subsequently input, the gate 80' is opened (through the signal line (a)'), the gate 81' is closed (through the signal line (b)'), and the selector 83' selects a terminal A. Thus, coefficient data FFH/Wi read from the RAM 78' passes through the signal lines 553 and 557, and enters the multiplier 79'. The multiplier multiplies the data FFH/Wi by the original image data input through the signal line 551 and outputs the result.

The above-described construction and operation enable high-speed processing and correction of data corresponding to each pixel.

Figure 12:
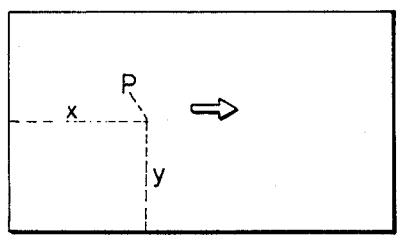
FIG. 12 is a view illustrating a line data latch mode in the embodiment.

In addition, in this construction, image data of one line is input at high speed, and is accessible by the CPU 22 (in eight RD or WR modes). Accordingly, if it is desired to obtain the color components of the image data at a given position on the original document, for example, at a point P of coordinates (x mm, y mm) as shown in FIG. 12, the scan unit is moved a distance equivalent to $16 \times x$ lines in the x-axis direction to fetch data of the desired line for the RAM 78' by a similar operation to the previously-described one. Then, if data is read from a $(16 \times y)$-numbered pixel, the ratio of the B, G and R components can be detected. (This operation is hereinafter referred to as "line data latch mode".) In addition, it will be readily understood by those skilled in the art that, with this construction, it is possible to easily obtain an average density histogram (hereinafter called "average value calculation mode") of a plurality of lines (hereinafter referred to as "histogram mode").

Figure 13A:
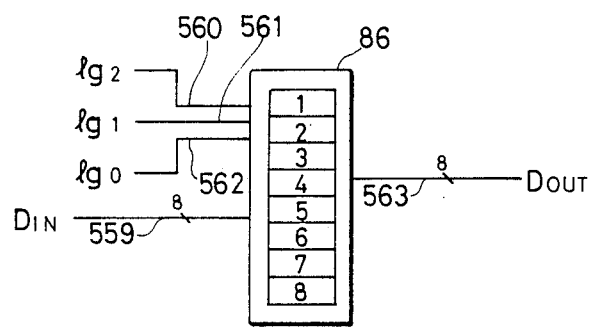
FIG. 13A is a circuit diagram illustrating a logarithm converting circuit in the video processing unit shown in FIG. 5.
Figure 13B:
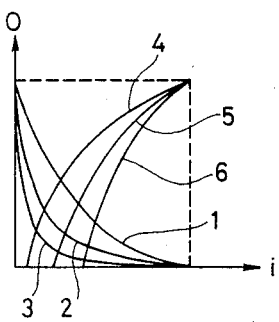
FIG. 13B is a graph illustrating logarithm conversion characteristics.

As described above, the black level and the white level are corrected in correspondence with variations in the black level sensitivity of the image input system, variations in dark current, variations between the sensors, variations in the amount of light emitted from the optical system, and white level sensitivity in the optical system and various other factors. Thus, the color image data which is made uniform in the main-scan direction and which is made proportional to the amount of input light is input to a logarithm conversion circuit 86 (FIG. 5) in accordance with the spectral luminous efficiency of human eyes. The logarithm conversion circuit 86 (FIG. 5) converts the color image data so that white=00H and black=FFH may be obtained. In addition, as shown in FIG. 13A and 13B, the circuit has a plurality of LUTs (look-up tables) which are selectively used for each application, since gamma characteristics vary, depending upon whether a reflection-type original document or a translucent original document is selected, or depending upon whether negative film or positive film is selected as a translucent original document, or because of a difference between film sensitivities or in correspondence with the state of exposed film. The LUTs are switched over by a command input from the operation panel via signal lines lg0 (562), lg1 (561), and lg2 (560) which serve as an I/O port of the CPU 22. Data, which is output in correspondence with each color B, G and R, corresponds to the density of the output image. Therefore, the data output relative to B (blue), that relative to G (green) and that relative to R (red) correspond to the amounts of yellow toner, magenta toner and cyan toner, respectively. Therefore, in the following description, the color video data correspond to Y, M and C.

The following color correction is effected with respect to the color component video data, that is, the yellow component, the magenta component and the cyan component which are obtained from the original document by the logarithm conversion. As shown in FIG. 14, the spectral characteristics of the color separation filters disposed in the color read sensors in correspondence with their respective pixels include unwanted spectral transmission regions such as the portions hatched in FIG. 14. In addition, color toner (Y, M, C) includes unwanted absorption components such as those shown in FIG. 15. For this reason, it is well known to perform masking color correction in which color is corrected on the basis of the calculation of the following linear equation of each color in connection with each item of color component image data Yi, Mi, Ci:

$$\begin{bmatrix} Yo \\ Yo \\ Yo \end{bmatrix} = \begin{bmatrix} a_{Y1} & -b_{M1} & -C_{C1} \\ -a_{Y2} & b_{M2} & -C_{C2} \\ -a_{Y3} & -b_{M3} & C_{C3} \end{bmatrix} \begin{bmatrix} Yi \\ Mi \\ Ci \end{bmatrix}$$

Figure 16A:
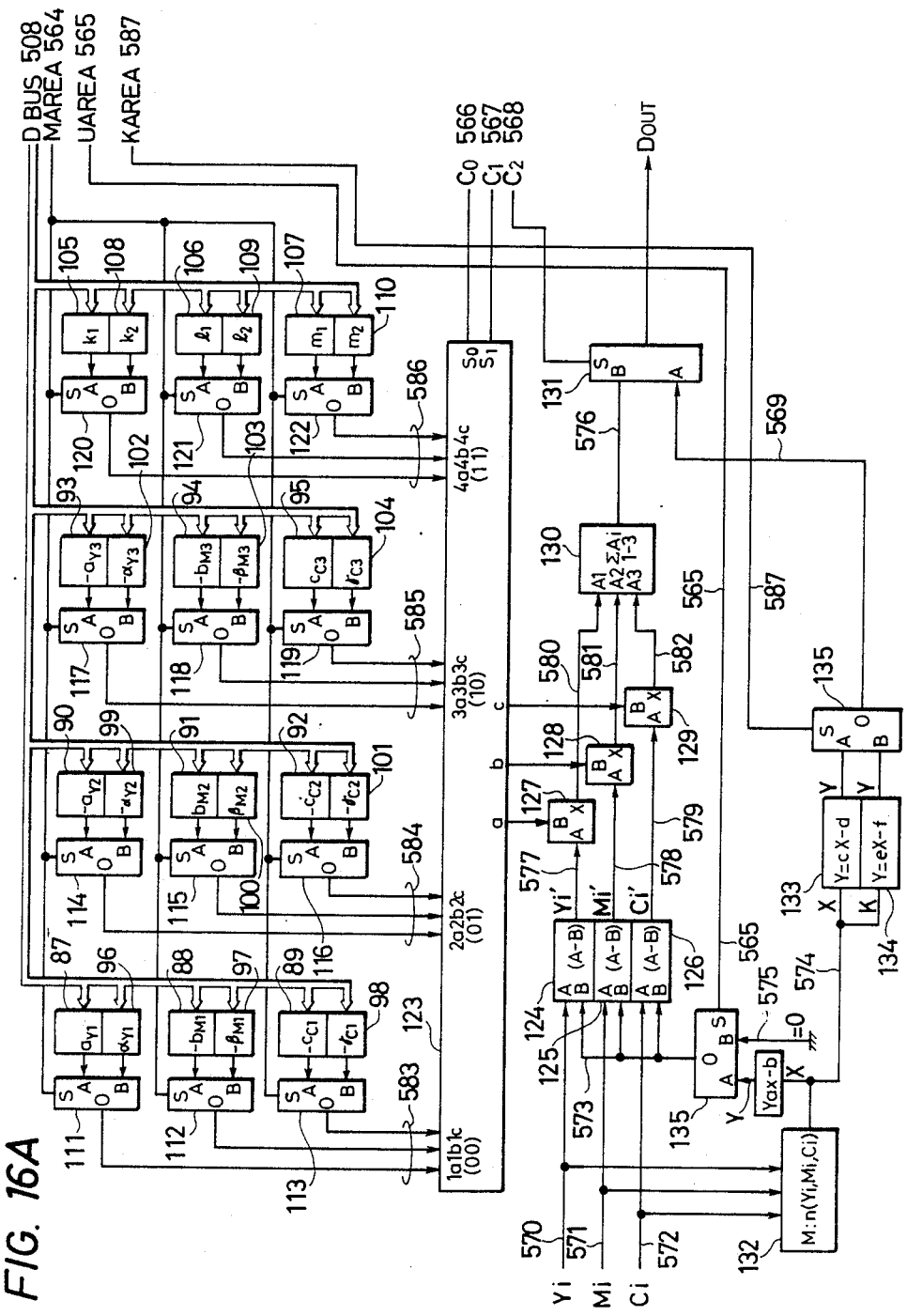
FIG. 16A is a circuit diagram illustrating masking, inking and UCR in the embodiment.

In addition, the following operations are frequently performed. One is an (inking) operation in which Min-(Yi, Mi, Ci) (a minimum value of Yi, Mi, Ci) is calculated from Yi, Mi, Ci, the result being regarded as "ink" (black), and then black toner being added. The other is an under color removal (UCR) operation in which the amount of each color material to be added is reduced in accordance with the black component added. FIG. 16A shows the circuit construction for masking, inking and UCR. This construction has the following features.

(1) Two masking matrices are incorporated and can be switched over at high speed in response to an output of 1 or 0 through one signal line.

(2) Execution and non-execution of UCR can be switched over at high speed in response to an output of 1 or 0 through one signal line.

(3) Two circuits for determining the degree of inking are incorporated and can be switched over at high speed in response to an output of 1 or 0 through one signal line. Prior to image reading, a first matrix coefficient $M_1$ and a second matrix coefficient $M_2$ are set through the bus connected to the CPU 22. In this embodiment, $$M_1 = \begin{pmatrix} a_{Y1} & -b_{M1} & -C_{C1} \\ -a_{Y2} & b_{M2} & -C_{C2} \\ -a_{Y3} & -b_{M3} & C_{C3} \end{pmatrix}$$

$$M_2 = \begin{pmatrix} \alpha Y1 & -\beta M1 & -\gamma C1 \\ -\alpha Y2 & \beta M2 & -\gamma C2 \\ -\alpha Y3 & -\beta M3 & \gamma C3 \end{pmatrix}$$

The value of $M_1$ is set in registers 87 to 95 while the value of $M_2$ is set in registers 96 to 104. Each selector 111 to 122, 135, and 131 selects a terminal A when the input at a terminal S is "1", but selects a terminal B when the input is "2". Therefore, in a case where the matrix $M_1$ is selected, a switch signal MAREA 564 goes to "1" while, if the matrix $M_2$ is selected, the signal goes to "0". A selector 123 provides outputs a, b, c in response to selection signals $C_0$ (566) and $C_1$ (567) on the basis of the truth table shown in FIG. 16B. The selection signals $C_0$ and $C_1$ as well a selection signal $C_2$ correspond to color signals to be output. For example, when $(C_2, C_1, C_0) = (0, 0, 0), (0, 0, 1), (0, 1, 0)$ and $(1, 0, 0)$ in the order of Y, M, C, Bk as well as (0, 1, 1) as a monochrome signal, it is possible to obtain a desired color signal of a corrected color. If $(C_0, C_1, C_2) = (0, 0, 0)$ and the level of the signal MAREA = "1", the contents of the registers 87, 88 and 89, that is, $a_{Y1} - b_{M1} - C_{C1}$ are provided at the outputs a, b and c of the selector 123. In the meantime, the black component signal 574, which is calculated as Min (Yi, Mi, Ci) = k from input signals Yi, Mi and Ci, is subjected to a primary conversion of $Y = ax - b$ (a, b: the constants) and is then supplied through the selector 135 to the respective inputs B of subtracters 124, 125 and 126. In the subtracters 124, 125 and 126, $Y = Yi - (ak - b)$, $M = Mi - (ak - b)$ and $C = Ci - (ak - b)$ are calculated as under color removal.

The results are input to multipliers 127, 128 and 129 for masking operations via signal lines 577, 578 and 579. The selector 135 is controlled by a signal UAREA 565 and is adapted to be switched over between the execution and non-execution of UCR (under color removal) at high speeds in accordance with "1" and "0" of the signal UAREA 565. $(a_{Y1} - b_{M1} - C_{C1})$ is input to the B input of each multiplier 127, 128 and 129 while $(Yi - (ak-b), Mi - (ak-b), Ci - (ak-b)) = (Yi', Mi' Ci')$ is input to the A input of each of them. Therefore, as is evident from FIG. 16A, $Yout = Yi' \times (aY_1) + Mi' \times (b_{M1}) + Ci \times (-C_{C1})$ is obtained at an output Dout under the condition of $C_2 = 0$ (Y or M or C is selected), with the result that yellow color data subjected to the processings of masking color correction and under color removal is obtained. Similarly, $$Yout = Yi' \times (-aY_2) + Mi' \times (b_{M2}) + Ci' \times (-C_{C2})$$
and $$Yout = Yi' \times (-aY_3) + Mi' \times (-b_{M3}) + Ci' \times (C_{C3})$$

are provided at the output Dout. Color selection is, as described previously, controlled by the CPU 22 in response to the selection signals $C_0$, $C_1$, $C_2$ in accordance with the table shown in FIG. 16B and by the development procedures of the color printer. Registers 105 to 107 and 108 to 110 are registers for forming monochrome images, and a monochrome image is obtained by performing weighting addition of each color on the basis of $MONO = k_1 Yi + l_1 Mi + m_1 Ci$ upon a principle similar to the previously-described masking color correction. As described previously, the switch signals MAREA 564, UAREA 565, KAREA 587 serve to effect high-speed switchover between the coefficient matrices $M_1$ and $M_2$ of the masking color correction, and the switch signal UAREA 565 serves to effect high-speed switchover between the execution and non-execution of UCR. The switch signal KAREA 587 serves to switch over the primary conversion of the black component signal (output to Dout through the signal line 569 and the selector 131), that is, to switch over the characteristics of $Y = ck - d$ or $Y = ek - f$ (c, d, e, f: the constant parameters) with respect to $K = Min$ (Yi, Mi, Ci). For example, the switch signal KAREA 587 enables a masking coefficient to be made different in each area of one image plane to be copied, or enables the degree of UCR or inking to be switched over in each area of the same. Accordingly, such a construction is advantageously applicable to a case where an image obtained from image input sources having different characteristics of color separation or a plurality of images each having a different black tone are to be synthesized as in the present embodiment. These area signals MAREA (564), UAREA (565) and KAREA (587) are generated by an area generating circuit (indicated at 51 in FIG. 2) which will be described later.

Figure 17A:
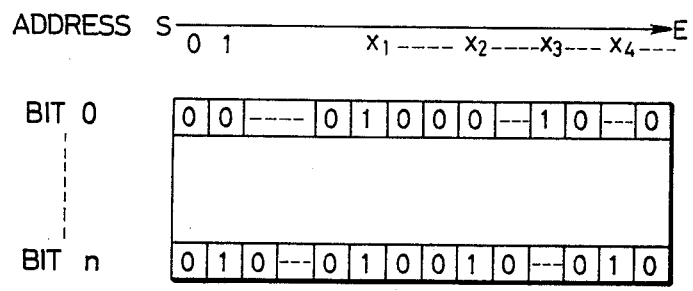
Figure 17B:
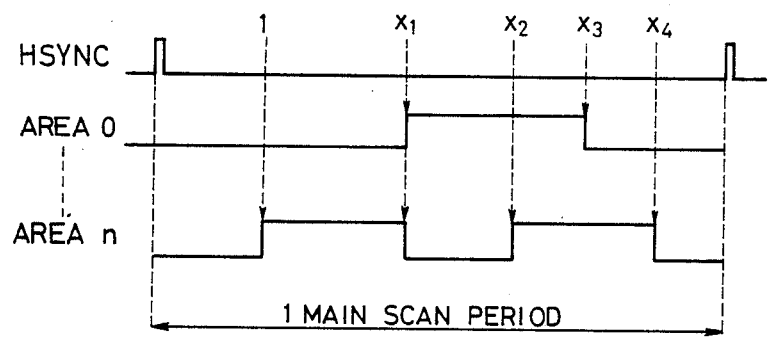
Figure 17C:
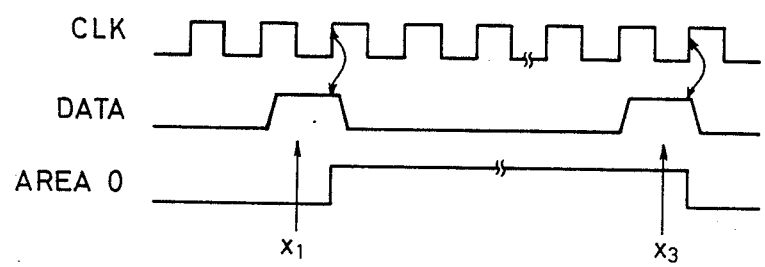
Figure 17D:
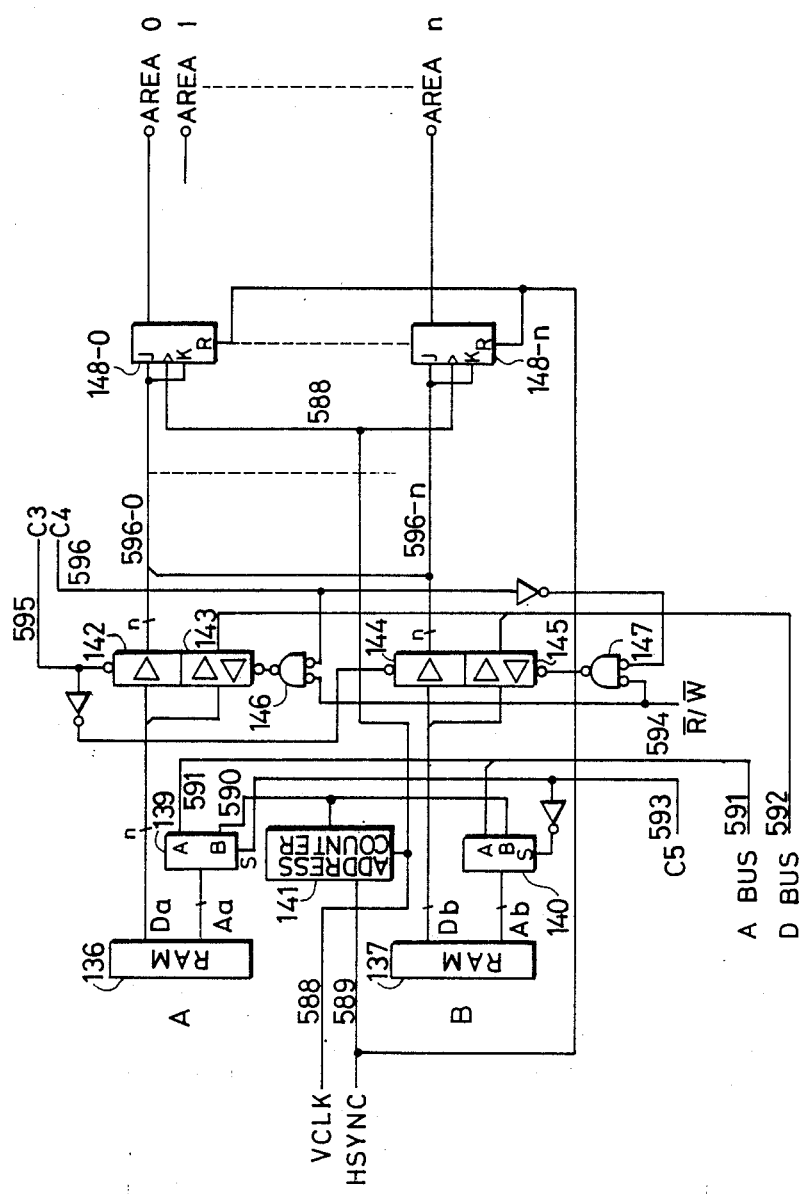

FIGS. 17A to 17G illustrate the manner in which the area signals (such as MAREA 564, UAREA 565 and KAREA 587) are generated. The term "area" represents, for example, a portion such as the hatched portion in FIG. 17E, and this area is distinguished from the other area by using signals shown in the timing chart of FIG. 17E in each of the lines within the range defined between lines A to B in the sub-scan direction. Each area is specified by the digitizer 16 shown in FIG. 1. FIGS. 17A to 17D illustrate a construction in which the positions of generation of the area signal, the period thereof, and the number of the periods are programmable by the CPU 22 and in which a multiplicity of area signals can be obtained by the same. In this construction, one area signal can be generated by one bit of the RAM to which the CPU is accessible, and, for example, two n-bit RAMs (136 and 137 in FIG. 17D) are incorporated in order to obtain n-numbered area signals AREA 0 to AREA n. If the area signals AREA 0 and AREA n such as those shown in FIG. 17B are to be obtained, bits 0 at addresses $x_1$, $x_3$ of the RAM are set to "1" while bits 0 at the other addresses are set to "0". On the other hand, bits n at addresses 1, $x_1$, $x_2$, and $x_4$ are set to "1" while bits n at the other addresses are set to "0". If data is sequentially read from the RAM in synchronization with a fixed clock with reference to the signal HSYNC, data "1" is read out at addresses $x_1$ and $x_3$ as shown in FIG. 17C. The thus-read data is input to J and K terminals of each J-K flip-flop 148-0 to 148-n of FIG. 17D. Therefore, the output of each of the J-K flip-flops toggles. That is to say, when "1" is read from the RAM and a signal VCLK is input to the flip-flop, the output of "0" goes to "1" while the output of "1" goes to "0" to thereby generate a period signal such as AREA 0 and hence the area signal. Also, if data at each address is "0", setting of an area is not performed since no area signal is generated. FIG. 17D illustrates the construction of this circuit, and the above-described RAMs are indicated at 136 and 137. In order to switch over areas at high speeds, for example, while data of each line is being read from the RAM A 136, the CPU 22 is adapted to perform writing into the RAM B 137. Thus, the generation of a period and the writing into the RAM by the CPU are alternately switched over. Accordingly, in a case where the hatched areas in FIG. 17F are specified, the RAMs A and B are switched over in the manner of A→B→A→B→A. As specifically described with reference to FIG. 17D, if ($C_3$, $C_3$, $C_5$)=(0, 1, 0), the output of an address counter 141 which counts the signal VCLK is supplied from the selector 139 through a signal line Aa to the RAM A 136 and thus a gate 142 is opened but a gate 144 is closed. Reading from the RAM A 136 is thus enabled and bits equivalent to the overall width, i.e., n-numbered bits are input to the J-K flip-flops 148-0 to 148-n, thereby generating period signals AREA 0 to AREA n in accordance with a preset value. During this period, the CPU 22 performs writing into the RAM B by means of an access signal $\overline{R/W}$ through an address bus A-BUS and a data bus D-BUS. On the other hand, if ($C_3$, $C_3$, $C_5$) is set to (0, 1, 0), the period signal can be likewise generated on the basis of data set in the RAM B 137 and thus the CPU can write data into the RAM A 136. (These two RAMs are hereinafter referred to as "A-RAM" and "B-RAM", and $C_3$, $C_4$ and $C_5$ are hereinafter referred to as "AREA control signal (ARCNT)". $C_3$, $C_4$ and $C_5$ are output from an I/O port of the CPU.) A correspondence table of each bit and its signal name is shown in FIG. 17G.

Figure 18A:
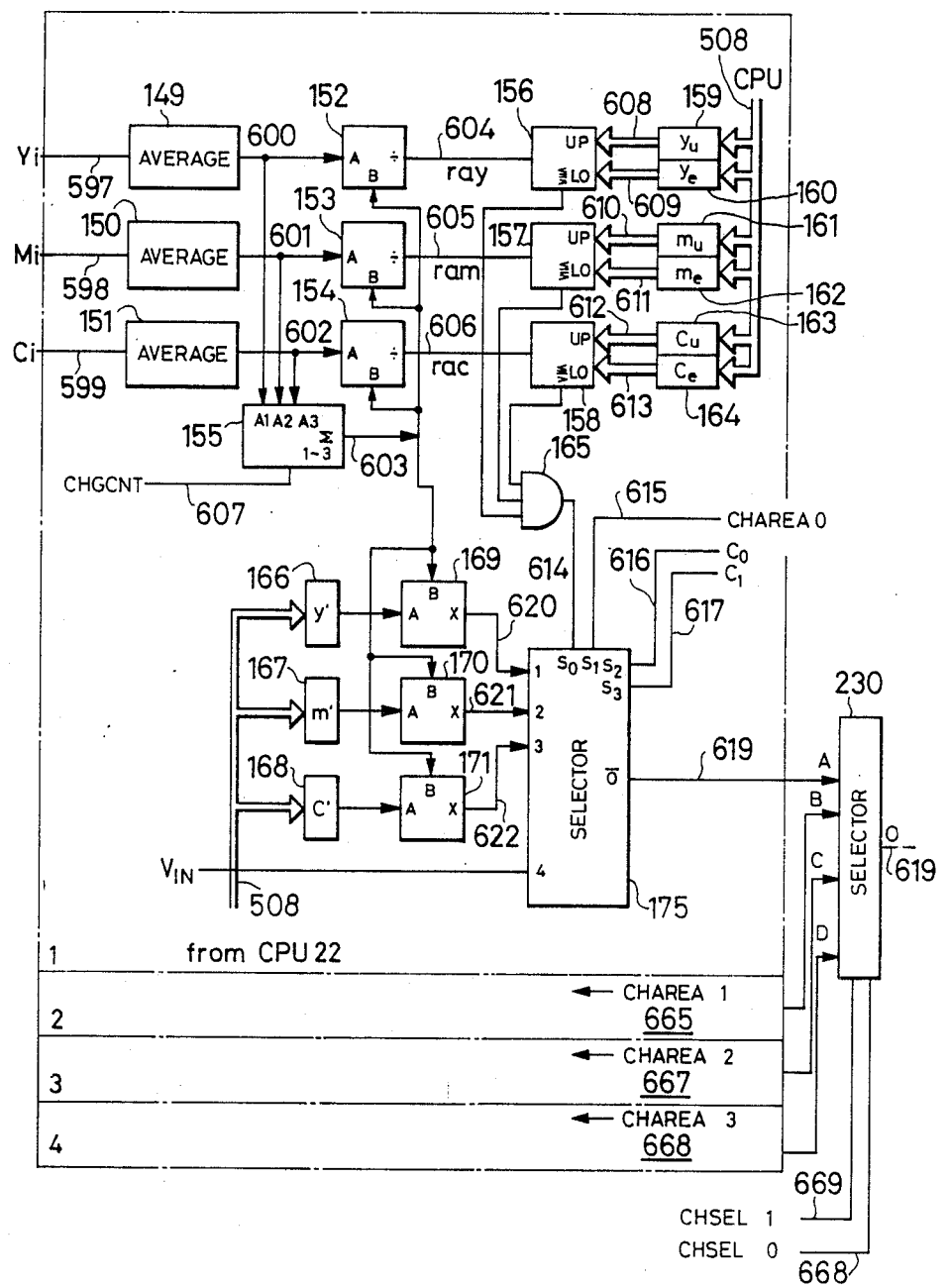

The construction of a color conversion circuit will be described below with reference to FIG. 18A. The term "color conversion" used herein is a processing for substituting another color for the color represented by each item of the color component data (Yi, Mi, Ci) input to this circuit, the items of data each having a specific color density or a specific color-component ratio. For example, as shown in FIG. 18C, a red portion (a hatched portion) on the original document is changed into blue. First, the color data Yi, Mi and Ci are averaged in units of 8 pixels by averaging circuits 149, 150 and 151. The results are supplied to both an adder 155 and inputs A of dividers 152, 153, 154. The adder 155 calculates Yi+Mi+Ci and supplies the result to an input B of each divider 152, 153 and 154. If the input color component ratios, that is, an yellow ratio $ray=Yi/Yi Mi+Ci$, a magenta ratio $ram=Mi/Yi+Mi+Ci$, and a cyan ratio $rac=Ci/Yi+Mi+Ci$ are supplied to signal lines 604, 605 and 606, respectively, and are then input to window comparators 156, 157 and 158. When those ratios range between comparative upper limits (yu, mu, cu) and comparative lower limits (yl, ml, cl) of the respective color component ratios which are set through the CPU bus, the window comparators 156 to 158 output "1". Specifically, when $yl \leq ray < yu$, the comparator 156 outputs "1", when $ml \leq ram < mu$, the comparator 155 outputs "1", and, when $cl \leq rac < cu$, the comparator 156 outputs "1". When these three conditions are satisfied, it is judged that a desired color was input, and a three-input AND gate 165 outputs "1" to an input So of a selector 175. When a signal CHGCNT of "1" is supplied from the I/O portion of the CPU via a signal line 607 to the adder 155, the adder 155 provides an output 603 of $$\sum_{i=1}^{3}$$

Ai while, when "0" is supplied to the adder 155, the adder 155 provides an output 603 of "1". Accordingly, in the case of "0", the dividers 152, 153 and 154 directly output the signals at their respective A inputs. In this instance, instead of a desired color component ratio, color density data is set in each of the registers 159 to 164. A selector 175 has four line inputs and one line output. Desired color data which have been converted, i.e., a Y component, M component, and a C component are respectively supplied to inputs 1, 2 and 3 of the selector 175 while an input 4 is supplied with data Vin representative of the original document image which was subjected to masking color correction and UCR, the input 4 being connected to Dout of FIG. 16A. A switch input $S_0$ is set to "1" when the result of color detection is "true", that is, when a predetermined color is detected. If not, the switch input $S_0$ is set to "0". An area signal CHAREA$_0$ 615 which is generated in the area generating circuit shown in FIG. 17D is supplied to an input $S_1$, and a portion within a specified area corresponds to "1" while a portion outside the specified area corresponds to "0". When the signal at the input $S_1$ is "1", the color conversion is performed, but, when the input $S_1$ is "0", the color conversion is not performed. The signals $C_0$ (616) and $C_1$ (617) supplied to inputs $S_2$ and $S_3$ are the same as the signals $C_0$ and $C_1$ of FIG. 16A. When ($C_0$, $C_1$)=(0, 0), (0, 1), (1, 0), the signals $C_0$ and $C_1$ respectively form an yellow image and a cyan image in the color printer. The truth table of the selector 175 is shown in FIG. 18B, In registers 166 to 168, desired color composition ratios after color conversion, or color composition density data is set by the CPU. If y', m' and c' are the color composition ratios, the signal CHGCNT 607 is set to "1" and therefore the output 603 of the adder 155 becomes (Yi+Mi+Ci). (Yi+Mi+Ci) is supplied to the inputs B of the multipliers 169 to 171, and (Yi+Mi+Ci)×y', (Yi+Mi+Ci)×m' and (Yi+Mi+Ci)×c' are supplied to selector inputs 1, 2 and 3, respectively, and color conversion is performed in accordance with the truth table of FIG.

18B. On the other hand, if y', m' and c' represent the color component density data, the signal CHGCNT 607 is set to "0" and therefore the output 603 of the adder 155 becomes "1". Thus, the multipliers 169 to 171 output the data y', m', c' to the inputs 1, 2 and 3 of the selector 175, and color conversion is performed through the substitution of the color component density data. Since the period and the number of scan periods of the area signal $CHAREA_0$ 615 can be freely set as described previously, the color conversion can be applied to a plurality of areas $r_1$, $r_2$, $r_3$ as shown in FIG. 18D. In addition, if a plurality of circuits such as that shown in FIG. 18A are prepared, the colors of a plurality of areas can be converted into a plurality of colors at high speeds and at real time; for example, red, red and white are simultaneously converted into blue, yellow and red in the areas $r_1$, $r_2$ and $r_3$, respectively. A plurality of color detection/conversion circuits which are the same as the aforesaid circuit are prepared, and an selector 230 selects required data from outputs A, B, C and D of the respective circuits in response to signals CHSEL0 and CHSEL1 to provide an output 619. The area signals CHAREA 0 to 3 and the signals CHSEL 0, 1 are generated by the area generating circuit 51 as shown in FIG. 17D.

Figure 19A:
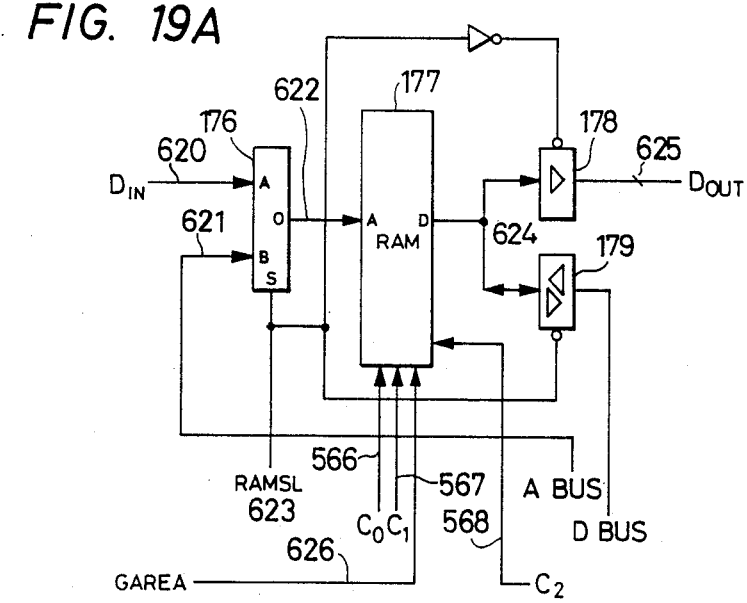
Figure 19B:
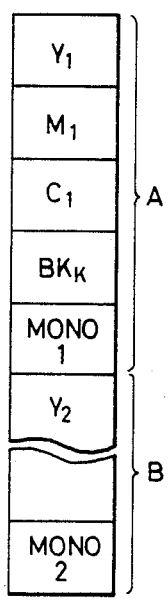
Figure 19C:
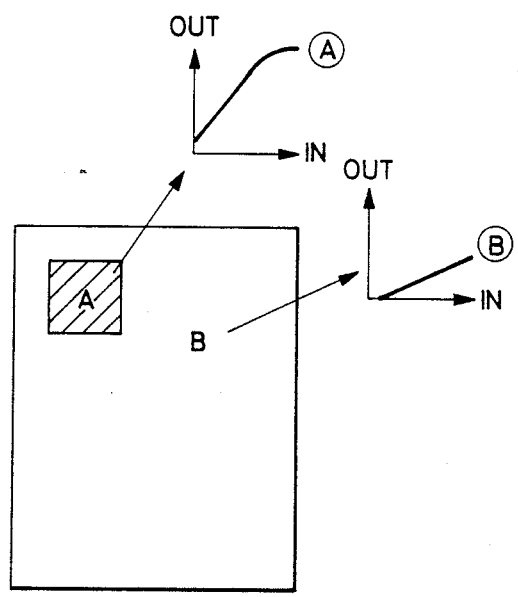

FIG. 19A illustrates a gamma conversion circuit for controlling the color balance and color density of an output image in the present inventive system. Basically, this control is performed by means of data conversion based on a LUT (look-up table), and the data of the LUT is adapted to be rewritten in correspondence with a designation input through the control unit. In a case where data is written into or read from a RAM 177 as the LUT, a selection signal line RAMSL 623 is set to "0" and an input B of a selector 176 is thus selected. A gate 178 is closed and a gate 179 is opened so that the buses ABUS and DBUS (address data) from the CPU 22 are connected to the RAM 177, thereby enabling writing or reading of data. Once a conversion table has been formed, the selection signal line RAMSL 623 is set to "1" and a video input through a signal line Din 620 is input to an address input of the RAM 177. The RAM 177 outputs desired data in accordance with addressing based on the video data input. The output of the RAM 177 is input to the next-stage magnification change control circuit through the opened gate 178. The RAM 177 includes at least two characteristics of magnification change (A and B in FIG. 19B) for each of yellow, magenta, cyan, black and monochrome. Color switching is performed employing the selection signals $C_0$ (566), $C_1$ (567) and $C_2$ (568) as described previously with reference to FIG. 16. As illustratively shown in FIG. 19C, the area signal GAREA 626 generated by the aforesaid area signal generating circuit shown in FIG. 17 imparts a gamma characteristic A to an area A and a gamma characteristic B to an area B, and these areas A and B can be obtained in the form of one print.

This gamma RAM 177 has the two characteristics A and B for magnification change, and they can be switched over at high speeds in each area. If the RAM is increased in number, more than two characteristics become able to be switched over at high speeds. The output Dout 625 in FIG. 19A is connected to an input Din 626 of the next-stage magnification change control circuit shown in FIG. 20A.

As can be seen from the illustration, the RAM is designed to independently convert the gamma characteristics of the respective colors, and the contents of the RAM can be rewritten by the CPU 22 in accordance with an operator's operation of a liquid crystal touch panel on an operation panel. For example, when the operator depresses a density adjustment key e displayed on a standard image plane P000 (FIG. 33), as shown in FIGS. 19D and 19E, a setting is shifted to the left, as from the central 0 to $-1$ to $-2$, and the characteristics in the RAM 177 are rewritten and shifted, as from $-1$ to $-2$ to $-3$ to $-4$. On the other hand, when the operator depresses a density adjustment key f on the standard image plane P000, the characteristics can be shifted as from $+1$ to $+2$ to $+3$ to $+4$ and the contents of the RAM 177 are likewise rewritten. In other words, all the tables (in the RAM 177) relative to Y, M, C, Bk or MONO can be rewritten by depressing the keys e or f on the standard image plane, and thus the density can be adjusted without changing tone. On the other hand, in an image plane P420 of FIG. 37 (color balance adjustment in the <COLOR CREATE> mode), the areas in the RAM 177 corresponding to Y, M, C and Bk are independently rewritten in order to adjust color balance. For example, when a touch key $y_1$ in the image plane P420 is depressed in order to change the tone of the yellow component, the black bar display corresponding to yellow extends upwardly, and the characteristics shift in the direction of $Y_1$ in Graph Y of the FIG. 19F so that the density of the yellow component increases. If a touch key $y_2$ is depressed, the characteristics shift to cause the density of the yellow component to decrease. In this operation, the density of a signal color component is changed to modify the tone. M, C and Bk are also adjusted in the same manner.

Figure 20A:
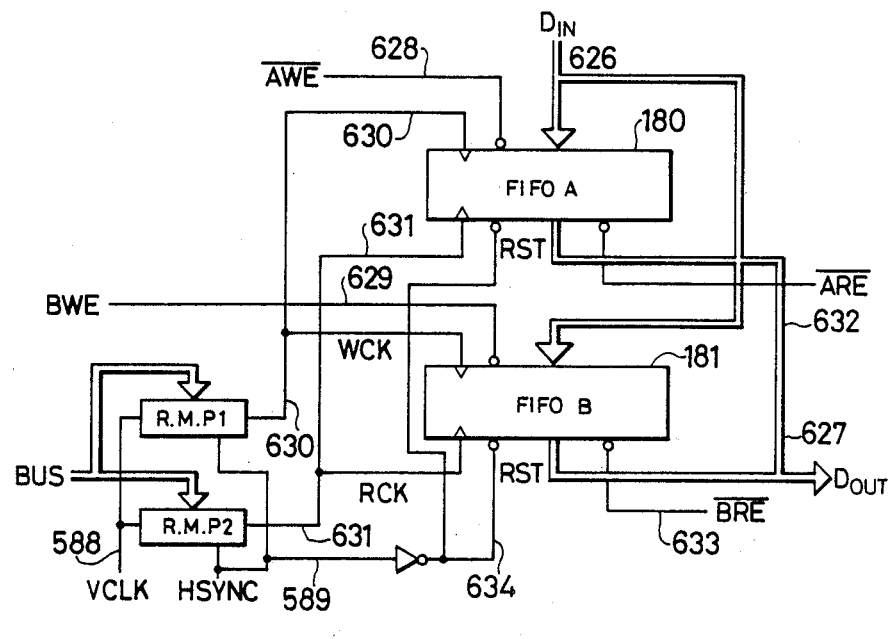
FIGS. 20A, 20B, 20C, 20D, 20E, 20F, and 20G are views illustrating the control of magnification change in the video processing unit shown in FIG. 5.
Figure 20B:
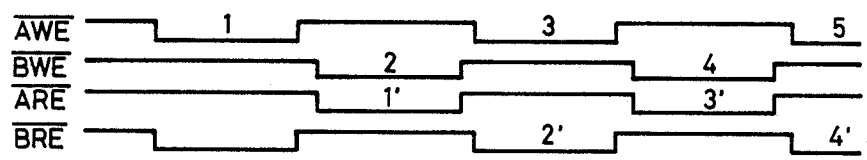
Figure 20C:
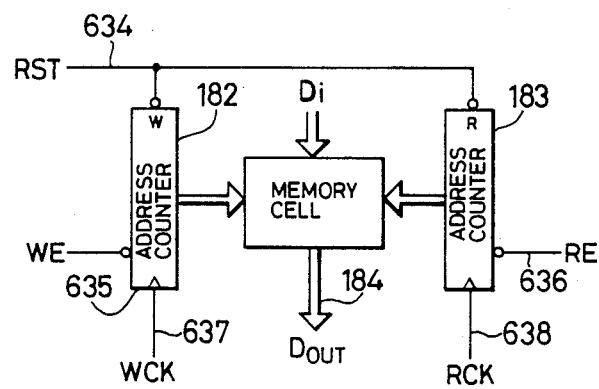
Figure 20D:
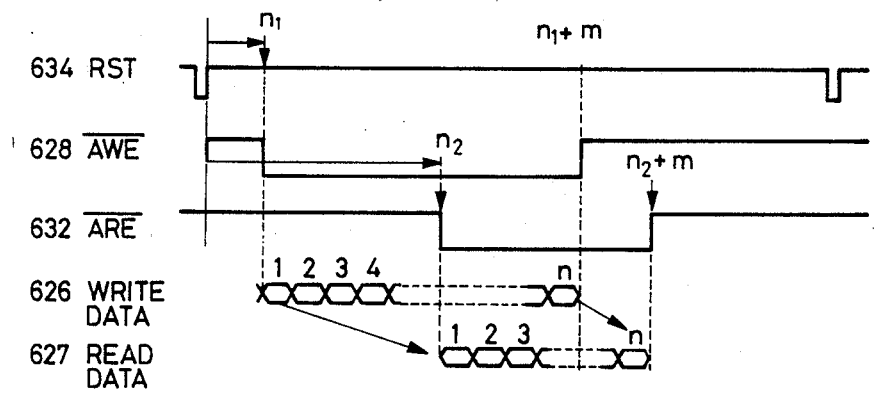
Figure 20E:
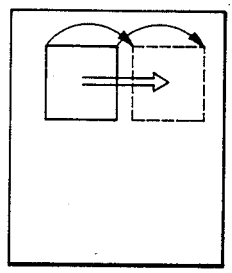
Figure 20F:
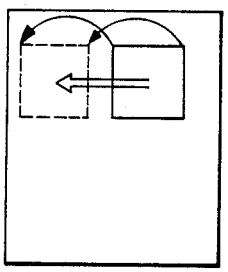
Figure 20G:
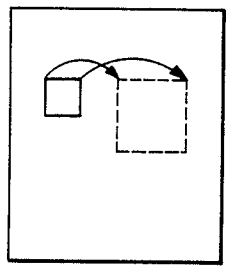

In FIG. 20A, FiFo memories A 180 and B 181 each have a storage capacity equivalent to one line in the main-scan direction, for example, 4725 pixels (16 (pel/mm)×297 mm (the longitudinal dimension of A-4 size)). As shown in FIG. 20B, writing into the FiFo memories A 180 and B 181 is performed while signals $\overline{AWE}$ and $\overline{BWE}$ are held at a low level. While the signals $\overline{AWE}$ and $\overline{BWE}$ are held at a high level, reading from the FiFo memories A 180 and B 181 is performed. When the signal $\overline{ARE}$ is at a high level, the level of impedance increases at the output of the memory A 180 while, when the signal $\overline{BRE}$ is at a high level, the level of impedance increases at the output of the memory B 181. These outputs are wired-ORed and output as Dout 627. Each of the FiFo memories A 180 and B 181 includes a write address counter and a read address counter (FIG. 20C) actuated by clock signals WCK and RCK, and pointers incorporated in the respective FiFo memories are caused to advance by the counters. Therefore, as is well known, if, according to common practice, a clock constituted by the video data transfer clock VCLK 588 multiplied by a rate multiplier 630 is supplied as the signal WCK but a non-multiplied clock VCLK 588 is supplied as the signal RCK, data input to this circuit is output in a reduced state. On the other hand, if a non-multiplied clock VCLK 588 and a multiplied clock VCLK 588 are respectively supplied as the signal WCK and the signal RCK, data input to this circuit is output in an enlarged state. The FiFo memories A 180 and B 181 alternately perform their read and write operations. Each of the FiFo memories A 180 and B 181 further includes a W address counter 182 and an R address counter 183. The respective counters 182 and 183 count in response to the clocks WCK and RCK while enable signals WE 635 and RE 636 are held at a low level, and are adapted to be reset when a signal RST 634 goes to a low level. As shown in FIG. 20D by way of example, after reset (employing the main-scan synchronizing signal $\overline{\text{HSYNC}}$ in this construction), the signal $\overline{\text{AWE}}$ (as well as $\overline{\text{BWE}}$) is set to a low level to perform writing of data representative of an $n_1$-numbered pixel to an $(n_1+m)$-numbered pixel, and the signal $\overline{\text{ARE}}$ (as well as $\overline{\text{BRE}}$) is set to a low level to perform reading of data representative of an $n_2$-numbered pixel to an $(n_2+m)$-numbered pixel. In consequence, as illustrated, WRITE data shifts to READ data. Specifically, since the positions and periods of generation of the signal AWE (BWE) and $\overline{\text{ARE}}$ ($\overline{\text{BRE}}$) are variable, an image can be freely shifted in opposite main-scan directions as shown in FIGS. 20E, 20F and 20G. In addition, a combination with the aforesaid multiplication of the signal WCK or RCK makes it easy to control magnification change and/or movement control. The signals $\overline{\text{AWE}}$, $\overline{\text{ARE}}$, $\overline{\text{BWE}}$ and $\overline{\text{BRE}}$ input to this circuit are generated by the area signal generating circuit shown in FIG. 17D in the previously-described manner.

Figure 21C:
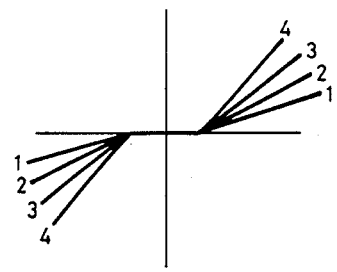
Figure 21D:
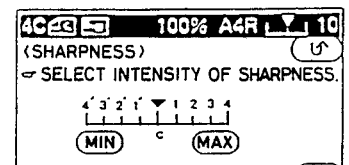

After desired magnification change control has been performed in the main-scan direction as shown in FIGS. 20A to 20G, edge enhancement and smoothing are performed as shown in FIGS. 21A to 21G. Memories 185 to 189 each have a storage capacity equivalent to one line of the main-scan direction, and have an FiFo arrangement in which data equivalent to five lines is stored cyclically and sequentially and at the same time is output in parallel. A secondary differentiation spatial filter 190 is of a type which is frequently used in order to detect edge components. The gain of the characteristics of an output 646 is increased at a gain circuit 196 as shown in FIG. 21B. The hatched portion in FIG. 21B is clamped to zero in order to eliminate a low-level component of the components which are output after edge enhancement, that is, noise components. The output equivalent to five lines from the buffer memories 185 to 189 is input to smoothing circuits 191 and 195 which averages in accordance with five kinds of pixel block units from $1\times 1$ to $5\times 5$ as illustrated. A desired signal of smoothed outputs 641 to 645 is selected by a selector 197. A signal SMSL 652 is output through the I/0 port of the CPU 22, and, as described later, is controlled in association with a designation input from the operation panel. A divider is indicated at 198. When smoothing of $3\times 5$ is selected, the CPU 22 sets "15" in the divider 198 while, the smoothing of $3\times 7$ is selected, the CPU 22 sets "21" in the same, thereby performing an averaging processing.

Figure 21E:
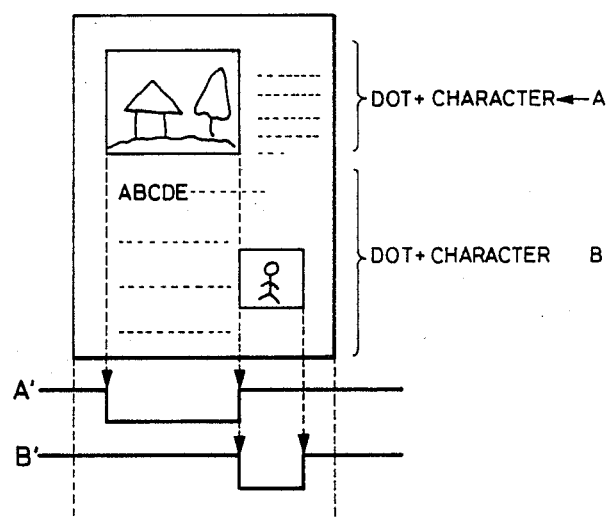
Figure 21F:
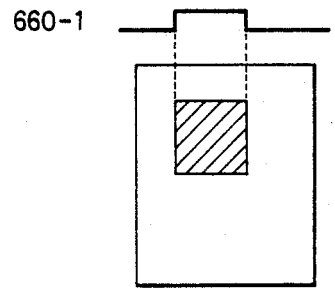
Figure 21G:
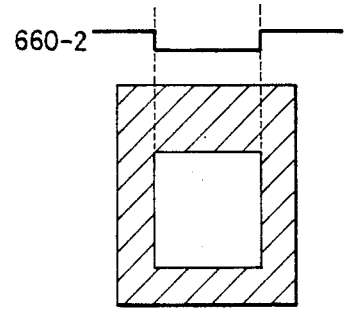

The gain circuit 196 has a look-up table (LUT), and is constituted by a RAM to which the CPU 22 writes data as in the case of the aforesaid gamma circuit shown in FIG. 19A. When an input EAREA 651 is set to a low level, the gain circuit 196 outputs "0". The above-described edge enhancement and smoothing controls correspond to the image plane of the liquid crystal touch panel on the operation panel. Referring for example to the image plane of FIG. 21D (P430 in FIG. 27), as the operator increases the intensity of sharpness from 1 to 2 to 3 to 4, that is, to a maximum, the conversion characteristics of the gain circuit are rewritten by the CPU 22 as shown in FIG. 21C. On the other hand, as the operator decreases the intensity of sharpness from 1' to 2' to 3' to 4', that is, to a minimum, the selector 197 selectes the block size for smoothing in response to the switching signal SMSL 652 so that the block size increases as from $3\times 3$ to $3\times 5$ to $3\times 7$ to $5\times 5$. When a central point C is chosen, $1\times 1$ is selected and the gain circuit input EAREA 651 goes to "0". Therefore, the input Din, which is not subjected to smoothing nor edge enhancement, is provided at an output of an adder 199 as an output Dout. In this construction, moire which occurs in the case of copying halftone dot original documents can be substantially eliminated by smoothing, and the sharpness of characters and lines can be improved by edge enhancement. However, in a case where one original document has both a halftone dot portion and characters, there is a likelihood that the characters may become obscure owing to smoothing for eliminating moire or that the moire manifests owing to edge enhancement. To solve this shortcoming, the signals EAREA 651 and SMSL 652 generated by the area generating circuit shown in FIG. 17D are employed. For example, the smoothing of $3\times 5$ is selected through the control of the signal SMSL 652, and the signal EAREA 651 is generated in the form of lines A' and B' as shown in FIG. 21E and is applied to the original document including dots and characters. In this manner, the occurrence of moire in the halftone dot image is reduced and the sharpness of the characters is improved. A signal TMAREA 660 is generated by the area generating circuit 51 in the same manner as the signal EAREA 651. When the signal TMAREA goes to "1", the output Dout goes to "A+B" whereas, when the signal TMAREA goes to "0", the output Dout goes to "0". Accordingly, if a signal 660-1 as shown in FIG. 21 F is generated by controlling the signal TMAREA 660, a hatched portion (inner rectangular portion) can be extracted. If a signal 660-2 as shown in FIG. 21G is generated by controlling the signal TMAREA, a hatched portion (outer rectangular portion) can be extracted (white extraction).

Figure 10B:
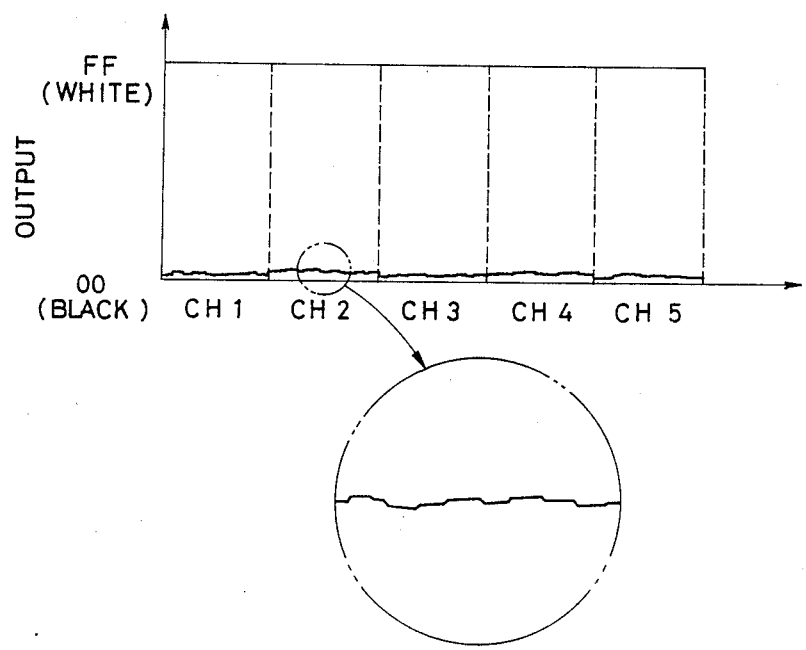
FIG. 10B is a view illustrating black correction.

Referring back to FIG. 5, an original document position identify circuit 200 is disposed to identify the coordinates of the four corners of an original document which is carried on the original document stand. The circuit 200 includes registers (not shown), and, after a prescan for original document position identification, the CPU 22 reads from the register the thus-obtained coordinate data. Since U.S. patent application Ser. No. 946,093, filed on Dec. 23, 1986, now abandoned and continued as Ser. No. 220,936, filed on June 23, 1988, discloses the circuit in detail, the description thereof is omitted. However, in the prescan for original document position identification in this embodiment, after the black correction and the white correction have been completed as described previously with reference to FIGS. 10 and 11A, the monochrome image data generating registers $k_1$, $l_1$, and $m_1$ are selected as masking coefficients in the masking operation described previously in conjunction with FIG. 16A. If $C_0$, $C_1$ and $C_2$ is set to (0, 1, 1) and the signal UAREA 565 is set to a low level so as not to perform UCR (under color removal), the coordinate data is input to the original document identifying circuit 200 as monochrome image data.

Figure 22:
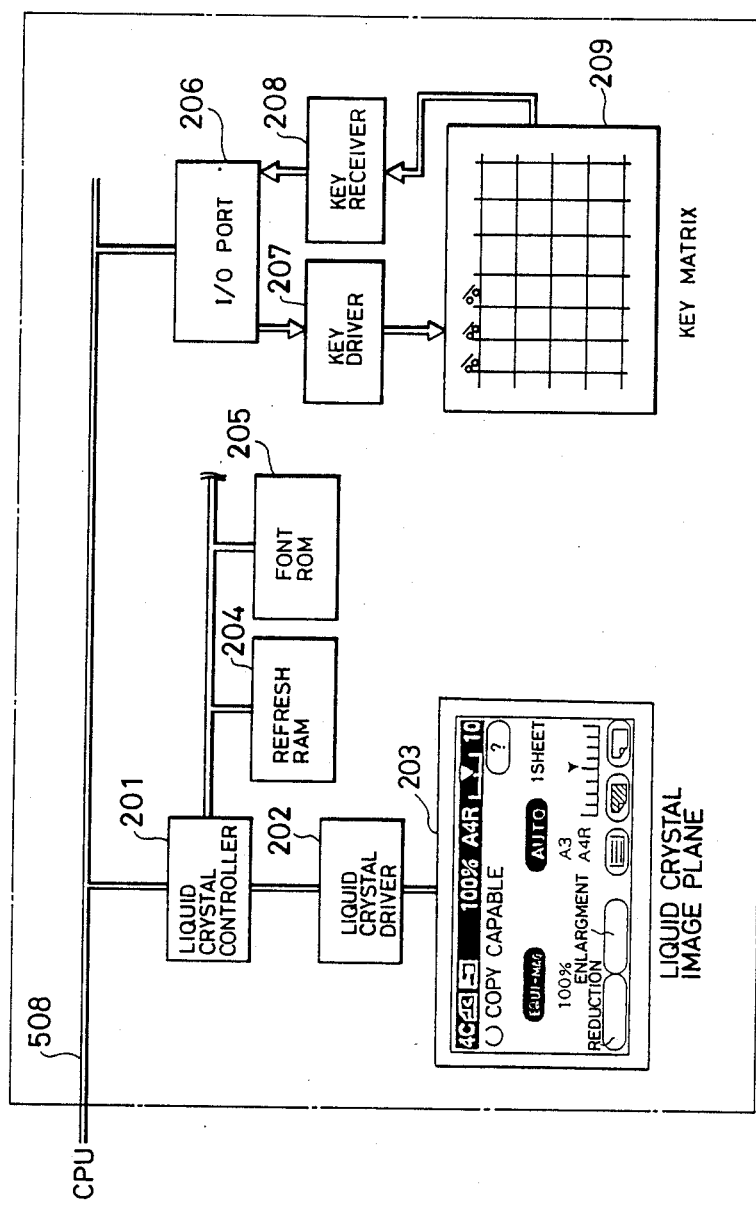
FIG. 22 is a circuit diagram illustrating the control circuit of an operation panel of the embodiment.

FIG. 22 shows the operation panel portion, in particular, a control unit of the liquid crystal image plane, and a key matrix. The operation panel is controlled by a command which is given via the CPU bus 508 of FIG. 5 to a liquid crystal controller 201 (FIG. 22) and an I/O port 206 for controlling the key matrix 209 for key input and key touch input. Fonts to be displayed on the liquid crystal image plane are stored in a FONT ROM 205, and are sequentially transmitted to a refresh RAM 204 in accordance with a program of the CPU 22. The liquid crystal controller 201 transmits image plane data to be displayed to a liquid crystal display 203 via a liquid crystal driver 202 and thus displays a desired image plane. All the key inputs are controlled by the I/O port 206, and a depressed key is detected through a key scan which is conventionally performed. The result is input to the CPU 22 through a receiver 208 and the I/O port 206.

PROJECTOR

Figure 23:
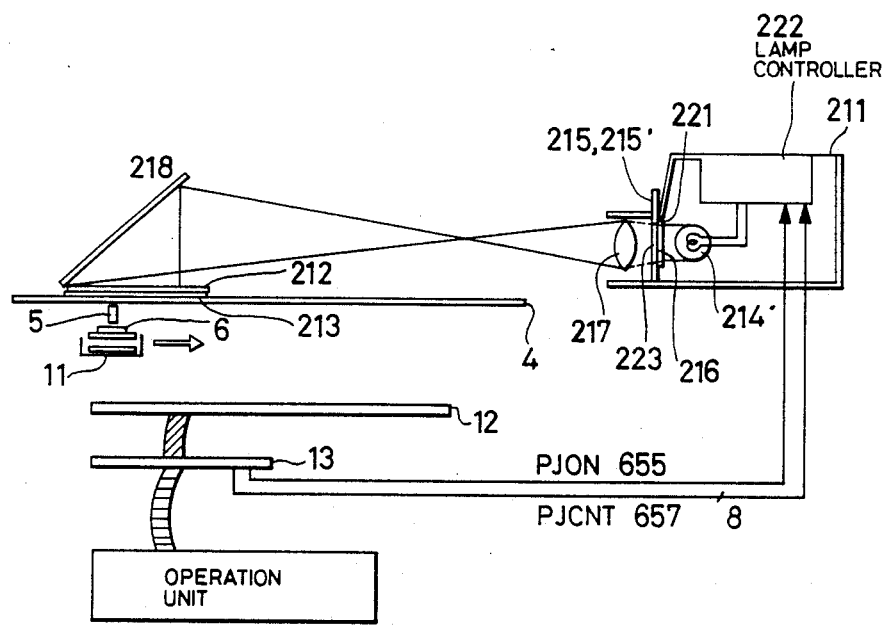
FIG. 23 is a schematic illustration of the construction of a film projector of the embodiment.
Figure 24:
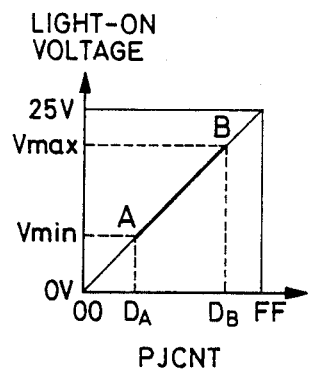
FIG. 24 is a graph illustrating the relationship between the control input of a film exposure lamp and a light-on voltage in the embodiment.

FIG. 23 shows a construction in which a film projector 211 is carried on and connected to the present system (FIG. 1). In FIG. 23, like reference numerals are used to denote like or corresponding elements relative to those shown in FIG. 1. The original document stand 4 carries thereon a mirror unit constituted by a reflection mirror 218, a Fresnel lens 212 and a diffuser panel 213. The aforesaid original document scans in the direction of the illustrated arrow, reading the transmitted light image of a film 216 illuminated by a lamp 214 in the film projector 211 in the same manner as in the case of the reflection-type original document The film 216 is held by a film holder 221 which is fixed to a film carrier 215. A lamp controller 222 controls ON/OFF of the lamp 214 and the light-on voltage of the same in response to signals PJON 655 and PJCNT 657 output from the I/O port of the CPU 22 in the control unit 13 (FIG. 2). The lamp control 222 determines the level of light-on voltage, as shown in FIG. 24, on the basis of the value of the 8-bit input PJCNT 657. The level of light-on voltage is normally controlled between Vmin and Vmax. The input digital data is defined between $D_A$ and $D_B$.

Figure 25A:
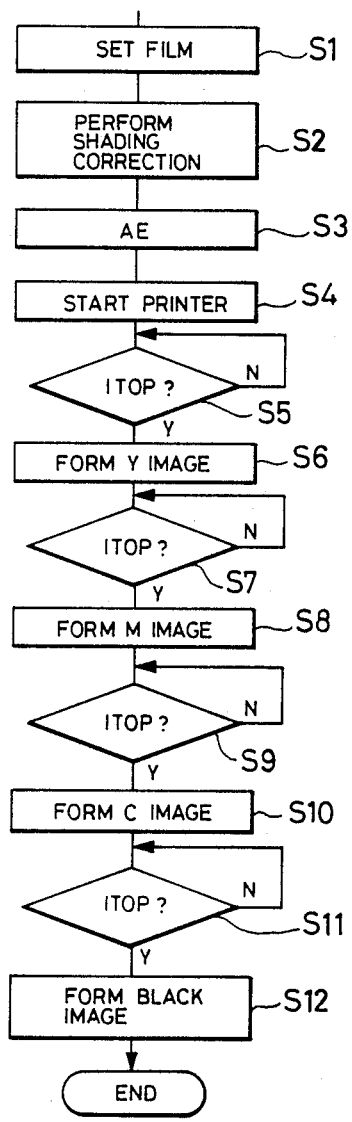
FIGS. 25A, 25B and 25C are views illustrating the film projector which is in use.
Figure 25B:
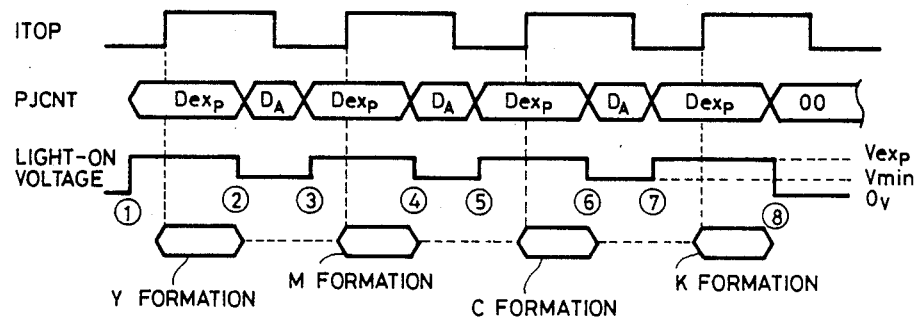

FIG. 25A is a flow chart of operations of reading an image from the film projector and producing a copy thereof, with FIG. 25B being a timing chart diagrammatically illustrating the operations.

In Step S1, the operator sets the film 216 into film projector 211, performs a shading correction which will be described later (Step S2), determines a lamp light-on voltage Vexp by means of AE (Step S3), and starts the printer 2 (Step S4), in accordance with procedures for operations on the operation panel which will be described later. Prior to arrival of the signal ITOP (image top synchronizing signal), the signal PJCNT is set to Dexp (corresponding to a proper exposure voltage) and therefore a stable amount of exposure can be obtained during image formation. After a Y image has been formed by the signal ITOP, the lamp is dimmed by the signal PJCNT corresponding to $D_A$ (a minimum exposure voltage) until the next exposure. This prevents a filament from deteriorating owing to a rush current generated when the lamp is put on, thereby extending the lifetime of the lamp. Subsequently, an M image, a C image and a Bk image are formed in the same manner (Step S7 to Step S12), and then the data PJCNT is set to "00" to put off the lamp.

Figure 29A:
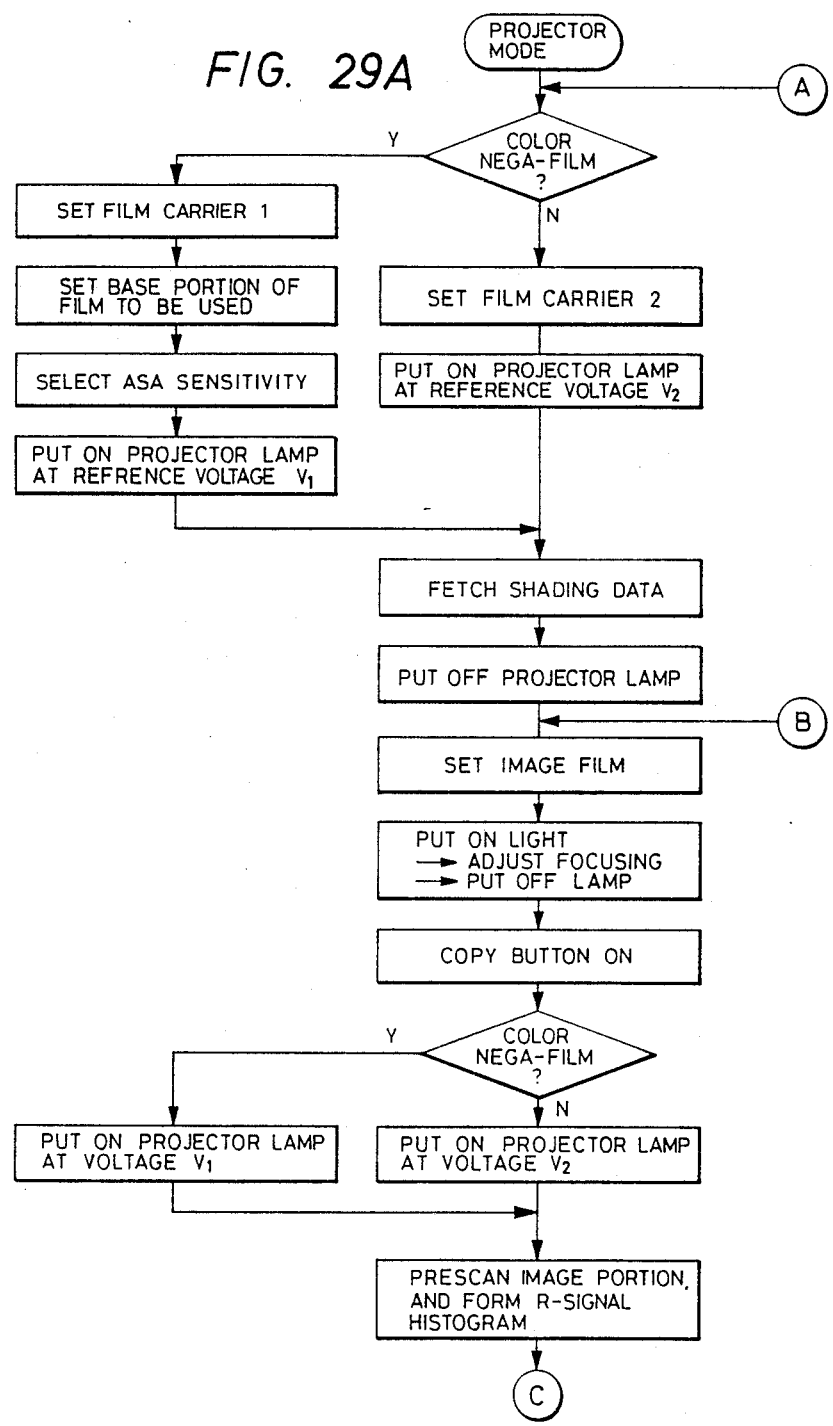
FIGS. 29A and 29B are flow charts illustrating the control operation while the film projector is in use.
Figure 29B:
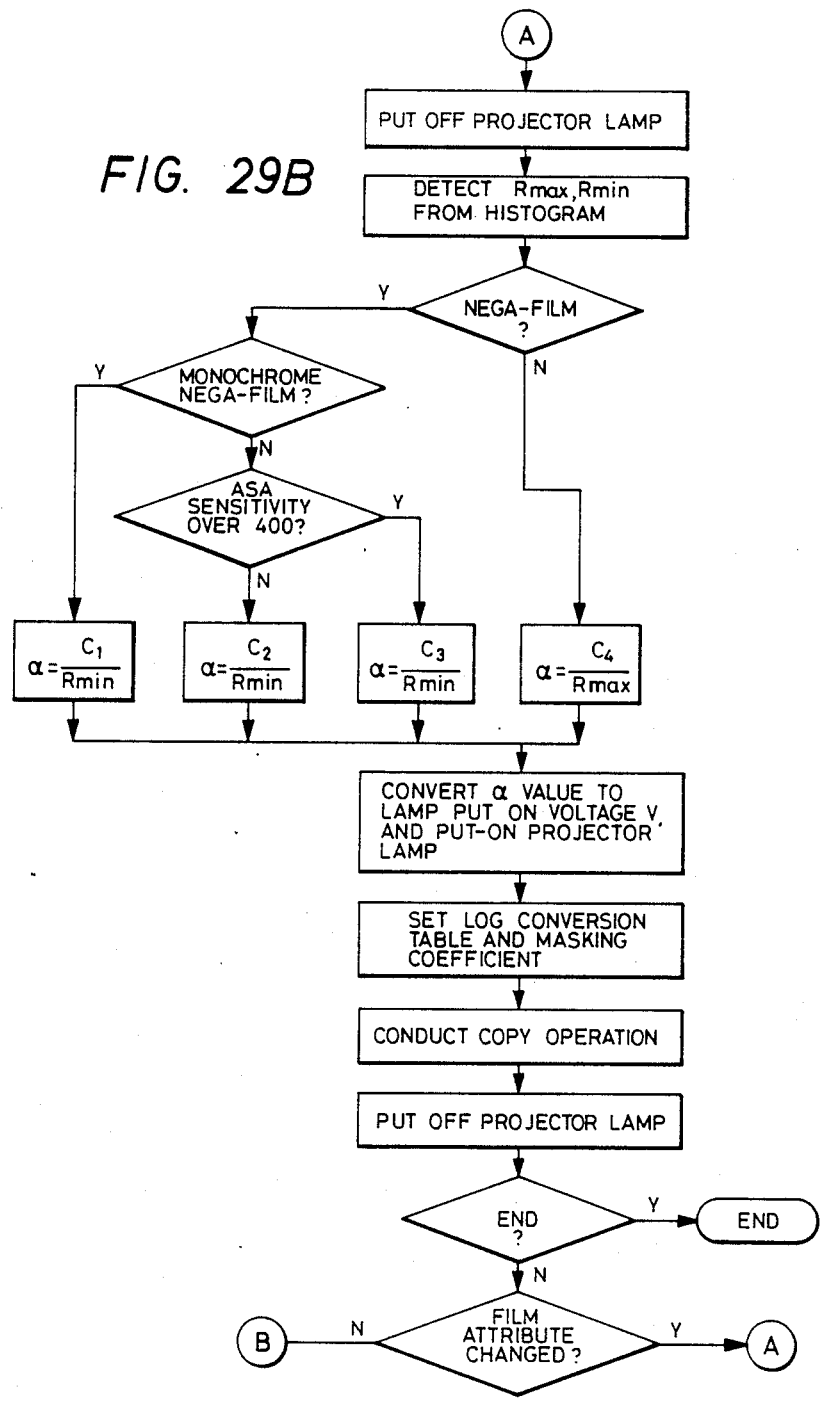

The processing procedures for AE and the shading correction in the projector mode will now be described with reference to the flow charts shown in FIGS. 29A and 29B.

The operator selects the projector mode through the operation panel, and then selects one from among color negative film, color positive film, monochrome negative film and monochrome positive film. In the case of color negative film, the operator sets the film carrier 215 with a cyan color correction filter 223 into the projector, and sets an unexposed portion (film base) of a film to be used into the film holder 221. The operator then selects a desired ASA sensitivity, depending upon whether the ASA sensitivity of the film is more than 100 to less than 400 or 400 or more, and depresses a shading start button to cause the projector lamp to light on at a reference light-on voltage $V_1$. The cyan filter 223 serves to cut the color component of the orange base of a color negative film and adjust the color balance of a color sensor having R, G and B filters. Also, since shading data is obtained from the unexposed portion, a wide dynamic range can be obtained even in the case of color negative films. In the case of films other than color negative films, the operator sets a film carrier 215' having no filter or an ND filter for cutting infrared and ultraviolet rays into the projector and depresses a shading start key on the liquid crystal touch panel to cause the projector lamp 214 to light on at a reference light-on voltage $V_2$. In practice, after the operator performs selection of negative film or positive film, switchover between the reference light-on voltages $V_1$ and $V_2$ may be automatically performed. Subsequently, the scanning unit moves to a central portion of an image projected area, and supplies to a RAM 78' shading data constituted by an averaged value of R, G and B equivalent to one or more lines of CCDs to put off the projector lamp.

Then, the operator loads the image film 216 to be copied into the film holder 221. If focus adjustment is required, the operator puts on the projector lamp through a lamp button and visually adjusts focus. Thereafter, the operator puts off the lamp through the lamp button.

Figure 25C:
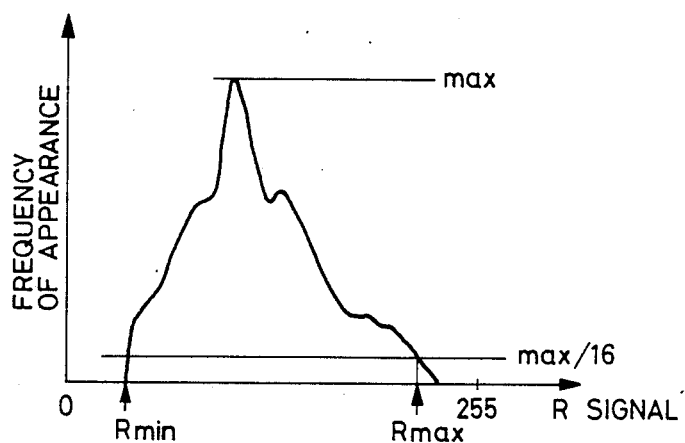

When a copy button is put on, the projector lamp is automatically put on at the reference light-on voltage $V_1$ or $V_2$ in accordance with the result of selection between color negative film and color positive film, the image projected area is prescanned (AE). The prescan is performed by the following procedures in order to judge the photographing exposure level of a film to be copied. R signals corresponding to predetermined lines of the image projected area are input through CCDs, and the R signals versus the frequency of appearance is accumulated to form a histogram such as that shown in FIG. 25C. A value max illustrated is found from the histogram, and values when the histogram crosses a level of 1/16 of the value max, i.e., an R signal Rmax of the maximum value and an R signal Rmin of the minimum value are obtained. Then, a multiple $\alpha$ of the amount of light emitted from the lamp is calculated in accordance with the kind of film which was previously selected by the operator. The value $\alpha$ is calculated as $\alpha = 255/Rmax$ in the case of color or monochrome positive film, $\alpha = C_2/Rmin$ in the case of color negative film having an ASA sensitivity of 400 or less, $\alpha = C_1/Rmin$ in the case of monochrome negative film, and $\alpha = C_3/Rmin$ in the case of color negative film having an ASA sensitivity of less than 400, and color negative film having an ASA sensitivity of 400 or more. $C_1$, $C_2$, and $C_3$ are values which are predetermined in accordance with the gamma characteristic of each film, and become about 40 to about 50 of 255 levels. The $\alpha$ value is converted into output data supplied to a variable voltage source (not shown) of the projector lamp in accordance with a predetermined look-up table. Then, the projector lamp is put on by the thus-obtained lamp light-on voltage V, and the values of the logarithm conversion tables (FIG. 13A) and the masking coefficients (FIG. 16A) are set to suitable values in correspondence with the previously-selected kind of film, to conduct a normal copy operation. As shown in FIG. 13A, a desired logarithm conversion table is selected from eight kinds of logarithm conversion tables by a 3-bit switching signal, such as a reflection-type original document table 1, a color positive film table 2, a monochrome positive film table 3, a color negative film table 4 (ASA: less than 400), a color negative film table 5 (ASA: 400 and more), a monochrome negative film table 6, ... The contents of these tables can be independently set for each of R, G and B. FIG. 13B illustrates one example of the contents of the tables.

In this manner, the copy operation is completed. When the next film is to be copied, the operator judges whether or not the characteristics of the film layer vary (negative or positive, color or monochrome, etc.). If the characteristics vary, the process returns to (A) of FIG. 29A, but, if they do not vary, the process returns to (B) of FIG. 29B. Subsequently, the same operation as described above is repeated.

In this manner, a print output corresponding to any of negative, positive, color and monochrome films is obtained through the film projector 211. As can be seen from FIG. 23, the present system need not handle too many fine characters or lines since a film image is projected in an enlarged manner, but is required to reproduce the natural gradation of an image as seen from usages of film. For this reason, in the present system, gradation processing performed for outputs from the color laser beam printer is made different from that performed for print output from a reflection-type original document. This is performed by a PWM circuit 778 within a printer controller 700 (FIG. 1).

The PWM circuit 778 is described below in detail.

Figure 26A:
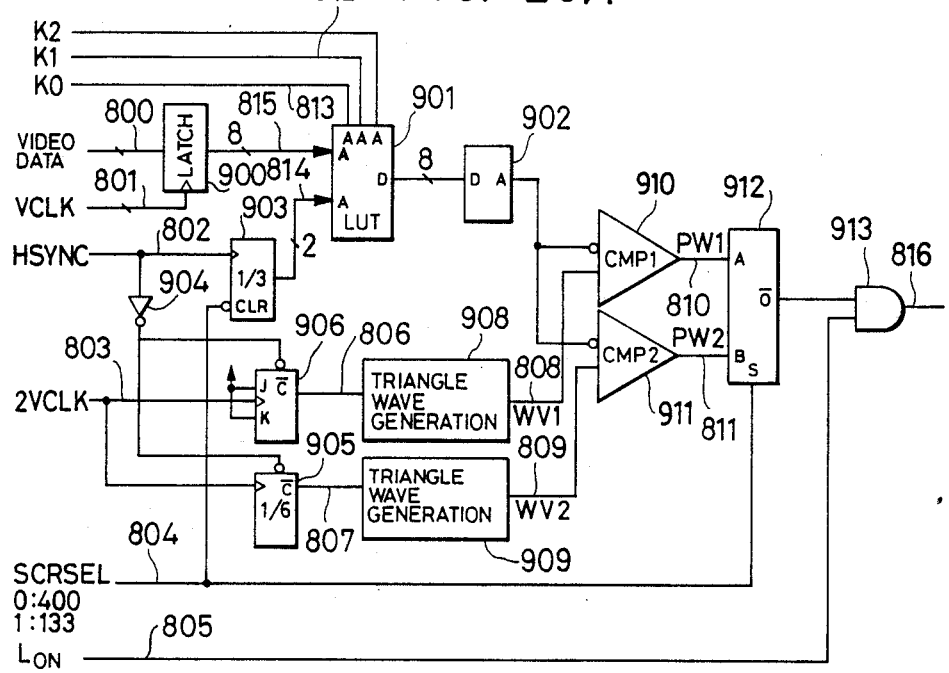
FIGS. 26A, 26B and 26C are views illustrating a PWM circuit and the operation thereof.
Figure 26B:
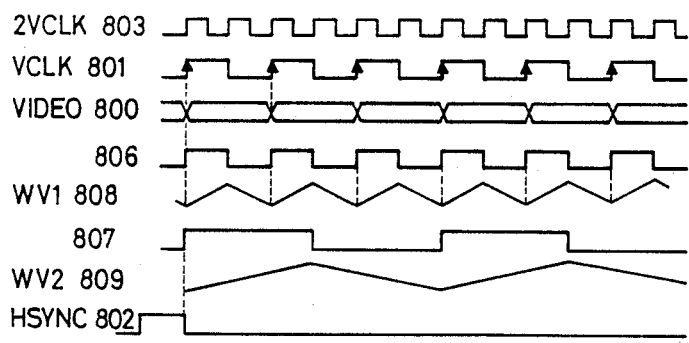

FIG. 26A is a block diagram of the PWM circuit, with FIG. 26B being a timing chart of the operation of the PWM circuit.

Figure 26C:
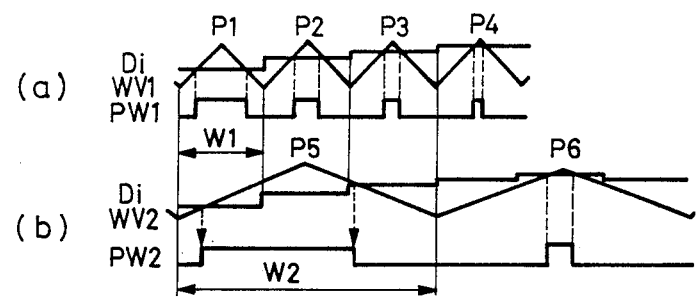

A digital input signal VIDEO DATA 800 is latched by a latch circuit 900 at the timing of a leading edge of a clock VCLK 801, and is thereby synchronized with the clock. (Refer to waveforms 800 and 801 of FIG. 26B.) A signal VIDEO DATA 815 output from the latch circuit 900 is subjected to gradation correction in a look-up table (LUT) 901 constituted by ROMs or RAMs. The signal is then subjected to D/A conversion in a D/A (digital/analog) converter 902 to form one analog video signal. The thus-generated analog video signal is input to the next-stage comparators 910 and 911, and is compared with triangle waves which will be described later. Signals 808 and 809, which are respectively supplied to the other inputs of the comparators 910 and 911, are triangle waves which are independently generated in synchronization with the clock VCLK. More specifically, a J-K flip-flop 906 performs $\frac{1}{2}$ demultiplication of a synchronizing clock 2VCLK 803 with a frequency of twice of that of a clock VCLK to output a reference signal 806, and a triangle wave generation circuit 908 generates a triangle wave $WV_1$ in accordance with the reference signal 806. Another 1/6 J-K flip-flop 905 performs 1/6 demultiplication of the clock 2VCLK 803 to output a reference signal 807, and a triangle wave generation circuit 909 generates a triangle wave $WV_2$ in accordance with the reference signal 807. The thus-obtained wave signals and the signal VIDEO DATA are generated in synchronization with the clock VCLK as shown in FIG. 26B. In addition, a signal HSYNC, which is generated in synchronization with the clock VCLK and which is inverted so as to be synchronized at a signal line HSYNC 802, initializes the respective signals of the circuits 905 and 906 at the timing of the signal HSYNC. Through the above-described operation, signals having the pulse widths shown in FIG. 26C are provided at respective outputs 810 and 811 of the comparators CMP1 910 and CMP2 911. In the present system, when an AND gate 913 shown in FIG. 26A outputs "1", a laser is put on to print dots on a print paper. When the AND gate 913 outputs "0", the laser is put off and nothing is printed on the print paper. The AND gate 913 is controlled by a control signal LON 805. FIG. 26C illustrates a case where the level of an image signal D varies from left to right, i.e., "black" to "white". Since "white" and "black" are respectively input as "FF" and "00" to the PWM circuit, the output of the D/A converter 902 varies as shown by line Di. The triangle wave $WV_1$ and the triangle wave $WV_2$ vary as shown in Parts (a) and (b) of FIG. 26C, respectively. Therefore, the pulse widths of outputs PW1 and PW2 of the comparators CMP1 and CMP2 become narrow as the level of the image signal D varies from "black" to "white". Also, as can be seen from FIG. 26C, if the output PW1 is selected, dots are printed on the print paper at intervals of $P_1 \rightarrow P_2 \rightarrow P_3 \rightarrow P_4$, and the variation of the pulse width has a dynamic range W1. On the other hand, if the output PW2 is selected, dots are printed at intervals of $P_5 \rightarrow P_6$, and the pulse width has a dynamic range W2. The dynamic range and the intervals of the output PW2 is three times those of the output PW1. For example, when PW1 is selected, print density (the degree of resolution) is set to about 400 lines/inch and, when PW2 is selected, the print density is set to about 133 lines/inch. As can be seen from the foregoing, if PW1 is selected, the degree of resolution becomes about three times as high as that in the case of PW2. On the other hand, if PW2 is selected, the dynamic range of the pulse width is about three times as wide as that in the case of PW1, whereby the quality of gradation is significantly improved. Accordingly, an external circuit outputs a selection signal SCRSEL 804 to a selector 912 so that PW1 and PW2 are selected, depending upon whether a high degree of resolution or a high degree of gradation is desired. When the signal SCRSEL 804 is "0", a selector 912 in FIG. 26A selects an input A and outputs the signal PW1 through an output terminal $\overline{O}$ while, when the SCRSEL 804 is "1", the selector 912 selects an input B and outputs the signal PW2 through the output terminal $\overline{O}$. The laser is put on during the resultant pulse width to print dots.

The LUT 901 is a table conversion ROM for gradation correction, and has address inputs which receive signals $K_1$, $k_2$ through lines 812, 813, a table switch signal through a line 814, and a video signal through a line 815. The LUT 901 outputs the signal VIDEO DATA which has been corrected. For example, if the signal SCRSEL 804 is set to "0" to select PW1, all the outputs of a ternary counter 903 go to "0" and thus a correction table for PW1 is selected in the LUT 901. The signals $K_0$, $K_1$, and $K_2$ are switched over in accordance with a color signal to be output. For example, when $K_0$, $K_1$, and $K_2$ = "0, 0, 0", the LUT 901 outputs yellow; when $K_0$, $K_1$, and $K_2$ = "0, 1, 1", the LUT 901 outputs magenta; and, when $K_0$, $K_1$, and $K_2$ = "1, 1, 0", the LUT 901 outputs black. Thus the gradation correction characteristics are switched over in correspondence with each color image to be printed, thereby compensating for a difference in gradation characteristic between the individual colors which derive from a difference in image reproduction characteristic between the colors of the laser beam printer. In addition, a wide range of gradation correction is enabled by varying a combination of $K_2$, $K_1$, $K_0$. For example, it is also possible to switch over the gradation conversion characteristic of each color in accordance with the kind of an input image. On the other hand, when the signal SCRSEL 804 is set to "1" to select PW2, the ternary counter 903 counts synchronizing signals of a line and outputs "1"→"2"→"3"→"1"→"2"→"3"→ . . . to the address input (814) of the LUT 901. Thus, the quality of gradation can be further improved by switching gradation correction tables in correspondence with each line.

The method of improving the quality of gradation will be described in detail below with reference to FIGS. 27A and 27B. A curve A in FIG. 26A is an input data vs. print density characteristic curve when input data is varied from "FF", i.e., "white" to "0", i.e., "black" by selecting PW1. It is desirable that a standard characteristic coincide with a line K. Therefore, a characteristic B which is reverse to the characteristic A is set in the gradation correction table. FIG. 27B shows gradation correction characteristics A, B and C for each line when PW2 is selected. In this case, the pulse width is varied in the main-scan direction (the direction of laser scan) by employing the aforesaid triangle waves and at the same time three step of gradation are provided in the sub-scan direction (the direction of image feed), thereby further improving the gradation characteristics. More specifically, sharp variations in density are mainly reproduced by the characteristic A, a gradually varying gradation is reproduced by the characteristic C, and a middle gradation therebetween is effectively reproduced by the characteristic B. Accordingly, even if PW1 is selected, a certain degree of gradation is retained at a high degree of resolution. If PW2 is selected, an excellent quality of gradation is achieved. Referring to the aforesaid pulse width, in the case of PW2, an ideal pulse width W is $0 \leq W \leq W2$. However, as shown in FIG. 28A, because of the electrophotographic characteristics of the laser beam printer and response characteristics of the laser drive circuit or the like, there is an area of $0 \leq W \leq W2$ in which the laser printer does not print dots (does not respond) as the pulse width becomes smaller than a certain width and an area of $0 \leq W \leq W2$ in which the density is saturated. For this reason, the pulse width is selected to vary in an effective area of $Wp \leq W \leq W2$ in which the linearities of the pulse width and the density are retained. As shown in FIG. 28B, when input data varies from "0" (black) to "$FF_H$" (white), the pulse width varies from Wp to Wg to retain the linearities of the input data and the density.

The video signal which is converted into the pulse width in this manner is applied to a laser driver 711L via a line 224, and thus a laser beam LB is modulated.

Figure 2:
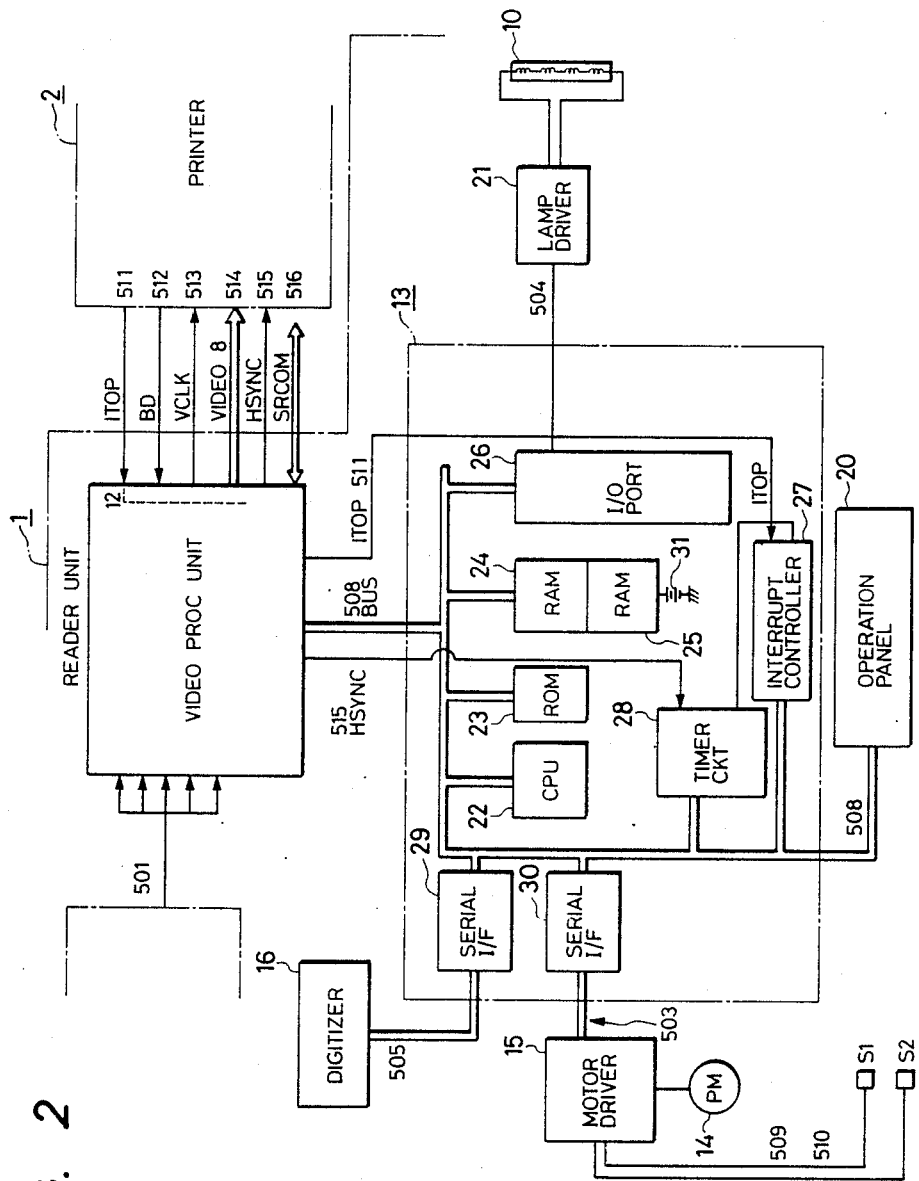
FIG. 2 is a block diagram illustrating the control of a control unit of a reader unit of the embodiment shown in FIG. 1.

It is to be noted that the FIG. 26A signals $K_0$, $K_1$, $K_2$, SCRSEL, and LON are output from a control circuit (not shown) of the printer controller 700 in FIG. 2 through a serial communication (described previously) with the reader unit 1. In the case of a reflection-type original document, the signals SCRSEL is set to "0" while, in using the film projector, the SCRSEL is set to "1", thereby enabling further natural reproduction of gradation.

IMAGE FORMING OPERATION

Figure 30:
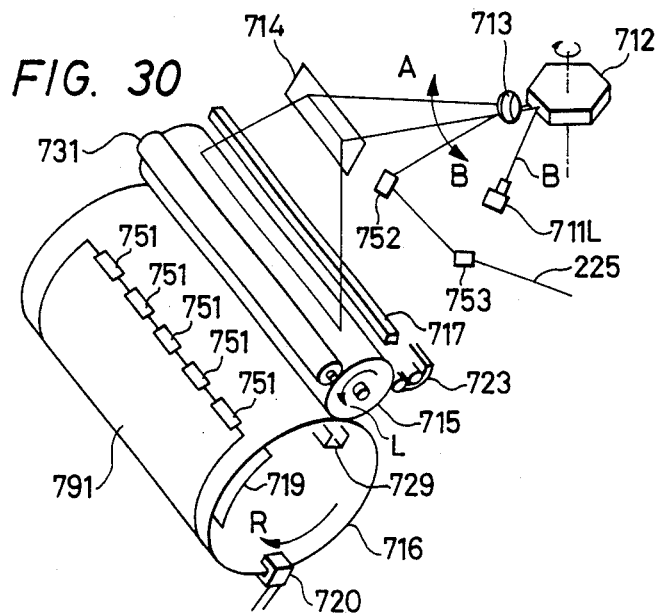
FIG. 30 is a diagrammatic perspective view of a laser printer portion of the embodiment.

The laser beam LB which is modulated in accordance with image data is caused to scan at high speed and horizontally within a width equivalent to the length of an double-headed arrow A - B of FIG. 30 by the polygon mirror 712 which rotates at high speed. The high-speed scanning laser beam is focused on a surface of the photosensitive drum 715 by the f/θ lens 713 and the mirror 714, and exposes the surface of the drum 715 to dots corresponding to the image data. One horizontal scan of the laser beam corresponds to one horizontal scan of the original-document image and, in this embodiment, corresponds to a width of 1/16 mm parallel to the direction of image feed (the sub-scan direction).

In the meantime, the photosensitive drum 715 is rotating at a constant speed in the direction of an arrow R in FIG. 30. Therefore, the laser beam scans the photosensitive drum 715 in the main-scan direction while the photosensitive drum 715 is rotating at a constant speed in the sub-scan direction. In this fashion, a flat image is sequentially projected onto the surface of the drum 715 and thus a latent image is formed in the surface. A toner image is formed by uniformly charging the drum surface by the electrostatic charger 717 prior to the exposure, that exposure is performed, and then toner development is performed by means of the development sleeves 713. For example, when a latent image corresponding to a first original document exposure scan in the color reader is developed by means of the development sleeve 731Y containing yellow toner, a toner image corresponding to the yellow component of the document original 3 is formed on the photosensitive drum 715.

The sheet 754 is wound around the transfer drum 716, with its leading end held by the gripper 751, and a yellow toner image is transferred to and formed on the sheet 754 by the transfer charger 729 provided at a contact point between the photosensitive drum 715 and the transfer drum 716. Each of magenta (M), cyan (C), and black (BK) images is formed by repeating the same processing, and the respective toner images are superimposed on the sheet 754, thereby forming a full color image consisting of four color toner.

Subsequently, the transfer sheet 754 is peeled from the transfer drum 716 by the movable peeling pawl 750 shown in FIG. 1, and is in turn transported to the image fixing unit 743 by means of the feed belt 742. The toner image is fused and fixed on the transfer sheet 754 by the heat pressure rollers 744 and 745 in the fixing unit 743.

CONTROL UNIT

Figure 31:
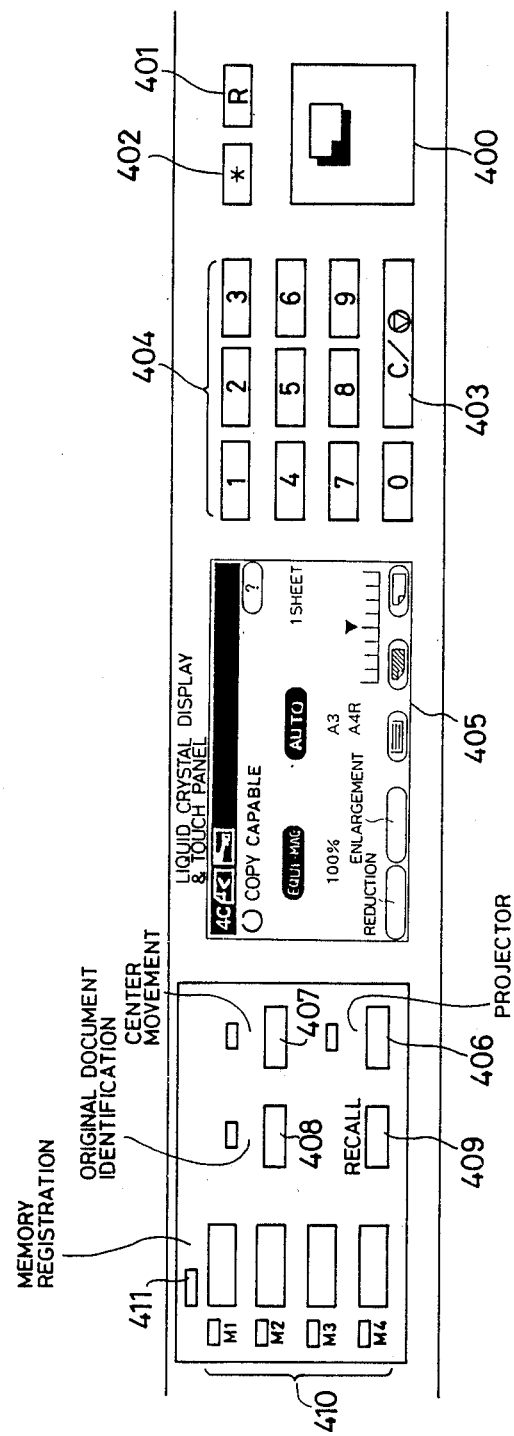
FIG. 31 is a top plan view of the control unit of the embodiment.

FIG. 31 illustrates the control unit of the copying machine of the present invention.

A key 401 is a reset key for resetting a given mode to the standard mode. A key 402 is an enter key for setting a registration mode which will be described later. A key 403 is a clear/stop key for clearing a number which is previously set and for stopping a continuous copy operation. A liquid crystal display and touch panel 405 displays each mode set through touch panel keys and the state of the color printer 2. A key 407 is a center movement key for designating center movement in a movement mode which will be described later. A key 408 is an original document identification key for selecting the operation of automatically detecting the size of an original document and the position of the original document. A key 406 is a projector key for designating a projector mode which will be described later. A key 409 is a recall key for recalling the preceding setting of a copy operation. Keys 410 are memory keys (M1, M2, M3, M4) for memorizing or calling settings or the like in each mode which is previously programmed. A key 411 is a registration key for registering data in each memory.

DIGITIZER

Figure 32:
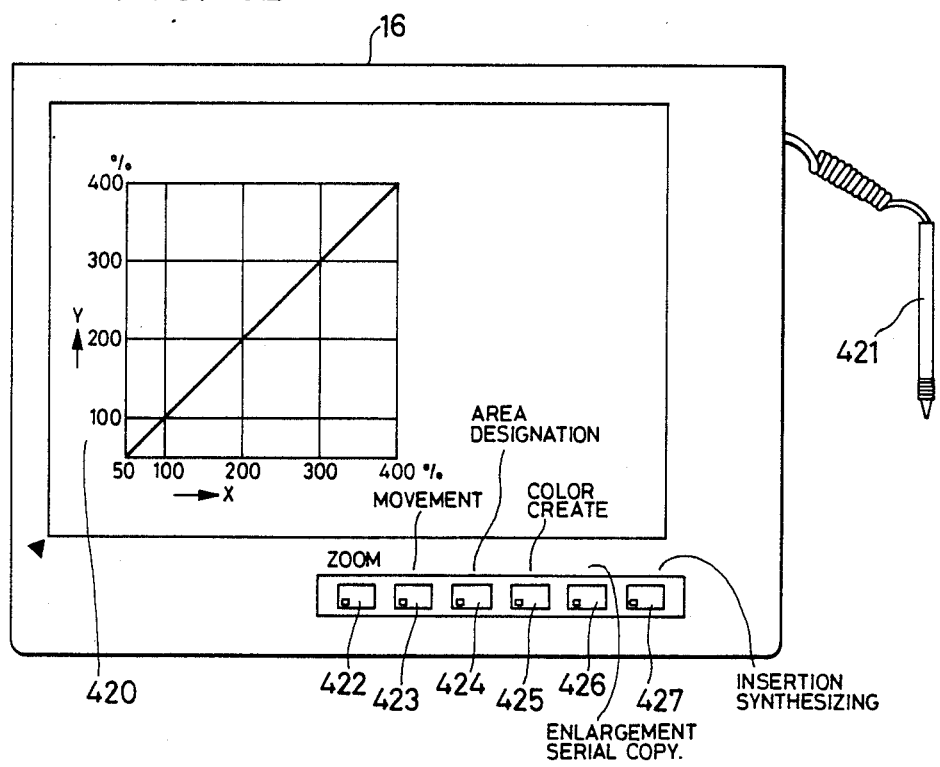
FIG. 32 is a top plan view of a digitizer of the embodiment.

FIG. 32 diagrammatically illustrates the appearance of the digitizer 16. Keys 422, 423, 424, 425, 426 and 427 are entry keys for setting each mode which will be described later. A coordinates detecting panel 420 is a coordinate-position detecting panel on which a given area on the original document is designated or desired magnification is selected. A point pen 421 is used to designate such coordinates. Data representing key input or coordinate input is transferred via the bus 505 from those keys 422 to 427 or the coordinates detecting panel 420 to the CPU 22. Thus the data is stored in the RAMs 24 and 25.

STANDARD IMAGE PLANE

Figure 33:
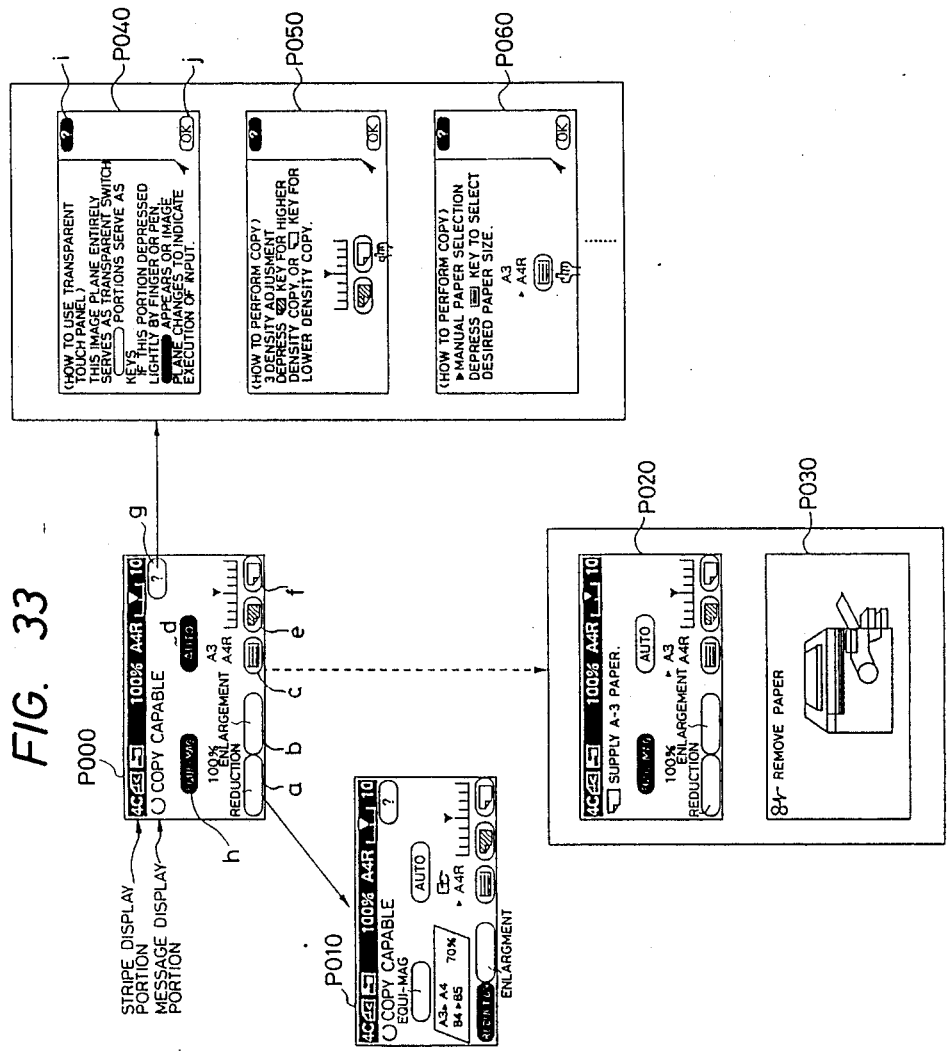
FIG. 33 illustrates a standard image plane displayed on a liquid crystal display of the embodiment.

FIG. 33 illustrates the standard image plane P000. The standard image plane P000 is displayed during a copy operation or while no specific mode is set. In the standard image plane P000, magnification change, paper selection and density adjustment are performed. At the bottom left of the standard image plane P000, a fixed magnification change can be designated. When a touch key (reduction) a is depressed, variations in paper size and a corresponding magnification is displayed, as shown for example in a image plane P010. When a touch key (enlargement) b is depressed, variations in paper size and a corresponding magnification are similarly displayed. In the present color copying machine, reductions and enlargements can be selected in three steps, respectively. When a touch key h (equi-mag) is depressed, an equi-magnification of 100% is again selected. When a touch key c at the bottom center of the standard image plane P000, an upper cassette or a lower cassette is selected. When a touch key d is depressed, an APS (auto paper select) mode is set which enables automatic selection of a cassette which accommodates paper having a size closer to a selected size of the original document. When touch keys e and f at the bottom right of the image plane are depressed, the density of a print image is adjusted and the setting of density adjustment is enabled during copying. When a touch key g is depressed, the usage of each touch key, the way of performing copy or other instructions required for the operation of the present color copying machine are displayed as instruction image planes. The operator can easily operate the copying machine with reference to each of the instruction image planes. Such an instruction image plane is prepared for not only the standard image plane but also each mode which will be described later. A black stripe display portion at the top of the image plane displays the state of a mode which is currently selected, and the operator can check the presence and absence of an erroneous operation or the state of setting in each mode. A message display portion immediately below the stripe display portion displays the state of the present color copying machine like an image plane P020 and a message representing, for example, an erroneous operation. In addition, in the case of display of a message indicating the occurrence of a paper jam or the supply of the toner of each color, the printer unit a is displayed in the entire image plane and therefore the operator can easily find the position of the paper with reference to the displayed image of the printer unit 2.

ZOOM MAGNIFICATION CHANGE MODE

A zoom magnification change mode M100 is a mode in which printing is performed with the magnification of the size of the original document being changed, and includes a manual zoom magnification change mode M110 and an auto zoom magnification change mode M120. In the manual zoom magnification change mode M110, magnification in the X direction (the sub-scan direction) and that in the Y direction (the main-scan direction) can be independently set in steps of 1% through an editor or the touch panel. In the auto zoom magnification change mode M120, a suitable ratio of magnification change is automatically calculated in accordance with the size of the original document and a selected paper size and thus copy is performed at the suitable ratio of magnification change. The auto zoom magnification change mode M120 includes four kinds of modes; an XY independent auto magnification change mode, an XY same rate auto magnification change mode, an X auto magnification change mode, and a Y auto magnification change mode. In the XY independent auto magnification change mode, a magnification in the X direction and that in the Y direction are independently automatically set so that the size of the original document or an area designated on the original document may be changed to a selected paper size. In the XY same rate auto magnification change mode, magnification is changed in the X and Y directions at an equal ratio which is the smaller value of the results calculated in the XY independent auto magnification change mode, and copy is performed at the thus-changed magnification. The X auto magnification change mode is a mode in which magnification is automatically changed in the X direction only while the Y auto magnification change mode is a mode in which magnification is automatically changed in the Y direction only.

Figure 34:
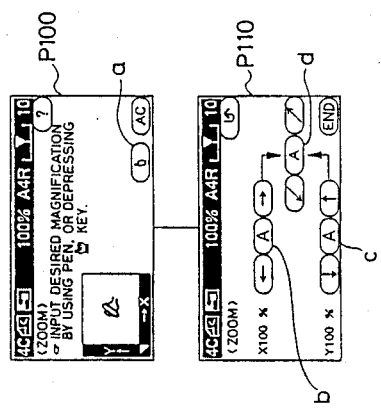
FIG. 34 illustrates the operation of a zoom mode.

The method of operating the zoom magnification change mode will now be described with reference to the liquid crystal display shown in FIG. 34. When a zoom key 422 on the digitizer 422 is depressed, an image plane P100 of FIG. 34 is displayed. In a case where setting of the manual zoom magnification change is selected, a desired intersection point of the magnification on the X axis and that on the Y axis which are provided on the coordinates detecting panel 420 of the editor 16 is designated by using a point pen 421. At this time, an image plane P110 is displayed which indicates the designated values of magnification in the X and Y directions. In addition, if fine adjustment of the displayed magnification is needed, for example, in the X direction only, up and down keys on the right and left sides of the touch key b are depressed. If the magnification need be finely adjusted in the X and Y directions at the same ratio, up and down keys on the right and left sides of the touch key d are depressed. In a case where setting of the auto zoom magnification change is selected, the digitizer 16 is used through the image plane P100 or the touch key a is depressed to display the image plane P110. Thus, the touch keys b and c, d, b, and c are respectively depressed to select a desired one from among the above-described four kinds of auto zoom magnification change modes; the XY independent auto modification change mode, the XY same rate auto modification change mode, the X auto modification change mode, and the Y auto modification change mode.

MOVEMENT MODE

Figure 43:
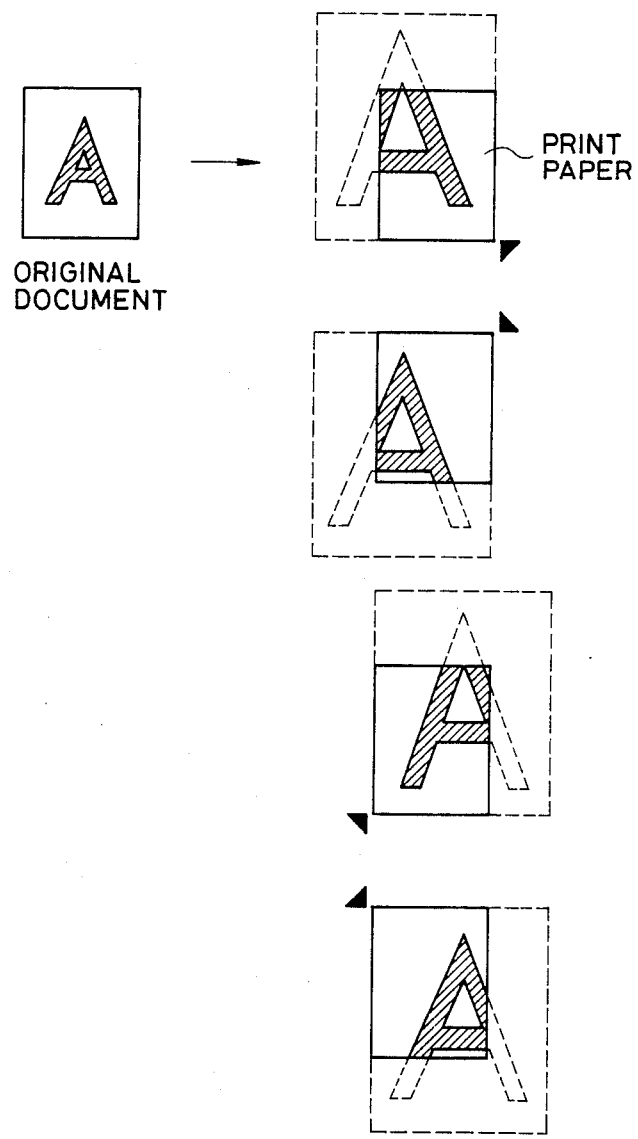
FIG. 43 illustrates examples of a printed image in the corner movement mode.

A movement mode M200 includes four kinds of movement modes; a center movement mode M210, a corner movement mode M220, a designation movement mode M230, and a binding margin mode M240. The center movement mode M210 is a mode in which centering is performed so that the original document or an area designated on the same may be printed in the center of paper of selected size. The corner movement mode M220 is a mode in which a desired corner of the image of the original document or that of an area designated on the original document is moved to one of the four corners of paper of selected size. Even if an image to be printed is larger than a selected paper size as shown in FIG. 43, the movement of the image is controlled so that the image may be moved from a a designated corner serving as a start point. The designation movement mode M220 is a mode in which the image of the original document or that of an area designated on the same is moved to a given position on the paper of the selected size. The binding margin mode M240 is a mode in which an image to be printed is moved so that binding margins may be provided on the right and left sides of paper of a selected size in the direction of paper feed.

A method of operating the present color copying machine in practice will now be described with reference to FIG. 35A. When the movement key 423 of the digitizer 16 is depressed, an image plane P200 is displayed. In the image plane P200, a desired mode is selected from among the above-mentioned four kinds of movement modes. If the center movement mode is to be selected, a touch key a in the image plane P200 is depressed. In order to select the corner movement mode, a touch key b is depressed to display an image plane P230, in which a desired one of the four corners is designated. The direction of movement designated in the image plane P230 corresponds to the direction of movement on actual print paper which corresponds to the paper accommodated in a selected cassette which would be placed on the digitizer 16 without changing the direction of the paper. If the designation movement mode is to be selected, a touch key c in the image plane P200 is depressed to display the image plane P210, in which a desired movement position is designated through the digitizer 16. At this time, an image plane P211 is displayed in which the up and down keys are employed to perform fine adjustment of the movement position. If a binding margin is to be moved, a touch key d in the image plane P200 is depressed to designate the length of the margin is designated through up and down keys in the image plane P220.

AREA DESIGNATION MODE

An area designation mode M300 is a mode in which one or more areas on the original document is enabled and in which a desired one of a trimming mode M310, a masking mode M320, and a image separation mode M330 is set for each area. The trimming mode M310 is a mode in which only the inside of a designated area is copied. The masking mode M320 is a mode in which copy is performed with the inside of a designated area being masked with a white image. In addition, in the image separation mode M330, a desired mode can be selected from among a color mode M331, a color correction mode M332, a paint mode M333, and a color balance mode M334. In the color mode M331, a designated area can be colored by a desired color mode selected from among nine kinds of color modes; a four full color mode, a three full color mode, a yellow mode, a magenta mode, a cyan mode, a black mode, a red mode, a green mode, and a blue mode. The color conversion mode M332 is a mode in which a portion painted with a predetermined color having a certain density range in a designated area being substituted for a given color copy and copy is thus performed.

The paint mode M333 is a mode in which an image with a designated area the entire surface of which is uniformly painted with a given color is copied. The color balance mode M334 is a mode in which each of the densities of Y, M, C and Bk in a designated area is adjusted so as to obtain a print 5 including a non-designated area and the designated area having a color balance (tone) different from that of the non-designated area.

Figure 36:
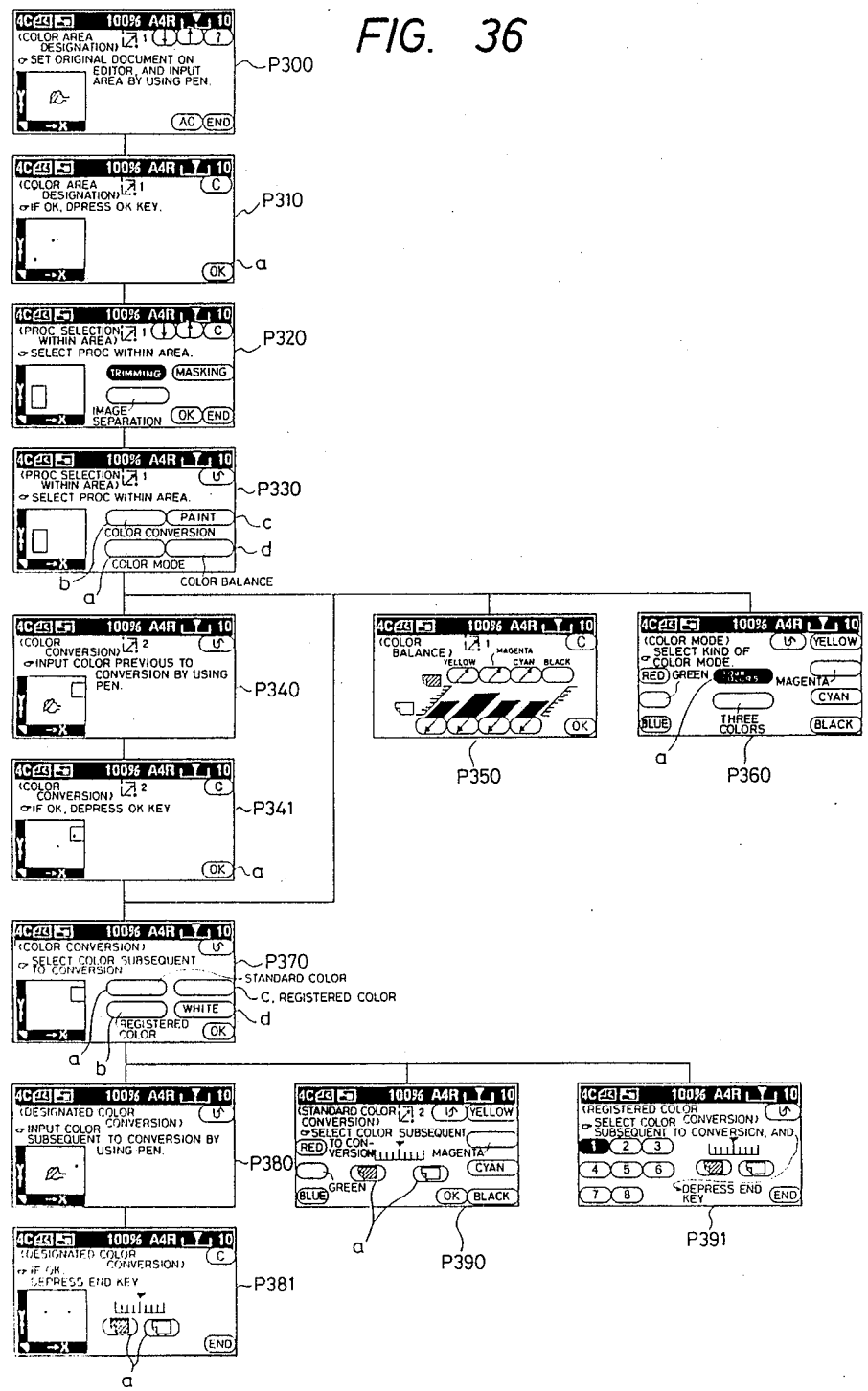
FIG. 36 illustrates the operation of an area designation mode.

A concrete method of operating the area designation mode M300 of this embodiment will now be described in sequence with reference to FIG. 36. When the area designation key 424 on the digitizer 16 is depressed, the liquid crystal display is changed to an image plane P300. The original document is placed on the digitizer 16, and a desired area is designated by using the point pen 421. When two points required for defining the desired area are input, an image plane P310 is displayed. After it has been confirmed that a proper area is designated, a touch key a in the image plane P130 is depressed. A desired area designation mode is selected from among "TRIMMING", "MASKING" and "IMAGE SEPARATION" which are displayed in the image plane P320, and a key corresponding to the selected mode is depressed. If "TRIMMING" or "MASKING" is designated, the touch key a in the image plane P320 is depressed to cause the process to proceed to the succeeding area designation. If "IMAGE SEPARATION" is selected in the image plane P320, the display proceeds to an image plane P330 in which a desired one is selected from among "COLOR", "PAINT", "COLOR MODE" and "COLOR BALANCE". If the image within the designated area is to be printed, for example, in four colors of Y, M, C and Bk, a touch key a (color mode) in the image plane P330 is depressed to select an image plane P360. In the image plane P360, a touch key a is depressed to select one of the nine kinds of color modes, and this completes the designation for printing the area in four full colors.

In the image plane P330, when a touch key b for designating "COLOR CONVERSION" is depressed, the display proceeds to an image plane P340 and a point having color data the color conversion of which is desired is designated by using the point pen 421. If a proper position is designated, a touch key a in an image plane P370 is depressed to cause the display to proceed to an image plane P370. In the image plane P370, color designation after color conversion is performed to designate a desired one of a standard color, a designated color, a registered color, and white. When a touch key a in the image P370 corresponding to the standard color is selected, an image plane P390 is displayed, in which one desired color of yellow, magenta, cyan, black, red, green and blue is designated. More specifically, the standard color is color data which is intrinsically provided in the present color copying machine. In this embodiment, the standard color is printed at a ratio such as that shown in FIG. 45, that is, at an middle density as the density of a printed image. However, there are of course some instances where the density of the designated color need be to some extent increased or decreased. For this reason, density designation keys a and b can be displayed in the center of the image plane P390 to perform color conversion at a desired degree of density.

When a touch key (designated color) c in the image plane P370 is selected, the display proceeds to an image plane P380. In the image plane P380, a point having color data subsequent to the color conversion is designated by using the point pen 421 by a designation method similar to that of designating color coordinates prior to the color conversion. The process proceeds to an image plane P381. In the image plane P381, when color conversion is to be performed with the density of the designated coordinates being varied without changing the color of the same, designation adjustment keys a displayed in the center of the image plane P381 are depressed. Thus color conversion is performed at a desired degree of density.

In the image plane P370, if neither the standard color nor a desired color is present on the original document, color conversion can be performed by using color data registered in a color registration mode M710 which will be described later. In this case, a touch key c in the image plane P370 is depressed to select an image plane P391. In the image plane P391, a desired touch key is depressed which corresponds to the number of a desired color of all the registered colors. In this case as well, the density of the selected registered color is varied without changing the ratio of the color components. When a touch key (white) c is depressed in the image plane P370, a similar effect to that of the aforesaid masking mode M310 can be obtained.

When the paint mode M333 of the image separation mode M330 is to be designated, a touch key c in the image plane P330 is depressed to display the image plane P370. The following color designation after painting is performed by completely the same operation as that of the color conversion mode M332 displayed in the image planes P370, P380, P381, P390, and P391.

In the image plane P330, when a designated area alone is to be printed with a desired color balance (tone), a touch key (color balance) d is depressed to display an image plane P350. In the image plane P350, the densities of yellow, magenta, cyan, and black which consist of toner components accommodated in the printer unit 2 are adjusted by employing up/down touch keys. The black bar graph displayed in the image plane P350 represents the states of the designated density of the color components, and visible scales are displayed on opposite sides of the bar graph.

COLOR CREATE MODE

Figure 41:
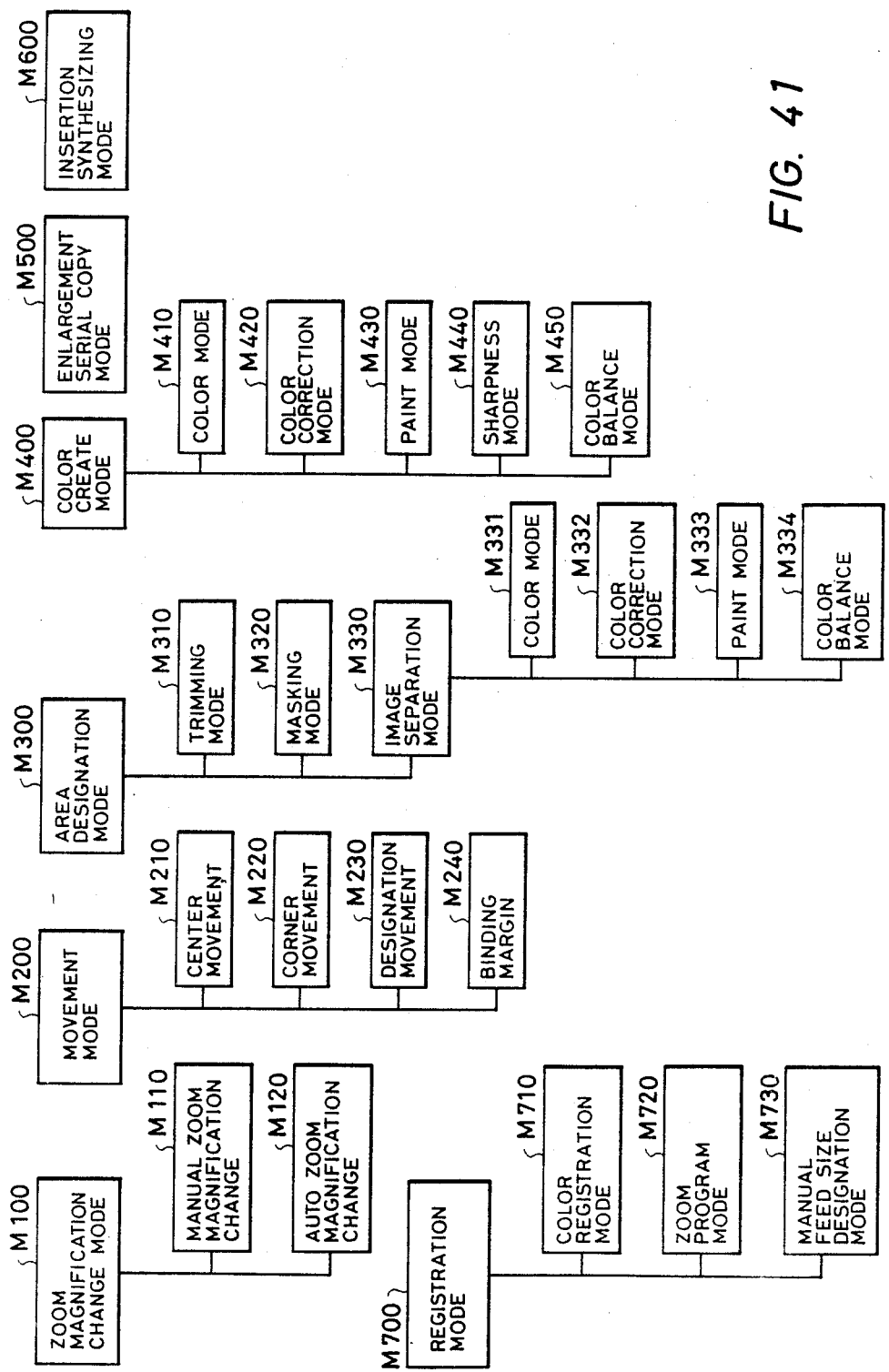
FIG. 41 is a chart of the functions of the color copying machine constituting the preferred embodiment of the present invention.

As shown in FIG. 41, a color create mode M400 includes a color mode M410, a color conversion mode M420, a paint mode M430, a sharpness mode M440, and a color balance mode M450. In the color create mode M400, one or more modes of these five kinds of modes can be designated.

The color mode M311, the color conversion mode M332, the paint mode M333, and the color balance mode M400 of the area designation mode M300 differ from those of the color create mode M400 solely in that the latter mode M400 functions with respect to not only an area designated on the original document but also the whole of the same. Since the other functions are completely the same, the descriptions of the aforementioned modes M410, M420, M430, and M450 are omitted.

The sharpness mode M440 is a mode in which the sharpness of an image is adjusted, that is, the degree of enhancement of the edges of character images and that of smoothing of a halftone dot image are adjusted.

Figure 37:
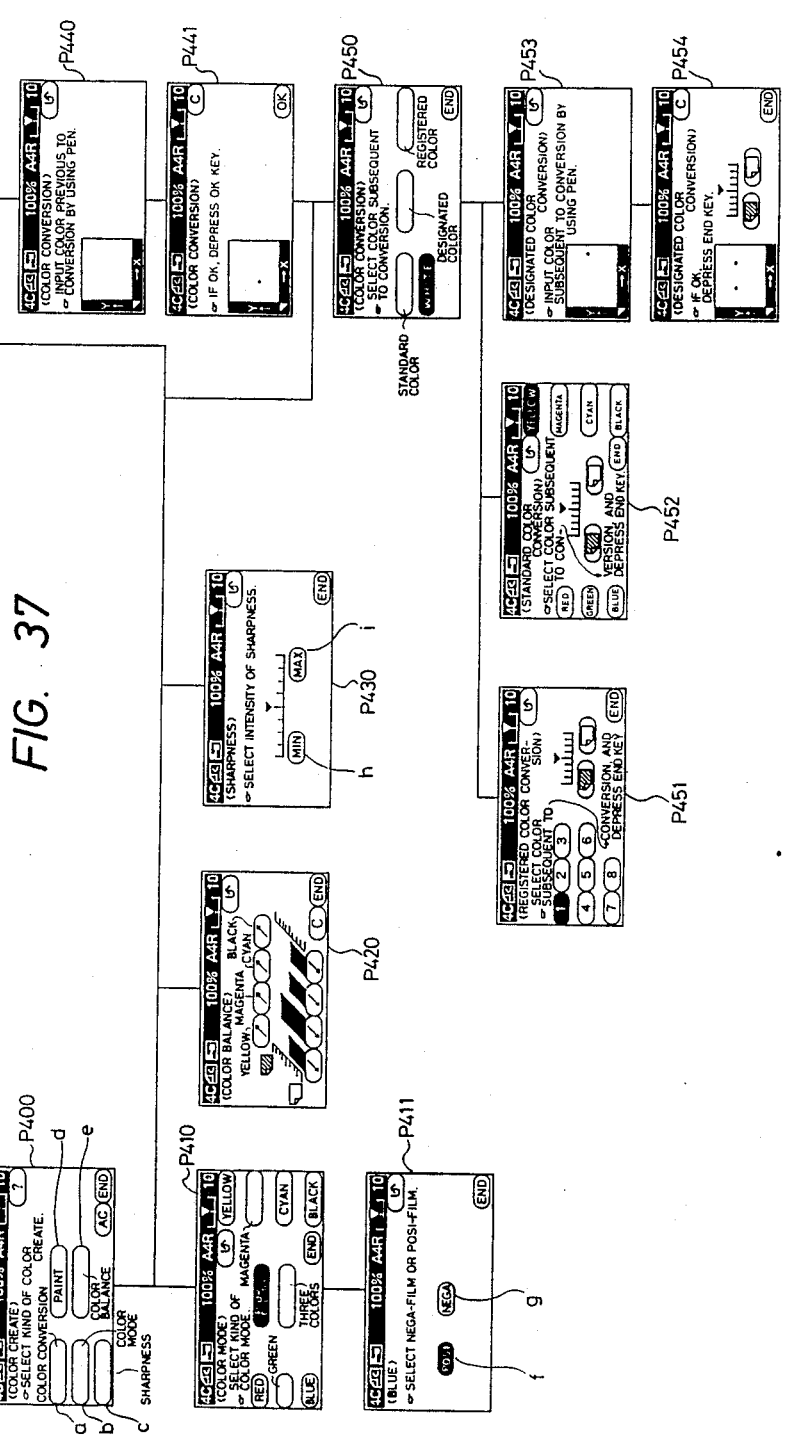
FIG. 37 illustrates the operation of a color create mode.

A method of setting the color create mode M400 will now be described with reference to FIG. 37. When the color create mode key 425 on the digitizer 16 is depressed, the liquid crystal display is changed into an image plane P400. When a touch key (color mode) b in the image plane P400 is depressed, the process proceeds to an image plane P410, in which the color mode of a desired color is selected. When a monochrome color mode other than a three-color mode and a four-color mode is selected, the display proceeds to an image plane P411, in which a negative film or a positive film is selected. When a touch key (sharpness) d in the image plane P400 is depressed, the display is changed into an image plane P430, in which the sharpness of a copy image can be adjusted. When a touch key "MAX" i in the image plane P430 is depressed, the degree of edge enhancement increases as described previously to clearly copy thin lines such as character images. On the other hand, when a touch key "MIN" h in the image plane P430 is depressed, peripheral pixels are smoothed and thus the degree of smoothing increases, thereby erasing moires from the copy image of a halftone dot original document.

The operations of the color conversion mode M420, the paint mode M430, and the color balance mode M450 are completely the same as those of the corresponding modes in the area designation mode. Therefore, the descriptions of these modes are omitted.

INSERTION SYNTHESIZING MODE

Figure 42A:
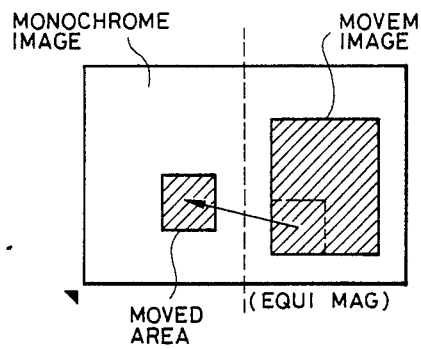
FIGS. 42A, 42B, 42C, 42D, 42E, 42F and 42G illustrate an insertion synthesizing mode.
Figure 42B:
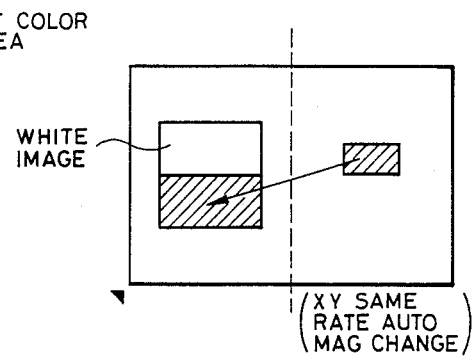
Figure 42C:
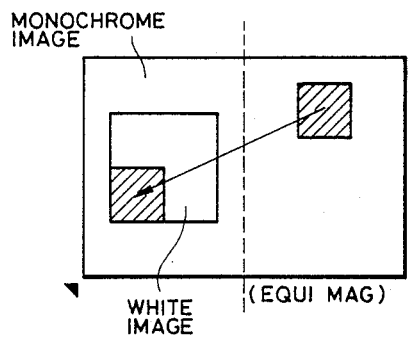
Figure 42D:
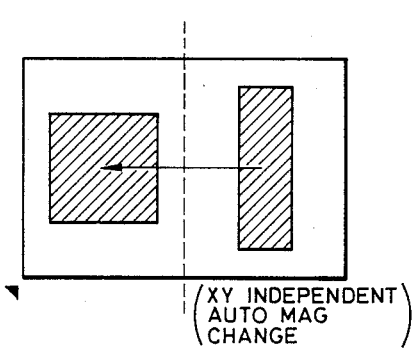
Figure 42E:
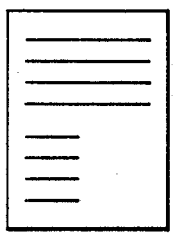
Figure 42F:
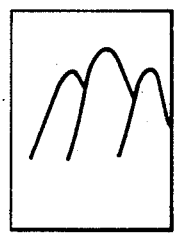
Figure 42G:
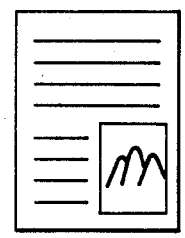

An insertion synthesizing mode M600 is a mode in which, for example, a designated color image area in the color original document of FIG. 42F is inserted into a monochromatic image area in the original document of FIG. 42E at equi-magnification or changed magnification and the thus-synthesized image is printed. (The monochromatic image area may be a color image area.)

A method of setting the insertion synthesizing mode will be described below with reference to pictures displayed on the liquid crystal panel and the operation of each touch panel key.

Figure 39:
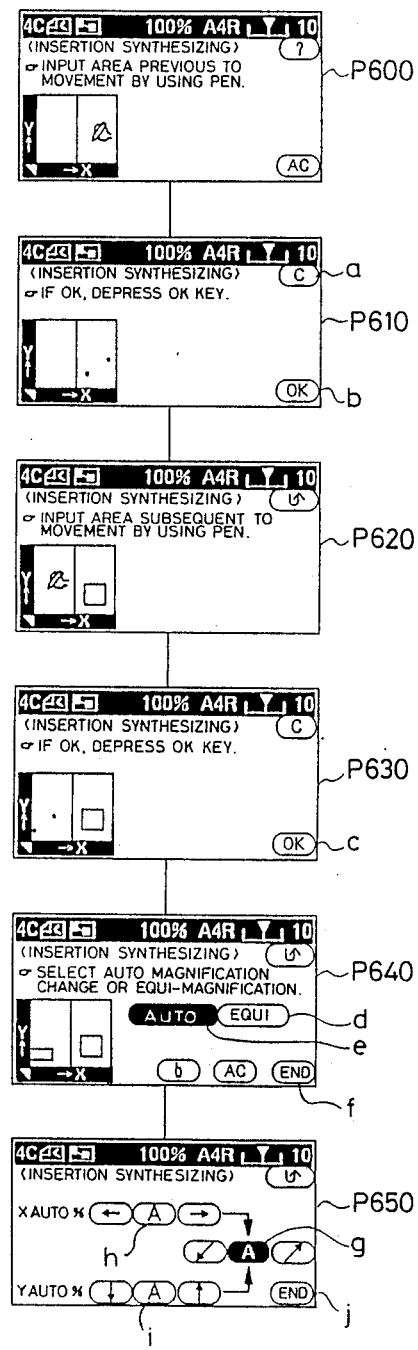
FIG. 39 illustrates the operation of an insertion synthesizing mode.

When an original document is placed on the coordinates detecting panel 420 of the digitizer 16 and the insertion synthesizing key 427 serving as an entry key for the insertion synthesizing mode is depressed, the liquid crystal image plane is changed from the standard image plane P000 of FIG. 33 to the image plane P600 of FIG. 39. Two points located on opposite ends of a diagonal line of a desired color image area to be moved are designated by using the point pen 421. Two dots substantially analogous to actually designated positions are displayed as an image plane 610 on the liquid crystal image plane. If the designated area is otherwise changed, a touch key a in the image plane P610 is depressed and then different two dots are again designated. If it is judged that the designated area is proper, a touch key b is depressed and then two points on opposite ends of a diagonal line of a monochromatic image area to which the color image area is to be moved are designated by using the point pen 421 in an image plane P620. If the designated area is proper, a touch key c in an image plane P630 is depressed and thus the display is changed to an image plane P640, in which the magnification of the color image to be moved is designated. When the image to be moved need be inserted at an equi-magnification, a touch key d in the image plane P640 is depressed and an ed key is then depressed to complete the setting through key depression. When, as shown in FIG. 42A, an image area to be moved is larger than an image area to which the image area is to be moved, the former image area is automatically reduced in size to the latter image area and the thus-reduced image area is inserted into the latter image area. On the other hand, when the former image area is smaller than the latter image area as shown in FIG. 42C, the former image area is automatically inserted into the latter image area at an equi-magnification and thus an image consisting of the former image area and the remaining white image area is printed.

If the designated color image area is to be inserted at a changed magnification, a touch key e in an image plane P640 is depressed to display an image plane P650. In the image plane P650, the magnifications in the X direction (sub-scan direction) and in the Y direction (main-scan direction) are set by the same method as the previously-described method of operating the zoom magnification change mode. When a designated color image area is to be inserted into the XY same rate auto magnification change mode, a touch key g in the image plane P650 is depressed to cause the display to reverse. On the other hand, when the designated color image area is to be printed with the same size as that of the image area into which the former color image area is inserted, touch keys h and i in the image plane P650 are depressed to cause the image plane to reverse. When the magnification is to be changed in the X or Y direction only or when the XY same rate manual magnification change mode is to be set, a corresponding up or down key is depressed.

After the above-described setting operation has been completed, a touch key j is depressed to cause the image plane to return to the standard image plane shown in FIG. 33. In this manner, the operation of setting the insertion synthesizing mode is completed.

ENLARGEMENT SERIAL COPY MODE

In a case where an original document or an area designated on the original document is copied at a selected magnification, its size may exceed the size of selected paper. An enlargement serial copy mode M500 is a mode which is chosed in this case and in which the original is automatically divided into two or more areas in accordance with the selected magnification and a designated paper size, the thus-obtained areas of the original document being printed on a plurality of sheets of print paper. Accordingly, if these plurality of copies are joined together by an adhesive or the like, a copy having a size larger than the designated paper size can easily be obtained.

Figure 38:
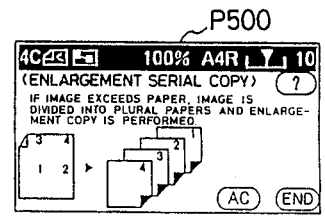
FIG. 38 illustrates the operation of an enlargement serial copy mode.

In operation, the enlargement serial copy key 426 on the digitizer 16 is depressed to display an image plane P500 of FIG. 38. When an end key a in the image plane P500 is depressed, the setting operation through key depression is completed. All that is subsequently required is to select desired magnification and paper size.

REGISTRATION MODE

A registration mode M700 is constituted by the following three kinds of modes; a color registration mode M710, a zoom program mode M720, and a manual feed size designation mode M730.

In the color registration mode M710, a converted color can be registered during the color conversion mode and the paint mode of the color create mode M400 and the designation mode M300 which were previously described. The zoom program mode M720 is a mode in which, when the size of an original document and the length of a sheet of copy paper are input, a corresponding magnification is automatically calculated and the resultant magnification is displayed in the standard image plane P000. Thereafter, copy is performed at this magnification. The manual feed size designation mode M730 is a mode in which a desired manual feed size can be designated, for example, in the APS (auto paper select) mode since the present color copying machine is capable of making copies by using sheets of manually fed paper as well as sheets automatically fed from the upper and lower cassettes.

When the * key 402 on the control panel shown in FIG. 31 is depressed, the display is changed to an image plane P700 of FIG. 40. If color registration in the color registration mode M710 is to be performed, a touch key a in the image plane P700 is depressed to display an image plane P710. An original document the color registration of which is desired is placed on the digitizer 16 and a color portion to be registered is designated by using the point pen 421.

At this time, the image plane is changed to an image plane P711, in which a touch key corresponding to a desired registration number is depressed. In addition, when another color need be registered, a touch key d in the image plane P711 is depressed to cause the display to return to the image plane P710, in which a desired color is set by similar procedures. After input of coordinates to be input have been completed, a touch key e is depressed and then a touch key f serving as a readout start key in an image plane P712 is depressed.

Figure 44:
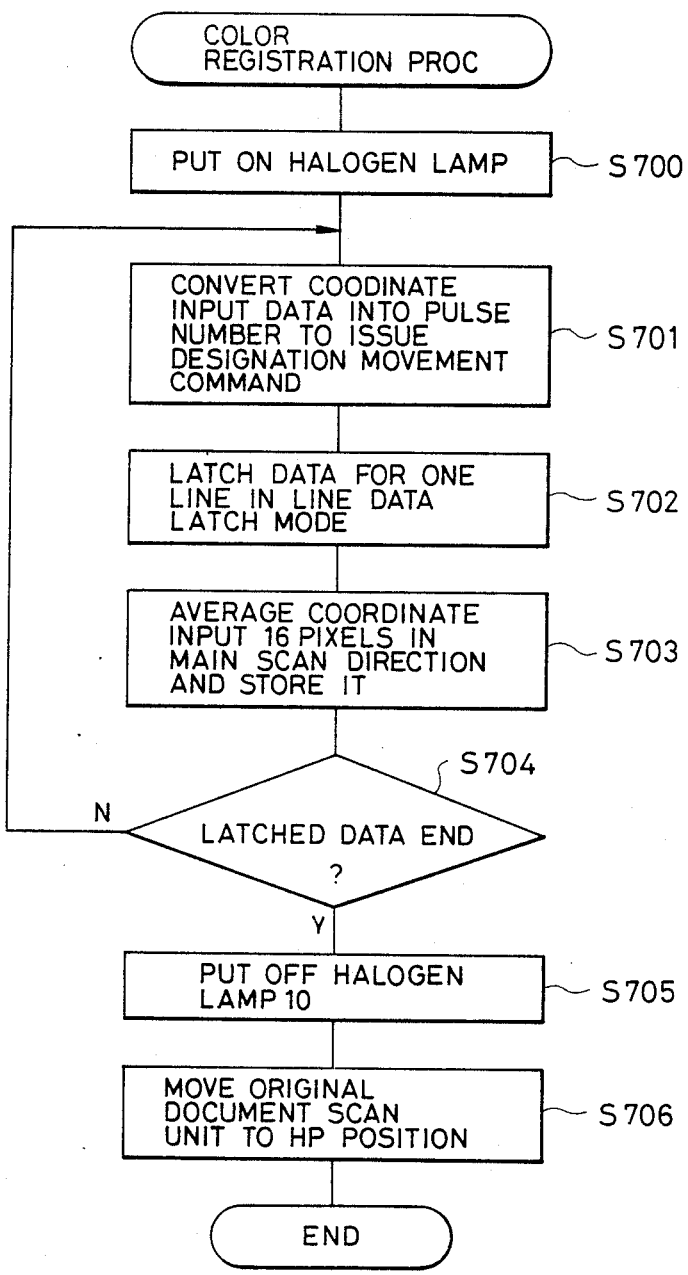
FIG. 44 is a flow chart of the control operation in the color registration mode.

After the touch key f has been depressed, the process proceeds in accordance with the flow chart shown in FIG. 44. In Step S700, the halogen lamp 10 is put on. In Step S701, the number of pulses for stepping the stepping motor is calculated from the aforesaid designated coordinates (the sub-scan direction), and a command representative of the previously-described designated movement is issued to cause movement of the original document scan unit 11. In Step S702, data equivalent to one line at the position the coordinates of which are designated in the sub-scan direction is latched in the RAM 78' of FIG. 11A in the line data latch mode. In Step S703, the CPU 22 averages eight pixels before and after the position the coordinates of which are designated in the main-scan direction, and stores the averaged value from the RAM 78' into the RAM 24. In Step 704, judgement is made as to whether or not all the designated registration coordinates have been read. If the answer is "NO", the process returns to Step 701 in which the same processing is repeated. It is judged that all the designated registration coordinates have been read, the halogen lamp 10 is put off in Step S705. In Step 706, the original document unit 10 is moved to the home position as a reference position. This completes the operation of color registration.

In the image plane P700, a touch key (zoom program) a is depressed to display an image plane P720. In the image plane P720, the length of the original document size and that of the copy size are set by up/down keys. The settings are displayed in the image plane P720 and at the same time a percent value of (copy size/original document size) is displayed. The result of calculation is displayed at a magnification display position of the image plane P000, and the magnification for copy is set.

A touch key c (manual feed size designation) in the image plane P700 is depressed to select an image plane P730. In the image plane P730, the size of a sheet of paper which is manually fed is designated. This mode enables the APS mode or the auto zoom magnification change mode to be applied to a manual feed operation.

In each of the above-described modes, data and values which are set through the touch panel or the coordinates input through the digitizer are stored in predetermined areas of the RAMs 24 and 25 under control of the CPU 22, and are called as parameters during the following sequence of operations.

Figure 51:
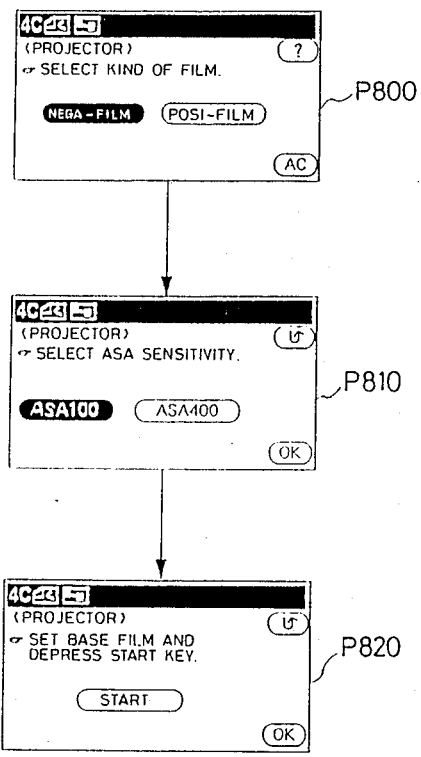
FIG. 51 illustrates the operation of the projector.

FIG. 51 illustrates the procedures for operating the control unit in a case where the film projector (211 in FIG. 24) is carried on the present color copying machine. When the projector mode selecting key 406 of FIG. 31 is turned on after the film projector 211 has been connected to the color copying machine, an image plane P800 is displayed on the liquid crystal touch panel. In the image plane P800, a negative or positive film is selected. For example, if the negative film is selected, the image plane P800 changes to an image plane P810 in which the ASA sensitivity of the film is selected. In this image plane P810, for example, a film sensitivity of ASA 100 is selected. Subsequently, a negative base film is set by the procedures which are described in detail previously with reference to FIG. 29, and a shading start key in an image plane P820 is turned on to perform shading correction. Then, a negative film to be printed is set in the holder 215, and the copy button (at 400 in FIG. 31) is turned on to perform an AE operation for determining the level of exposure voltage. Then, as shown in FIG. 25A, image formation is repeated in the order of yellow, magenta, cyan and black.

Figure 46:
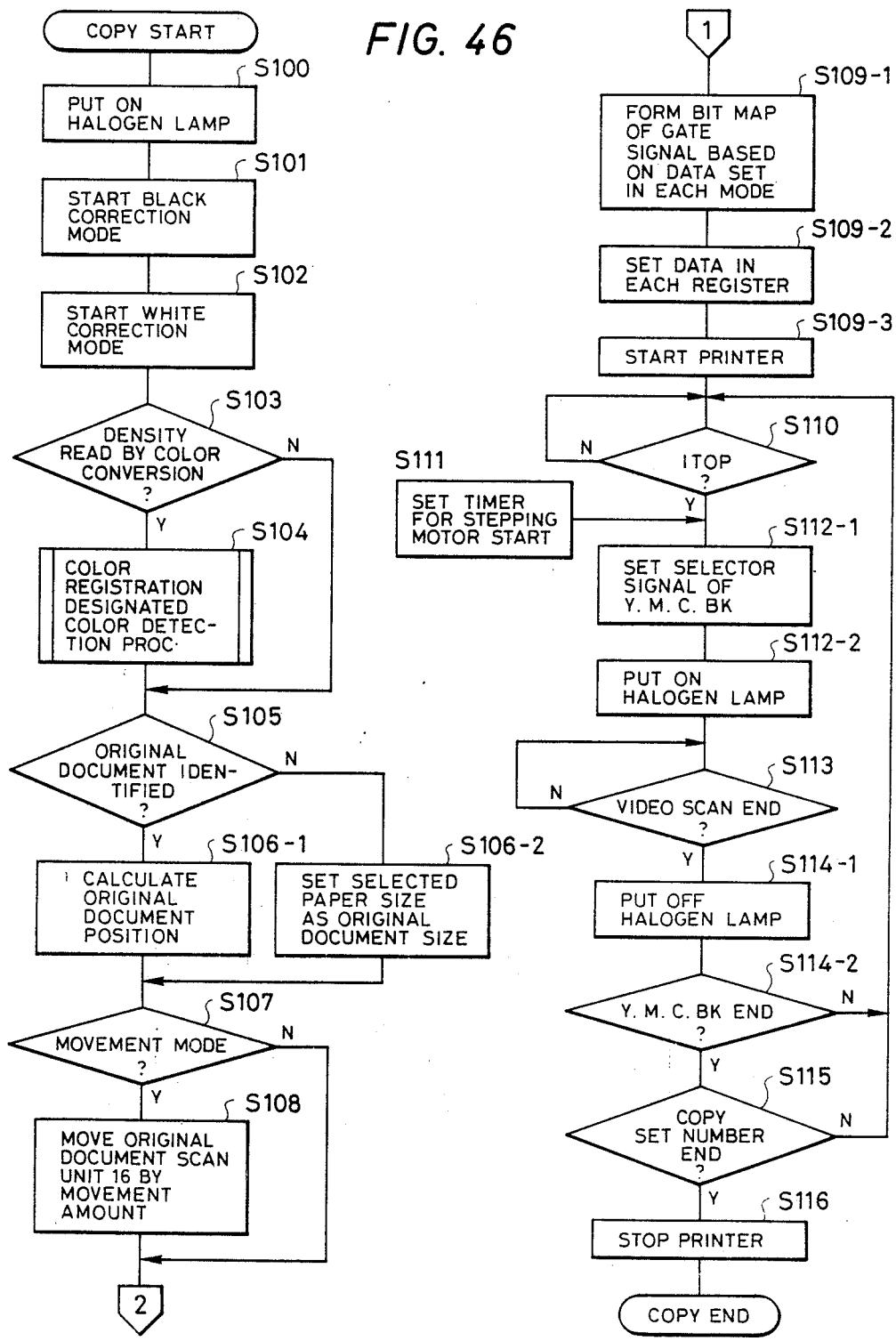
FIG. 46 is a flow chart of the control sequence of the entire system.

FIG. 46 is a flow chart illustrating the sequence control of the present color copying machine. The following description will be given in conjunction with the flow chart. In Step S100, the halogen lamp 10 is put on by depressing the copy key. The previously-described black correction mode is performed in Step S101 and, in Step S102, a shading correction is performed in the white correction mode. If the conversion of a designated color is set in the color conversion mode or the paint mode, color registration and a designated color read processing are performed in Step S104. Data representing the density of each separated color of designated coordinates is stored in predetermined areas in accordance with the registration mode and the detection of the designated color. This operation is as described previously with reference to FIG. 44. In Step S501, judgement is made as to whether or not an original document identification mode is set. If it is set, the process proceeds to Step S106, in which the scan unit 16 is caused to scan 435 mm equivalent to the maximum detectable length of an original document to detect the position and size of the original document by means of the original document position identifying circuit 200 via the CPU bus. If it is not set, the paper size selected in Step S106-2 is identified as the original document size. The resultant data is stored in the RAM 24. In Step S107, judgement is made as to whether or not the movement mode is set. If it is set, the original document scan unit 16 is moved to the original document by a distance equivalent to a desired amount of movement.

In Step S109, a bit map of gate signal outputs for each function generated from the RAMs A 136 and B 137 is formed on the basis of the data set in each of the modes.

Figure 49:
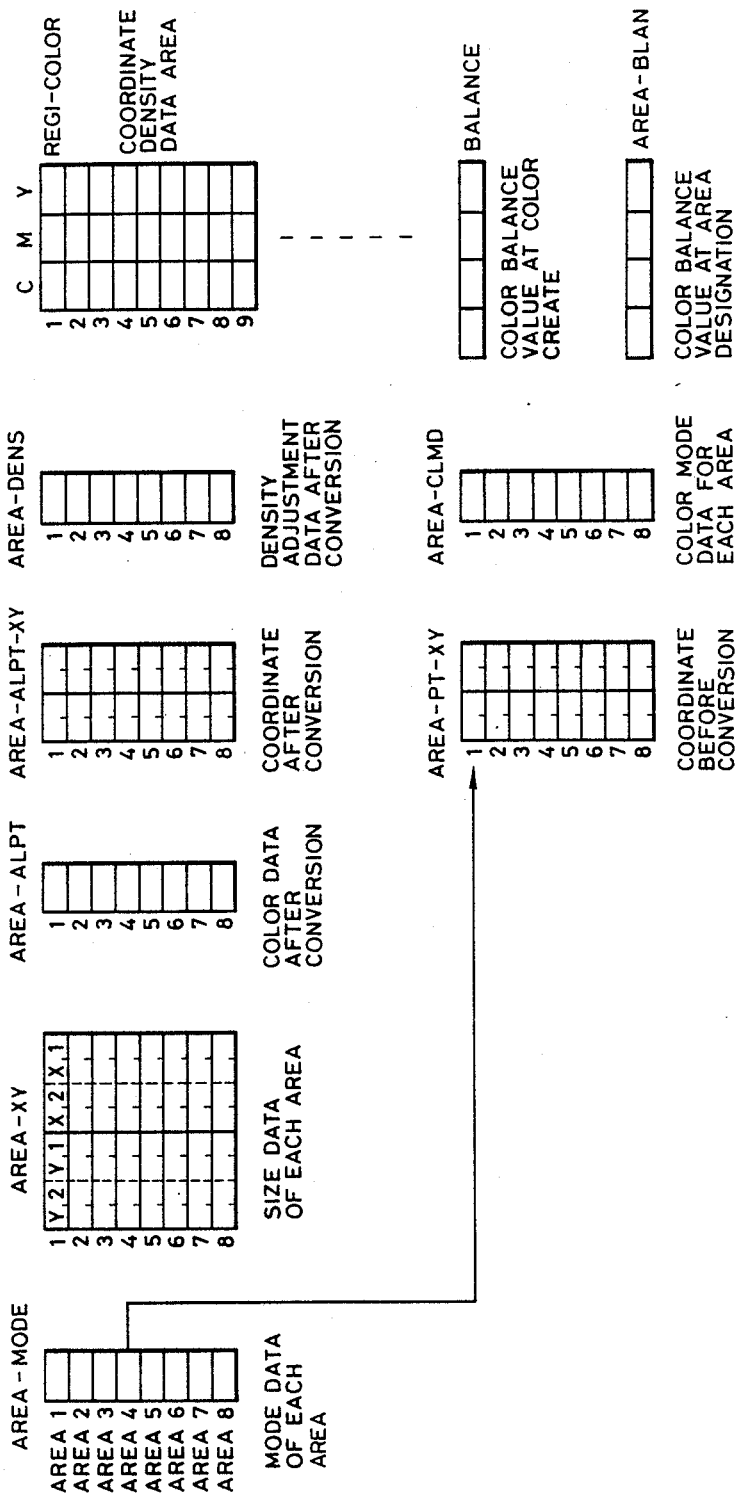
FIG. 49 illustrates a memory map of a RAM of the embodiment.

FIG. 49 is a RAM map of data which is set in the RAMs 24 and 25 in the above-described respective modes, and illustrates areas in which data is stored in the area designation mode and in the color create mode. An area AREA-MODE stores discrimination data for each mode corresponding to the operation within each designated area, such as the paint or trimming mode. An area AREA-XY stores size data relating to original document size and the size of each area. An area AREA-ALPT stores color data after color conversion, i.e., color data representing the fact that a converted color is one of a standard color, a designated color and a registered color. An area AREA-ALPT-XY is a data area which stores color coordinates when the contents of the area AREA-ALPT are designated colors. An area AREA-DENS stores density adjustment data after conversion. An area AREA-PT-XY is a data area for storing therein color coordinates before conversion in the color conversion mode. An area AREA-CLMD stores color mode data for an original document or each designated area on the same.

An area REGI-COLOR stores therein each piece of color data registered in the color registration mode, and these pieces of color data are used as registered colors. The data in this area is stored in a back-up memory of the RAM 25. Accordingly, even after an electrical power supply (not shown) has been turned off, it is possible to hold the data.

Figure 50:
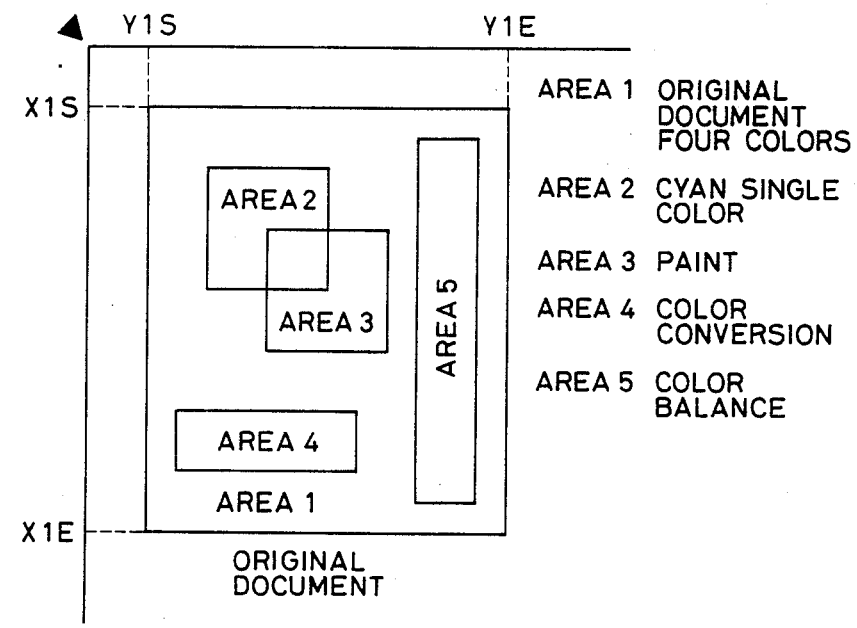
FIG. 50 illustrates a bit map of the RAM.

The bit map shown in FIG. 50 is formed on the basis of the data which is set in the above-described manner. First, coordinate data relative to the sub-scan direction is read from the area AREA-XY in which the size of each area is stored. Then, the coordinate data is sorted in an ascending order and is written into an area X-ADD. Similar sorting is performed with respect to coordinate data relative to the main-scan direction.

Next, "1" is placed at each of the bit positions of the area BIT-MAP of FIG. 50 which correspond to the scan starting point and the scan terminating point of each area relative to the main-scan direction. The same operation is repeated until the last coordinates of the sub-scan is reached. In this case, the bit positions at which "1"s are placed correspond to the gate signals generated from the RAM A136 or B137, and each bit position is determined by the mode which is assumed by each area. For example, an area 1 designated as a four-color original document area corresponds to the signal TMAREA 660, and an area 5 designated as a color-balance area corresponds to the signal GAREA 626. Similarly, a bit map corresponding to all the areas is formed in the area BIT-MAP of FIG. 50. In Step S109-1, the following processing is performed with respect to the mode assumed by each of the areas. An area 2 is represented in a single-color cyan mode, and is constituted by an monochromatic image with respect to the four-color original document. If the area 2 is output as a video image immediately after cyan development, the area 2 consisting of the cyan component alone is printed but no other images including yellow and magenta components are printed. For this reason, in order to obtain an ND image if a single-color mode is selected for a designated area, the following coefficients are set in the masking coefficient registers which are selected from among the registers of FIG. 16A when the switch signal MAREA 564 becomes active.

$$\begin{pmatrix} \alpha Y1, & \alpha Y2, & \alpha Y3 \\ \beta M1, & \beta M2, & \beta M3 \\ \gamma C1, & \gamma C1, & \gamma C3 \\ k2, & l2, & m2 \end{pmatrix} = \begin{pmatrix} 0, & 0, & 0 \\ 0, & 0, & 0 \\ 1/3, & 1/3, & 1/3 \\ 0, & 0, & 0 \end{pmatrix}$$

Then, the data (used in a four-color or three-color mode) stored in the RAM 23 of FIG. 2 is stored in the masking coefficient registers which are selected when the switch signal MAREA 564 goes to "0". Then, predetermined data is set in the registers of FIG. 18A which are selected by the gate signals CHAREA 0, 1, 2 and 3 corresponding to the respective bits of the area BIT-MAP associated with the area 2 which assumes the paint mode. In order to convert all the video inputs, "FF", "00", "FF", "00", "FF", and "00" are respectively set in the registers $y_u 159$, yl 160, $m_u 161$, ml 162, $c_u 163$, and cl 164. The converted-color data stored in the area AREA-ALPT or REGI-COLOR of FIG. 49 is loaded therefrom, and each piece of the color data is multiplied by the coefficient of each piece of the density adjustment data read from the area AREA-DENS. The density data after this conversion is set in y'166, m'167 and c'168. In the case of the area which assumes the color conversion mode, the pieces of the density data before conversion shown in FIG. 49 to which a certain offset value is added are respectively set in the aforesaid registers $y_u 159$ to cl 164. Subsequently, data after conversion is likewise set in the same registers. In the case of the area 5 which assumes the color-balance mode, color-balance values AREA-BLAN at the time of area designation (FIG. 49) are set in the areas Y, M, C and Bk of the RAM 177 which are selected when the gate signal GAREA 626 goes to "1". Color-balance values BALANCE in the color create mode are set in the areas of the RAM 177 which are selected when the signal GAREA 626 goes to "0".

Figure 47:
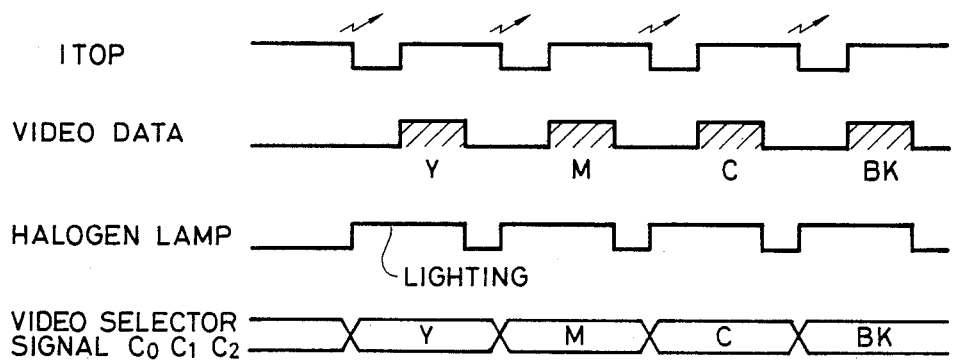
FIG. 47 is a timing chart of the operation of the entire system.

In Step S109, a start command is output to the printer via the signal line SRCOM 516. In Step 110, the signal ITOP shown in the timing chart of FIG. 47 is detected. In Step S111, the output video signals $C_0$, $C_1$ and $C_2$ corresponding to Y, M, C and Bk are switched. In Step S112, the halogen lamp is put on. In Step S113, judgement is made as to whether or not each video scan has completed. If the answer is "YES", the halogen lamp is put off in Step 114. In Steps 115 and 116, judgement is made as to whether or not copying has completed. If the answer is "YES", a stop command is output to the printer and thus copying has been ended.

Figure 48:
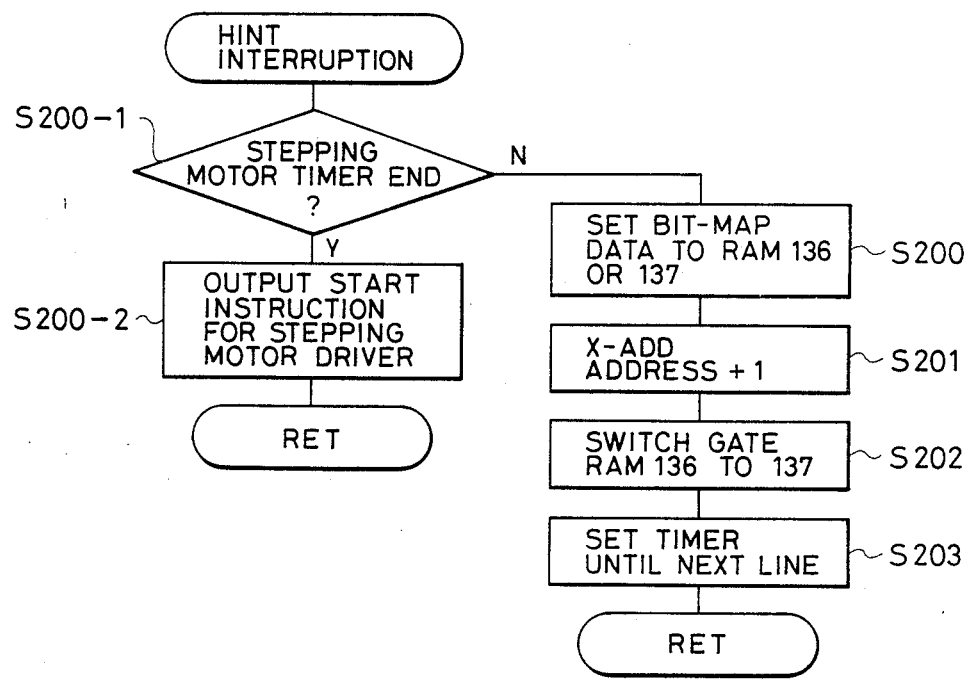
FIG. 48 is a flow chart of the control of interruption.

FIG. 48 is a flow chart of the interruption processing of the signal HINT 517 output from the timer 28. In Step S200-1, judgement is made as to whether or not a timer for causing the stepping motor to start has ended. If it has ended, the stepping motor is started and, in Step S200, the data BIT-MAP equivalent to one line represented by X-ADD in FIG. 50 is set in the RAM 136 or 137. In Step S201, the address of data set at the next interruption is incremented by one. In Step S202, switch signals $C_3$ 595, $C_3$ 596 and $C_3$ 593 for the RAMs 136 and 137 are output. In Step S203, the time passing until the next sub-scan scan switching is performed is set in the timer 28. Subsequently, the contents of the portion of the area BIT-MAP represented by X-ADD is set in the RAM 136 or 137. Thus the gate signals are switched.

Specifically, each time the carriage moves in the sub-scan direction and interruption takes place, the processing contents in the X direction are rewritten, whereby a variety of color processings such as color conversion can be effected for each area.

As described above, in the presently preferred color copying machine, various color modes are enabled and thus free reproduction of color can be performed.

The present embodiment has been described with illustrative reference to a color image forming apparatus employing electrophotography. However, the present invention is applicable to various other recording methods such as ink jet recording or thermal transfer recording. The copying machine in which various units are disposed near to each other has been referred to in the above description by way of example. However, the present invention is of course applicable to a system in which the reader unit and the image forming unit are disposed remotely from each other, image data being transmitted through a communication line therebetween.

In the present embodiment, the level of the light-on voltage of the projector lamp 214 is controlled to adjust the quantity of light. However, it may be controlled by using a diaphragm or the like.

As described above, the color film reader of the present invention is also capable of providing accurate shading correction data of a color negative film.

In accordance with the present invention, it is possible to set parameters which enable optimum image processing of each of a color negative film, a color positive film, and a monochrome film.

During reading of a color negative film, shading correction is performed employing an unexposed portion of the film. During reading of a color positive film, shading correction is performed without using the film. This enables the optimum shading correction of each kind of film and the generation of color signals having high degrees of gradation.

The present invention is not limited to the above-described preferred embodiments, and various modifications, alternative constructions and equivalents may be employed without departing from the true spirit and scope thereof.

What is claimed is:

1. A film reading apparatus comprising:
   setting means for setting a type of film to be read;
   holding means for holding a film to be read therein;
   illuminating means for projecting illumination light onto the film held by said holding means;
   reading means for reading image data of the film illuminated by said illuminating means;
   shading correcting means for performing shading correction of the image data read by said reading means on the basis of correction data; and
   controlling means for setting the correction data used for the shading correction wherein, when the film to be read is a negative film, said controlling means sets the correction data on the basis of data obtained by reading an unexposed portion of a film corresponding to the negative film to be read, while in the case of a positive film, said controlling means sets the correction data on the basis of data obtained from the illumination light.

2. A film reading apparatus according to claim 1, wherein, when a negative film is to be negative film, holding means holds the unexposed portion of the negative film, said illuminating means illuminates the unexposed portion of the negative film held by the holding means, and said controlling means causes said reading means to read the unexposed portion of the negative film illuminated by the illuminating means in order to obtain the correction data.

3. A film reading apparatus according to claim 1, further comprising light controlling means for controlling a quantity of light projected by said illuminating means in accordance with the type of film set by said setting means.

4. A film reading apparatus according to claim 3, wherein said light controlling means causes the quantity of light to vary in accordance with a sensitivity of a color negative film when the film to be read is a color negative film.

5. A film reading apparatus comprising:
setting means for setting a type of film to be read;
holding means for holding a film to be read;
illuminating means for projecting illumination light onto the film held by said holding means;
reading means for reading image data of the film illuminated by said illuminating means;
detecting means for detecting from the image data output by said reading means a lightness characteristic of the film read by said reading means; and
controlling means for causing a quantity of light projected by said illuminating means to vary in accordance with a detection output of said detecting means and the type of film set by said setting means.

6. A film reading apparatus according to claim 5, wherein, in a case where the type of film is a positive film, said controlling means sets the quantity of light on the basis of the maximum value of the lightness characteristic detected by said detecting means.

7. A film reading apparatus according to claim 5, wherein, in a case where the type of film is a negative film, said controlling means sets the quantity of light on the basis of the minimum value of the lightness characteristic detected by said detecting means.

8. A film reading apparatus according to claim 5, wherein the controlling means controls said quantity of light by varying a level of a drive voltage of an illuminating lamp of said illuminating means.

9. A color film reading apparatus comprising:
illuminating means for projecting illumination light onto a color film;
photoelectric conversion means for converting the illumination light from the color film into an electrical signal; and
shading correction means for effecting shading correction of the electrical signal from said photoelectric conversion means on the basis of correction data,
wherein, in the case of a color negative film, the correction data is obtained by employing the illumination light projected onto an unexposed portion of a film corresponding to the color negative film, while, in the case of a color positive film, the correction data is obtained by directly employing the illumination light.

10. A color film reading apparatus according to claim 9, further comprising means for causing the quantity of light projected by said illuminating means to vary in accordance with whether the film is a negative film or a positive film.

11. A color film reading apparatus according to claim 9, further comprising means for causing the quantity of light projected by said illuminating means to vary in accordance with a sensitivity of the film when the film is a negative film.

12. A film reading apparatus comprising:
holding means for holding a film to be read;
illuminating means for projecting illuminating light onto the film held by said holding means;
reading means for reading image data from the film illuminated by said illuminating means;
shading correction means for performing shading correction of the image data from said reading means on the basis of correction data; and
controlling means for setting the correction data used by said shading correction means, and controlling a quantity of light projected by said illuminating means,
wherein said controlling means sets the correction data on the basis of data read by said reading means in a state where the film is not held in said holding means, and controls the quantity of light on the basis of the image data read by said reading means in a state where the film is held in said holding means.

13. A film reading apparatus according to claim 12, wherein said controlling means causes the quantity of light to vary in accordance with whether the film is a negative film or a positive film.

14. A film reading apparatus according to claim 12, wherein said controlling means controls the quantity of light by varying a level of a drive voltage of an illuminating lamp of said illuminating means.

* * * * *

UNITED STATES PATENT AND TRADEMARK OFFICE
CERTIFICATE OF CORRECTION

PATENT NO.   : 4,922,335

DATED        : May 1, 1990

INVENTOR(S)  : Kenichi OUTA, ET AL

It is certified that error appears in the above-identified patent and that said Letters Patent is hereby corrected as shown below:

COLUMN 1:

Line 5, Insert --This application is a continuation of application Serial No. 119,906 filed November 12, 1987, now abandoned.--; and Line 49, "generating" should read --generate--.

COLUMN 2:

Line 56, "presentation" should read --present invention--.

COLUMN 5:

Line 32, "an" should read --a--; and

Line 37, "glass 3" should read --glass 4--; and "original document 4" should read --original document 2--.

COLUMN 6:

Line 15, "videoprocessing unit 7" should read --videoprocessing unit 12--;

Line 16, "amplifier circuit 12" should read --amplifier circuit 7--; and

Line 51, "an" should read --a--.

UNITED STATES PATENT AND TRADEMARK OFFICE
CERTIFICATE OF CORRECTION

PATENT NO. : 4,922,335  Page 2 of 6
DATED : May 1, 1990
INVENTOR(S) : Kenichi OUTA, ET AL It is certified that error appears in the above-identified patent and that said Letters Patent is hereby corrected as shown below:

COLUMN 9:

Line 5, "AN" should read --A--.

COLUMN 10:

Line 8, "reference signals $SYNC_2$" should read --reference signals SYNC2--.

COLUMN 11:

Line 2, "soffset" should read --offset--;

Line 50, "return to" should be deleted; and

Line 51, "to their" should read --to return to their--.

COLUMN 12:

Line 48, "an" should read --a-- (both occurrences.

COLUMN 15:

Line 52, "well a" should read --well as a--.

COLUMN 16:

Line 11, "$(b_{M1})$-" should read --$(-b_{M1})$--

UNITED STATES PATENT AND TRADEMARK OFFICE
CERTIFICATE OF CORRECTION

PATENT NO. : 4,922,335

DATED : May 1, 1990

INVENTOR(S) : Kenichi OUTA, ET AL

It is certified that error appears in the above-identified patent and that said Letters Patent is hereby corrected as shown below:

COLUMN 18:

Line 5, "an" should read --a--;

Line 6, "/Yi Mi+Ci," should read --/Yi+Mi+Ci,--;

Line 56, ""an" should read --a--; and

Line 58, "FIG. 18B," should read --FIG. 18B.--.

COLUMN 19:

Line 19, "an" should read --a--.

COLUMN 20:

Line 35, "4725 pixels" should read --4752 pixels--.;

COLUMN 21:

Line 65, "selectes" should --selects--.

COLUMN 26:

Line 52, "$k_z$" should read --$K_2$--.

Figure 27A:
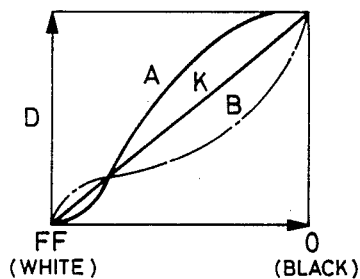
FIGS. 27A and 27B are graphs illustrating gradation conversion characteristics in the embodiment.
Figure 27B:
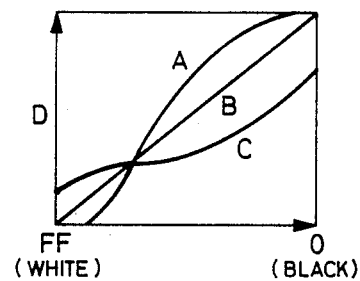
Figure 28A:
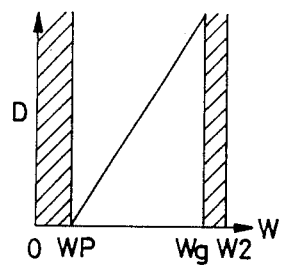
Figure 28B:
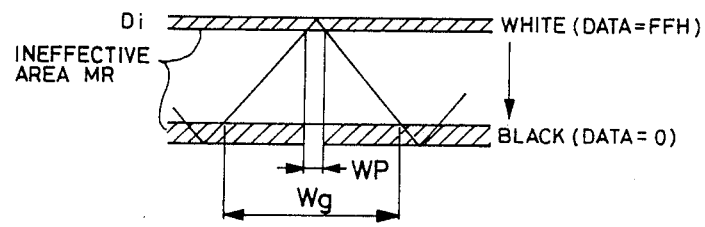

COLUMN 27:

Line 16, "FIG. 26A" should read --FIG. 27A--;

Line 28, "step" should read --steps--; and

UNITED STATES PATENT AND TRADEMARK OFFICE
CERTIFICATE OF CORRECTION

PATENT NO.  : 4,922,335

DATED       : May 1, 1990

INVENTOR(S) : Kenichi OUTA, ET AL

It is certified that error appears in the above-identified patent and that said Letters Patent is hereby corrected as shown below:

Line 50, ""Wp=W=WZ" should read --WP=W=W2--; and

Line 54, "Wp" should read --WP--.

COLUMN 28:

Line 6, "an" should read --a--; and

Line 61, "mode set" should read --mode which is set--.

COLUMN 29:

Line 40, "plane P000, an" should read --plane P000 is depressed, an--.

COLUMN 30:

Line 21, "modes;" should read --modes:--;

Line 66, "modes;" should read --modes:--;

Line 67, "modification" should read --magnification--; and

Line 68, "modification" should read --magnification-- (both occurrences).

COLUMN 31:

Line 1, "modification" should read --magnification--;

Line 6, "modes;" should read --modes:--; and

UNITED STATES PATENT AND TRADEMARK OFFICE
CERTIFICATE OF CORRECTION

PATENT NO. : 4,922,335

DATED : May 1, 1990

INVENTOR(S) : Kenichi OUTA, ET AL

It is certified that error appears in the above-identified patent and that said Letters Patent is hereby corrected as shown below:

Line 19, "a a" should read --a--; and

Line 61, " a" should read --an--.

COLUMN 32:

Line 4, ""modes;" should read --modes:--;

Line 7, "con-" should be deleted;

Line 17, "5" should be deleted;

Line 31, "image plane P130" should read --image plane P310--; and

Line 62 "image P370" should read --image plane P370--

COLUMN 33:

Line 1, "an" should read --a--.

COLUMN 35:

Line 25, "methqd" should read --method--;

Line 50, "chosed" should read --chosen--; and

Line 68, "modes;" should read --modes:--.

UNITED STATES PATENT AND TRADEMARK OFFICE
CERTIFICATE OF CORRECTION

PATENT NO. : 4,922,335

DATED : May 1, 1990

INVENTOR(S) : Kenichi OUTA, ET AL

It is certified that error appears in the above-identified patent and that said Letters Patent is hereby corrected as shown below:

COLUMN 36:

Line 55, "704," shold read --S704,--;

Line 57, "Step 701" should read --Step S701--;

Line 58, "It" should read --If--; and

Line 61, "706," should read --S706,--.

COLUMN 38:

Line 58, "an" should read --a--.

COLUMN 39:

Line 40, "Step 110," should read --Step S110,--.

Line 47, "Step 114." should read --Step S114.--; and "Steps 115 and 116," shold read --Steps S115 and S116,--.

Signed and Sealed this

Twenty-ninth Day of December, 1992

*Attest:*

DOUGLAS B. COMER

*Attesting Officer*  Acting Commissioner of Patents and Trademarks